US010847354B2

United States Patent
Cleland et al.

(10) Patent No.: US 10,847,354 B2
(45) Date of Patent: Nov. 24, 2020

(54) RAPID AUTHENTICATION USING SURFACE DESORPTION IONIZATION AND MASS SPECTROMETRY

(71) Applicant: Waters Technologies Corporation, Milford, MA (US)

(72) Inventors: Gareth E. Cleland, Salem, MA (US); Kari L. Organtini, Plainville, MA (US)

(73) Assignee: Waters Technologies Corporation, Milford, MA (US)

( * ) Notice: Subject to any disclaimer, the term of this patent is extended or adjusted under 35 U.S.C. 154(b) by 0 days.

(21) Appl. No.: 16/092,904

(22) PCT Filed: Apr. 14, 2017

(86) PCT No.: PCT/US2017/027533
§ 371 (c)(1),
(2) Date: Oct. 11, 2018

(87) PCT Pub. No.: WO2017/180939
PCT Pub. Date: Oct. 19, 2017

(65) Prior Publication Data
US 2019/0206665 A1    Jul. 4, 2019

Related U.S. Application Data

(60) Provisional application No. 62/322,283, filed on Apr. 14, 2016.

(51) Int. Cl.
*H01J 49/04*    (2006.01)
*H01J 49/00*    (2006.01)
*G01N 27/62*    (2006.01)

(52) U.S. Cl.
CPC .......... *H01J 49/0031* (2013.01); *G01N 27/62* (2013.01); *H01J 49/0009* (2013.01)

(58) Field of Classification Search
CPC ........ H01J 49/04; H01J 49/0463; H01J 49/00; H01J 49/0036; H01J 49/0422;
(Continued)

(56) References Cited

U.S. PATENT DOCUMENTS 5,955,729 A    9/1999  Nelson et al.
7,816,646 B1 *  10/2010  Willoughby .......... H01J 49/145
                                                    250/288
(Continued)

OTHER PUBLICATIONS

Catharino et al. "Characterization of Vegetable Oils by Electrospray Ionization Mass Spectrometry Fingerprinting: Classification, Quality, Adulteration, and Aging." Anal. Chem. 77(2005): 7429-7433.
Ng et al. "Characterization of Cigar Tobaccos by Gas Chromatographic/Mass Spectrometric Analysis of Nonvolatile Organic Acids: Application to the Authentication of Cuban Cigars." J. Agric. Food Chem. 49(2001): 1132-1138.
(Continued)

*Primary Examiner* — David A Vanore
(74) *Attorney, Agent, or Firm* — Womble Bond Dickinson (US) LLP; Deborah M. Vernon; Benedict L. Hanrahan

(57) ABSTRACT

The present disclosure relates generally to rapid authentication methods using surface desorption ionization and mass spectrometry detection. In particular, the disclosure relates to rapid methods of authentication of commercial or consumer products using portable, low cost ambient ionization and a single quadrupole mass spectrometer.

17 Claims, 39 Drawing Sheets

(58) Field of Classification Search
CPC .. H01J 49/0459; H01J 49/0468; H01J 49/145; H01J 49/162; H01J 49/165; G01N 1/2211; G01N 1/2214; G01N 2001/028; G01N 33/0057
USPC .................................................. 250/288, 282
See application file for complete search history.

(56) References Cited

U.S. PATENT DOCUMENTS

| | | | | |
|---|---|---|---|---|
| 2005/0061967 | A1* | 3/2005 | Shvartsburg | H01J 49/04 250/288 |
| 2011/0049352 | A1* | 3/2011 | Ding | H01J 49/0463 250/282 |
| 2012/0273675 | A1 | 11/2012 | Musselman | |
| 2014/0151543 | A1 | 6/2014 | Nagano et al. | |

OTHER PUBLICATIONS

Fernandes et al. "TAG, DAG and FFA Profiles of Dry-Cured Ham by Easy Ambient Sonic-Spray Ionization Mass Spectrometry After Thermal Imprinting." J. Braz. Chem. Soc. 25.9(2014): 1565-1570.

Porcari et al. "Food quality and authenticity screening via easy ambient sonic-spray ionization mass spectrometry." Analyst. 141(2016): 1172-1184.

Organtini et al. "B52 Real-time authentication of whiskeys using DART-QDA analysis." Book of Abstracts—7th International Symposion on Recent Advances in Food Analysis, Nov. 6, 2015, p. 194.

Waters Corporation. "Instantaneous Food Characterization by Ambient Mass Spectrometry." PITTCON 2016 Final Program, Mar. 9, 2016, p. 86.

International Search Report and the Written Opinion for corresponding PCT Application No. PCT/US2017/027533; completed on Jun. 7, 2017; dated Jun. 26, 2017.

* cited by examiner

FIG. 9

| | Fish Oil | | Flax Seed Oil | | Safflower Oil | |
|---|---|---|---|---|---|---|
| | Expected percentage | Average Percentage | Expected percentage | Average Percentage | Expected percentage | Average Percentage |
| EPA | 60 | 59 | | | | |
| DHA | 40 | 41 | | | | |
| ALA | | | 67 | 57 | | |
| LA | | | 16 | 21 | 63 | 55 |
| OA | | | 16 | 22 | 22 | 33 |
| Palmitic | | | | | 15 | 11 |

FIG. 11

| Compound | Abbreviation | SIR Mass |
|---|---|---|
| Palmitic Acid* | PA | 255.2 |
| Stearidonic Acid | SA | 275.2 |
| Linolenic Acid (alpha* and gamma isomers) | ALA/GLA | 277.2 |
| Linoleic Acid* | LA | 279.2 |
| Oleic Acid* | OA | 281.2 |
| Eicosapentaenoic Acid* | EPA | 301.2 |
| Arachidonic Acid | AA | 303.2 |
| Di-homo-γ-Linolenic Acid | DGLA | 305.2 |
| Docosahexaenoic Acid* | DHA | 327.2 |
| Docosapentaenoic Acid | DPA | 329.2 |
| Adrenic Acid | - | 331.3 |

FIG. 20

| Fatty Acid | Expected Percentage in Mix | Experimental Percentage in Mix |
|---|---|---|
| Stearidonic (275) | 10 | 2.37 ± 0.23 |
| α-Linolenic/γ-Linolenic (277) | 20 | 20.12 ± 2.09 |
| Linoleic (279) | 10 | 11.06 ± 1.12 |
| Eicosapentaenoic (301) | 10 | 12.23 ± 0.62 |
| Arachidonic (303) | 10 | 12.10 ± 0.87 |
| Di-homo-γ-Linolenic (305) | 10 | 10.28 ± 0.68 |
| Docosahexaenoic (327) | 10 | 11.77 ± 0.86 |
| Docosapentaenoic (329) | 10 | 10.45 ± 0.65 |
| Adrenic (331) | 10 | 9.62 ± 0.45 |

REAL TIME ANALYSIS OF TOBACCO FLAVORS USING DART-QDA

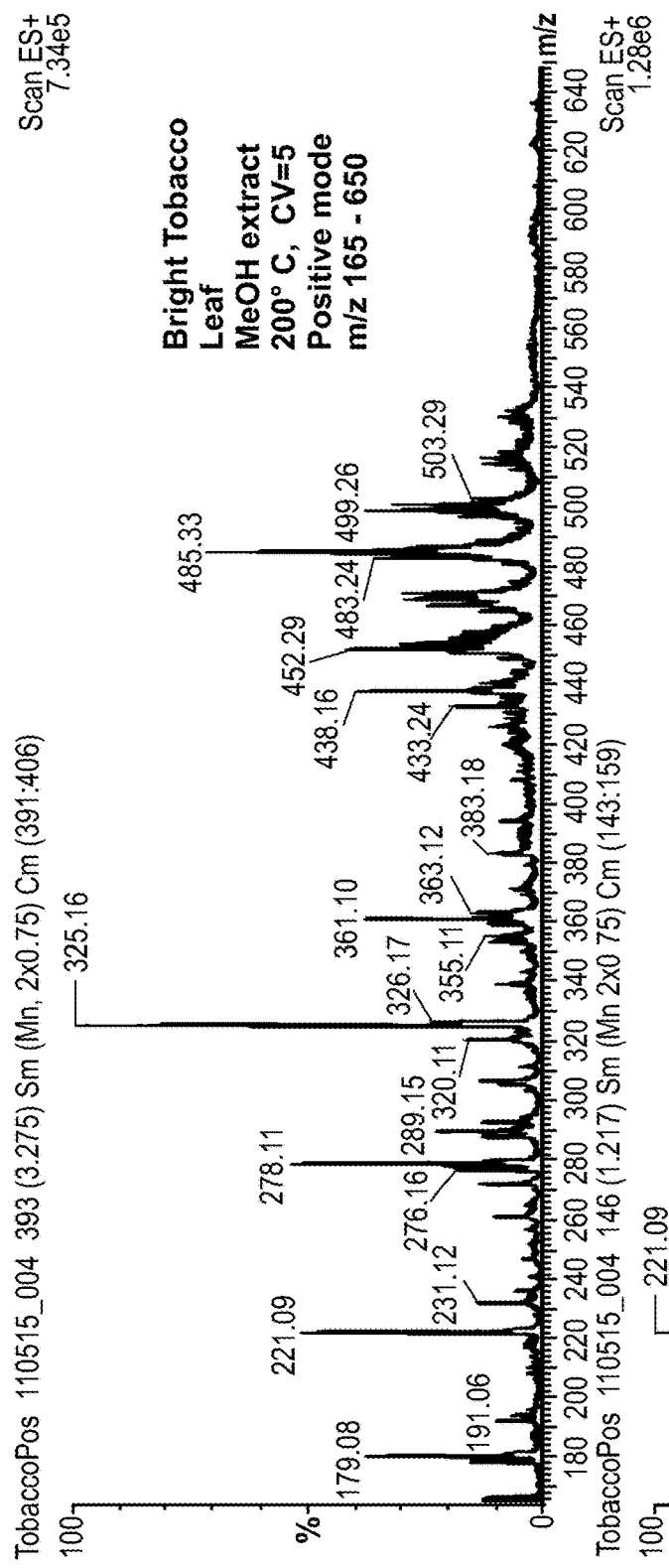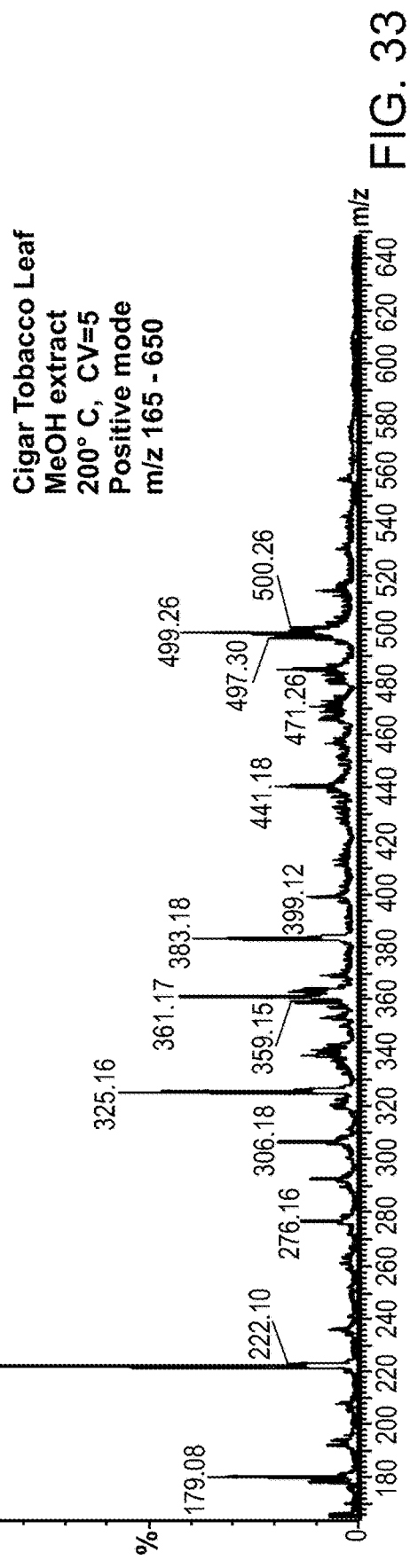
FIG. 33

RAPID AUTHENTICATION USING SURFACE DESORPTION IONIZATION AND MASS SPECTROMETRY

CROSS-REFERENCE TO RELATED APPLICATIONS

This application is a National Stage Application of International Application No. PCT/US2017/027533, filed Apr. 14, 2017, which claims the benefit of and priority to U.S. Provisional Patent Application Ser. No. 62/322,283, entitled "Rapid Authentication Using Surface Desorption Ionization and Mass Spectrometry" filed on Apr. 14, 2016. Each of the foregoing applications is incorporated herein by reference in its entirety.

RELATED APPLICATIONS

This application claims the benefit of and priority to U.S. Provisional Patent Application Ser. No. 62/322,283, entitled "Rapid Authentication Using Surface Desorption Ionization and Mass Spectrometry" filed on Apr. 14, 2016, which is incorporated herein by reference in its entirety.

TECHNICAL FIELD

The present disclosure relates generally to rapid authentication methods using surface desorption ionization and mass spectrometry detection. In particular, the disclosure relates to rapid methods of authentication of commercial or consumer products using portable, low cost ambient ionization and a single quadrupole mass spectrometer.

BACKGROUND OF THE INVENTION

Quality control of production facilities, in-process samples and finished products is important. Advanced quantitative and qualitative analysis, and the related instrumentation, is often needed to maintain a high level of quality control, especially for complex products. These analyses can include significant sample preparation steps including isolation and derivatization steps. For example, current test methods for determining fatty acids require laborious and time-consuming procedures, which make them unsuitable for rapid quality control or screening applications. The procedures may include multi-step hydrolysis and derivatization followed by a chromatographic separation. These analyses can also include large, non-portable and expensive instrumentation, such as time-of-flight mass spectrometers.

SUMMARY OF THE INVENTION

The present disclosure relates generally to rapid authentication methods using surface desorption ionization and mass spectrometry detection. In a particular embodiment, the disclosure relates to rapid methods of authentication of commercial or consumer products, e.g., goods, food, etc., using portable, low cost ambient ionization and a single quadrupole mass spectrometer. In some embodiments, the methods of authentication involve a direct analysis in real time ionization source coupled with a single quadrupole mass spectrometer, (e.g., an ambient ionization source such as the DART® ionization source, available from IonSense, Inc. Saugus, Mass. coupled to a single quadrupole mass spectrometer, such as QDa® mass spectrometer, available from Waters Corporation, Milford, Mass.).

In one aspect, the present disclosure relates to a method for authenticating an unknown sample including (i) identifying a group of samples wherein at least one sample in the group has a plurality of compounds in common with at least one other sample in the group, wherein the plurality of compounds can be present in different relative amounts, (ii) generating sample ions from the sample using surface desorption ionization source (e.g., an ambient ionization source), (iii) analyzing the sample ions using a mass spectrometer to determine relative amounts of the plurality of compounds for each sample in the group of samples, (iv) establishing one or more correlations between the relative amounts of the plurality of compounds and the samples, (v) generating samples ions from an unknown sample using a surface desorption ionization source, (vi) analyzing the sample ions from the unknown samples using a mass spectrometer to determine the relative amounts of the plurality of common compounds in the unknown sample, and (vii) authenticating the unknown sample based on the one or more correlations.

In another aspect, the present disclosure relates to a method for authenticating a sample including (i) determining the identity and relative amount of at least two compounds in the sample, (ii) generating sample ions from the sample using an surface desorption source, (iii) analyzing the sample using a mass spectrometer to determine the relative amounts of the at least two compounds in the sample, and (iv) authenticating the sample based on the identity and relative amount of the at least two compounds in a sample.

In another aspect, the present disclosure relates to a method for authenticating an unknown sample including (i) generating sample ions from the unknown sample using a surface desorption ionization source, (ii) receiving the ions into a mass spectrometer, (iii) identifying at least one unknown sample related sub-population or group in the unknown sample, (iv) comparing the identified unknown sample related sub-population or group in the unknown sample to one or more known profiles, and (v) authenticating the unknown sample based on the comparison.

In another aspect, the present disclosure relates to an apparatus including (i) a surface desorption ionizer (e.g., an ambient ionizer) capable of generating sample ions from a group of samples having at least two common compounds, wherein the compounds can be present in different relative amounts, (ii) a mass spectrometer, and, (iii) software capable of establishing one or more correlations between the relative amounts of the at least two common compounds determine by the mass spectrometer to allow authentication of an unknown sample.

The methods and apparatus of the present disclosure can be used to perform real time analysis or authentication of various samples, e.g., spices, oils, tobacco, whiskey, etc. using surface desorption ionization and mass spectrometry detection, e.g., DART®-QDa® or REIMS-QDa®. The methods and apparatus of the present disclosure provide numerous advantages. For example, the real time analysis used herein requires little to no sample preparation, involves a simple user interface and allows for targeted authentication via mass analysis or model building using low cost instrumentation. Using direct analysis of samples in combination with simple mass detection also allows for rapid screening, the elimination of a separation or chromatography step, and ease of use.

BRIEF DESCRIPTION OF THE DRAWINGS

The foregoing and other advantages provided by the present disclosure will be more fully understood from the following description of exemplary embodiments when read together with the accompanying drawings, in which:

In FIG. 3A the Quick-Strip™ sample card (IonSense, Inc., Saugus Mass.) is automatically moved into a heated helium ionization beam of the ionization source (e.g., DART® ionization source (IonSense, Inc., Saugus, Mass.). In FIG. 3B a ceramic tube pulls ions into a mass spectrometer, (e.g., a QDa® mass spectrometer, Waters Corporation, Milford, Mass.). A portion of the mass spectrometer is shown in the top half of FIG. 3B, a portion of the ionization source is shown in the bottom half, and the sample card is positioned therebetween.

FIG. 9 shows exemplary results from an analysis of oil supplements for omega fatty acids using the ambient ionization and mass spectrometry detection technique. The average percent of each fatty acid determined is consistent with the amount expected.

FIG. 11 shows exemplary masses monitored on a mass spectrometer (e.g., QDa® mass spectrometer, Waters Corporation, Milford, Mass.) using SIR mode. The asterisks (*) denote fatty acids expected to be present in the oil supplement samples.

FIG. 20 shows a comparison of the expected and experimental (n=10) percentage of each fatty acid present in the standard mix as tested in Example 2.

FIG. 33 shows mass spectra of bright leaf and cigar leaf after methanol extraction as tested in Example 4.

DETAILED DESCRIPTION

Figure 1:
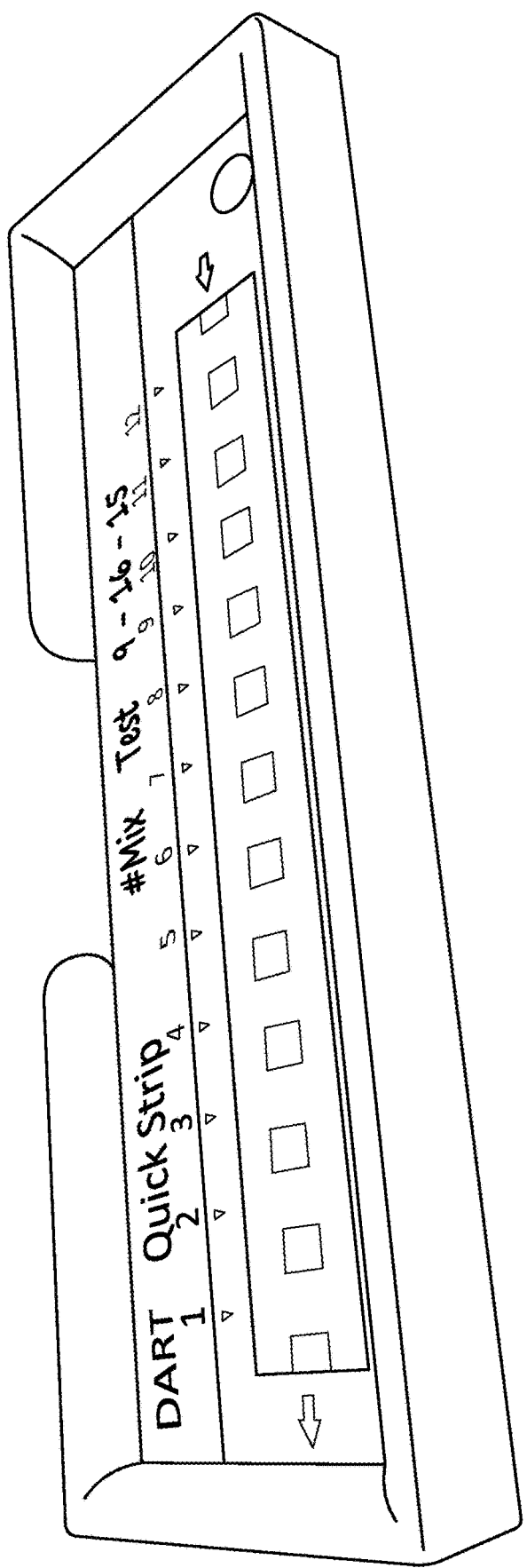
FIG. 1 shows an exemplary twelve spot sample card (e.g., QuickStrip™ sample card available from IonSense, Inc., Saugus, Mass.) for sampling using an ambient ionization source.

The present disclosure relates generally to rapid authentication methods using ambient ionization and mass spectrometry detection. In particular, the disclosure relates to rapid methods of authentication of commercial or consumer products using portable, low cost ambient ionization and a single quadrupole mass spectrometer. The on-line mass spectrometric analysis can generate one or more mass spectra for the sample(s), which can be analyzed to classify the sample(s) and plurality of compounds. Multivariate statistical analysis of spectrometric data can be used to distinguish and identify different samples.

In one embodiment, the present disclosure relates to a method for authenticating an unknown sample including (i) identifying a group of samples wherein at least one sample in the group has a plurality of compounds in common with at least one other sample in the group, wherein the plurality of compounds can be present in different relative amounts, (ii) generating sample ions from the sample using surface desorption ionization source (e.g., an ambient ionization source), (iii) analyzing the sample ions using a mass spectrometer to determine relative amounts of the plurality of compounds for each sample in the group of samples, (iv) establishing one or more correlations between the relative amounts of the plurality of compounds and the samples, (v) generating samples ions from an unknown sample using a surface desorption ionization source, (vi) analyzing the sample ions from the unknown samples using a mass spectrometer to determine the relative amounts of the plurality of common compounds in the unknown sample, and (vii) authenticating the unknown sample based on the one or more correlations.

The sample, or group of samples, can be any sample(s) containing a plurality, e.g., two or more, of compounds in common. The common compounds can be those which can be effectively tested (e.g., identified and quantified) using the surface desorption ionization-mass spectrometry methods and apparatus described herein. In one embodiment, the sample is related to various production processes, in-process and finished samples, including a food, a diet supplement, a drug, a plant, a spice, oils, tobacco, whiskey, etc. In particular, the method and apparatus of the present disclosure can be used for real time analysis or authentication of a commercial or commodity goods including cinnamon samples, omega fatty acids, etc.

The sample can be in any form, such as a solid, liquid or gas. A gas sample can be one isolated from the headspace of a solid or liquid sample. The plurality of compounds can be those which can be effectively identified and quantified using surface desorption ionization-mass spectrometry. The plurality of compounds can be, or at least can be, 2, 3, 4, 5, 6, 7, 8, 9, 10, 11, 12, 13, 14, 15, 16, 17, 18, 19, 20 or more different compounds. These values can be used to define a range, such as between about 2 to 10 compounds. In one embodiment, the plurality of compounds is 2. In another embodiment, the plurality of compounds is 3.

The plurality of compounds can be related to one another by one or more characteristics. The plurality of compounds can have a similar moiety, such as they can be omega fatty acids. The plurality of compounds can have similar molecular weights, such as the common compounds can have molecular weights within about a 20, 30, 40, 50, 60, 70, 80, 90, 100, 120, 140, 160, 180, 200, 300, 400, 500, 600, 700, 800, 900, 1000, 1100, 1200, 1300, 1400, 1500, 1600, 1700, 1800, 1900 or about 2000 Dalton range. These values can be used to define a range, such as about 50 to about 200 Daltons. These values can also define an absolute mass range to be interrogated by the mass spectrometer, such as about 50 to about 1200 Daltons. The mass or molecular weight ranges can also be selected from the group consisting of <or> 200, 200-400, 400-600, 600-800, 800-1000, 1000-1200, 1200-1400, 1400-1600, 1600-1800, 1800-2000 and <or> 2000.

The plurality of compounds can be present in different relative amounts in the different samples. The difference in the amount of each of the plurality of compounds to others compounds can be, or can be less than, about 10%, 20%, 30%, 40%, 50%, 60%, 70%, 80%, 90%, 100%, 200%, 300%, 400% or 500%. These values can be used to define a range, such as about 20% to about 100%. The plurality of compounds can be selected from the major compounds present in the samples. Each of the plurality of common compounds can be selected from compounds that comprise at least 1%, 2%, 3%, 4%, 5%, 6%, 7%, 8%, 9%, 10%, 15% or about 20% of the total peak area determined by the mass spectrometer. These values can be used to define a range, such as about 1% to about 10%.

The sample ions can be generated using any desorption ionization (DI) source or technique capable of effectively sampling the common compounds from a sample for introduction into a mass spectrometer. The desorption ionization source or technique can also be any capable of real-time, rapid in-situ testing of solid, liquid or gas samples. In one embodiment, the desorption ionization source is a surface desorption ionization source or technique. Ambient ionization techniques are particularly advantageous since these techniques do not require the addition of a matrix or a reagent (and hence are suitable for direct sample analysis) and enable a rapid simple analysis of target material to be performed.

In one embodiment, the analysis of food samples, e.g., cinnamon, using a surface desorption ionization-mass spectrometry system is provided. In another embodiment, the analysis of supplement samples, e.g., fatty acids, using a surface desorption ionization-mass spectrometry system is provided. Fatty acids are particularly suited for surface desorption ionization because fatty acids can be in high abundance in biological and food samples, and they can ionize well in negative mode under DI conditions. In other embodiments, the analysis of tobacco or whiskey samples using a surface desorption ionization-mass spectrometry system is provided.

The surface desorption ionization source can operate by a technique selected from the group consisting of electrospray ionization, nano-electrospray ionization, matrix-assisted laser desorption ionization, atmospheric pressure chemical ionization, desorption electrospray ionization, atmospheric pressure dielectric barrier discharge ionization, atmospheric pressure thermal desorption ionization, laser-assisted electrospray ionization, and electrospray-assisted laser desorption ionization. The source can be one that generate ions, typically M+H and M−H.

In particular, the surface desorption ionization source can operate by a technique selected from the group consisting of atmospheric solid analysis probe (i.e., ASAP), direct analysis in real time (DART), rapid evaporative ionization mass spectrometry (REIMS), desorption electrospray ionization (DESI), matrix assisted laser desorption ionization (MALDI), nano structure and initiated mass spectrometry (NIMS).

The ionization source can also be selected from the group consisting of a laser desorption ionization ("LDI") ion source; a thermal desorption ion source; a laser diode thermal desorption ("LDTD") ion source; a desorption electro-flow focusing ("DEFFI") ion source; a dielectric barrier discharge ("DBD") plasma ion source; an ultrasonic assisted spray ionization ion source; an easy ambient sonic-spray ionization ("EASI") ion source; a desorption atmospheric pressure photoionization ("DAPPI") ion source; paperspray ("PS") ion source; a jet desorption ionization ("JeDI") ion source; a touch spray ("TS") ion source; a nano-DESI ion source; a laser ablation electrospray ("LAESI") ion source; a probe electrospray ionization ("PESI") ion source; a solid-probe assisted electrospray ionization ("SPA-ESI") ion source; a focussed or unfocussed ultrasonic ablation device; a microwave resonance device; and a pulsed plasma RF dissection device.

A list of ambient ionization techniques are given in the following table:

| Acronym | Ionization technique |
| --- | --- |
| DESI | Desorption electrospray ionization |
| DeSSI | Desorption sonic spray ionization |
| DAPPI | Desorption atmospheric pressure photoionization |
| EASI | Easy ambient sonic-spray ionization |
| JeDI | Jet desorption electrospray ionization |
| TM-DESI | Transmission mode desorption electrospray ionization |
| LMJ-SSP | Liquid microjunction-surface sampling probe |
| DICE | Desorption ionization by charge exchange |
| Nano-DESI | Nanospray desorption electrospray ionization |
| EADESI | Electrode-assisted desorption electrospray ionization |
| APTDCI | Atmospheric pressure thermal desorption chemical ionization |
| V-EASI | Venturi easy ambient sonic-spray ionization |
| AFAI | Air flow-assisted ionization |
| LESA | Liquid extraction surface analysis |
| PTC-ESI | Pipette tip column electrospray ionization |
| AFADESI | Air flow-assisted desorption electrospray ionization |
| DEFFI | Desorption electro-flow focusing ionization |
| ESTASI | Electrostatic spray ionization |
| PASIT | Plasma-based ambient sampling ionization transmission |
| DAPCI | Desorption atmospheric pressure chemical ionization |
| DART | Direct analysis in real time |
| ASAP | Atmospheric pressure solid analysis probe |
| APTDI | Atmospheric pressure thermal desorption ionization |
| PADI | Plasma assisted desorption ionization |
| DBDI | Dielectric barrier discharge ionization |
| FAPA | Flowing atmospheric pressure afterglow |
| HAPGDI | Helium atmospheric pressure glow discharge ionization |
| APGDDI | Atmospheric pressure glow discharge desorption ionization |
| LTP | Low temperature plasma |
| LS-APGD | Liquid sampling-atmospheric pressure glow discharge |
| MIPDI | Microwave induced plasma desorption ionization |
| MFGDP | Microfabricated glow discharge plasma |
| RoPPI | Robotic plasma probe ionization |
| PLASI | Plasma spray ionization |
| MALDESI | Matrix assisted laser desorption electrospray ionization |
| ELDI | Electrospray laser desorption ionization |
| LDTD | Laser diode thermal desorption |
| LAESI | Laser ablation electrospray ionization |
| CALDI | Charge assisted laser desorption ionization |
| LA-FAPA | Laser ablation flowing atmospheric pressure afterglow |
| LADESI | Laser assisted desorption electrospray ionization |
| LDESI | Laser desorption electrospray ionization |
| LEMS | Laser electrospray mass spectrometry |
| LSI | Laser spray ionization |
| IR-LAMICI | Infrared laser ablation metastable induced chemical ionization |
| LDSPI | Laser desorption spray post-ionization |
| PAMLDI | Plasma assisted multiwavelength laser desorption ionization |
| HALDI | High voltage-assisted laser desorption ionization |
| PALDI | Plasma assisted laser desorption ionization |
| ESSI | Extractive electrospray ionization |
| PESI | Probe electrospray ionization |
| ND-ESSI | Neutral desorption extractive electrospray ionization |
| PS | Paper spray |
| DIP-APCI | Direct inlet probe-atmospheric pressure chemical ionization |
| TS | Touch spray |
| Wooden-tip | Wooden-tip electrospray |
| CBS-SPME | Coated blade spray solid phase microextraction |
| TSI | Tissue spray ionization |
| RADIO | Radiofrequency acoustic desorption ionization |
| LIAD-ESI | Laser induced acoustic desorption electrospray ionization |
| SAWN | Surface acoustic wave nebulization |
| UASI | Ultrasonication-assisted spray ionization |
| SPA-nanoESI | Solid probe assisted nanoelectrospray ionization |
| PAUSI | Paper assisted ultrasonic spray ionization |
| DPESI | Direct probe electrospray ionization |
| ESA-Py | Electrospray assisted pyrolysis ionization |
| APPIS | Ambient pressure pyroelectric ion source |
| RASTIR | Remote analyte sampling transport and ionization relay |
| SACI | Surface activated chemical ionization |
| DEMI | Desorption electrospray metastable-induced ionization |
| REIMS | Rapid evaporative ionization mass spectrometry |
| SPAM | Single particle aerosol mass spectrometry |
| TDAMS | Thermal desorption-based ambient mass spectrometry |
| MAII | Matrix assisted inlet ionization |
| SAII | Solvent assisted inlet ionization |
| SwiFERR | Switched ferroelectric plasma ionizer |
| LPTD | Leidenfrost phenomenon assisted thermal desorption |

The desorption ionization source can be small and have a small footprint. The desorption ionization source can also be suitable or compatible with ambient mass spectrometry, e.g., a mass spectrometer operating at or near atmospheric pressure. In one embodiment, the desorption ionization source or technique is DART, ASAP, REIMS or DESI. These ionization sources can be small and compatible with ambient mass spectrometry.

Direct Analysis in Real Time is an atmospheric pressure ion source that can instantaneously ionize gases, liquids or solids in open air under ambient conditions. It is an ambient ionization technique that does not require sample preparation, so materials can be analyzed by mass spectrometry in their native state. Ionization can take place directly on the sample surface. Liquids can be analyzed by, for example, dipping an object (such as a glass rod) into the liquid sample and then presenting it to the ion/ionization source (e.g., DART® ionization source, IonSense, Inc., Saugus, Mass.). Vapors can be introduced directly into the gas stream of the ionization source.

Atmospheric Solids Analysis Probe is an atmospheric pressure ion source that can directly analyze samples using an atmospheric pressure ionization (API) source. The ASAP probe can analyze solid, liquid, tissue, or material samples. In ASAP, vaporization of a sample can occur when it is exposed to a hot desolvation gas, e.g., nitrogen, from an probe, e.g., an electrospray ionization or atmospheric pressure chemical ionization probe.

Rapid Evaporative Ionization Mass Spectrometry (REIMS) is an ionization technique that can be used as a source for direct analysis of samples by mass spectrometry. REIMS is an atmospheric pressure ion source that can ionize gases, liquids or solids in open air under ambient conditions. The REIMS ionization source can be a probe that can be used to remotely test the samples. See U.S. Patent Publication No. 2012/0156712, the disclosure of which is incorporated herein in its entirety.

Using REIMS, generating sample ions can include contacting a sample with one or more electrodes. Generating sample ion can include applying an AC or RF voltage to the one or more electrodes in order to generate the sample.

Applying the AC or RF voltage to the one or more electrodes can include applying one or more pulses of the AC or RF voltage to the one or more electrodes.

Generating the sample ions, by REIMS or other sources, can include forming uncharged aqueous droplets. At least 50%, 55%, 60%, 65%, 70%, 75%, 80%, 85%, 90% or 95% of the mass or matter generated can be in the form of droplets. The Sauter mean diameter ("SMD", d32) of the droplets can be in a range selected from the group consisting of: (i) <or> 5 μm; (ii) 5-10 μm; (iii) 10-15 μm; (iv) 15-20 μm; (v) 20-25 μm; and (vi) <or> 25 μm. The generated sample ions, droplets, or both can traverse a flow region with a Reynolds number (Re) in a range selected from the group consisting of: (i) <or> 2000; (ii) 2000-2500; (iii) 2500-3000; (iv) 3000-3500; (v) 3500-4000; and (vi) <or> 4000. The droplets can have, such as substantially at the point of generating the droplets, a Weber number (We) in a range selected from the group consisting of: (i) <or> 50; (ii) 50-100; (iii) 100-150; (iv) 150-200; (v) 200-250; (vi) 250-300; (vii) 300-350; (viii) 350-400; (ix) 400-450; (x) 450-500; (xi) 500-550; (xii) 550-600; (xiii) 600-650; (xiv) 650-700; (xv) 700-750; (xvi) 750-800; (xvii) 800-850; (xviii) 850-900; (xix) 900-950; (xx) 950-1000; and (xxi) <or> 1000. The droplets can have, such as substantially at the point of generating the droplets, a Stokes number ($S_k$) in a range selected from the group consisting of: (i) 1-5; (ii) 5-10; (iii) 10-15; (iv) 15-20; (v) 20-25; (vi) 25-30; (vii) 30-35; (viii) 35-40; (ix) 40-45; (x) 45-50; and (xi) <or> 50. The droplets can have, such as substantially at the point of generating the droplets, a mean axial velocity in a range selected from the group consisting of: (i) <or> 20 m/s; (ii) 20-30 m/s; (iii) 30-40 m/s; (iv) 40-50 m/s; (v) 50-60 m/s; (vi) 60-70 m/s; (vii) 70-80 m/s; (viii) 80-90 m/s; (ix) 90-100 m/s; (x) 100-110 m/s; (xi) 110-120 m/s; (xii) 120-130 m/s; (xiii) 130-140 m/s; (xiv) 140-150 m/s; and (xv) <or> 150 m/s.

Desorption electrospray ionization (DESI) is an ambient ionization technique that can be used in mass spectrometry for chemical analysis. It is an atmospheric pressure ion source that ionizes gases, liquids and solids in open air under ambient conditions. DESI is a combination of electrospray (ESI) and desorption (DI) ionization methods. Ionization can take place by directing an electrically charged mist to a sample surface. The electrospray mist can be attracted to the surface by applying a voltage on the sample or sample holder. After ionization, the ions can travel through air into the atmospheric pressure interface which can be connected to a mass spectrometer.

Thermal desorption ionization can be used as the ionization mechanism. The sample, and biological components, can be exposed to different temperatures to induce ionization. See U.S. Patent Publication No. 2013/0299688, the disclosure of which is incorporated herein in its entirety.

In some embodiments, the energy or temperature of the ionization source may not be sufficiently high to efficiently ionize a representative amount of common compounds. For example, the sample may contain some common compounds having different properties, such as different volatilities. At a certain energy level or temperature, some common compounds may be ionized more readily than others, which can create a significant bias at that energy level or temperature that relative amounts or one or more correlations cannot be made. In one embodiment, the present disclosure includes a step of determining a sufficient energy level (e.g., temperature in thermal desorption) to ionize a representative sample of all common compounds such that relative amounts or one or more correlations can be made. For example, the energy level can be tested at increasing values until the intensities for a sufficient number of the common compounds stabilize at a suitable level. In one embodiment, an ionization temperature is selected that selectively increases the ionization efficiently of the plurality of common compounds.

The method can also be robust such that the sampling does not exhaust the common compounds in the sample. The ionization process can involve a short, e.g., less than about 10 seconds, 9, 8, 7, 6, 5, 4, 3, 2, 1, 0.5, 0.2 or about 0.1 seconds, exposure of the ionization source to the sample. Longer periods of time can increase signal to noise ratio whilst shorter periods of time can speed up the spectrometric analysis process. In some embodiments, one or more samples or standards (e.g., known samples) can be obtained over a longer period of time to improve signal to noise ratio. In some embodiments, one or more unknown samples can be obtained over a shorter period of time to speed up the classification (e.g., authentication) process.

The sample can be tested neat. Alternatively, one or more preparation steps can be performed to prepare the sample for testing. For example, the sample can be diluted in an appropriate solvent, such as for ease of handling. The sample can be manipulated to access the portion of the sample to be tested, such as a drug capsule. The capsule portion can be removed or otherwise circumvented to access the sample. For example, the sample can be a capsule containing a specific dosage of omega-6 fatty acids and omega-3 fatty acids. The sample preparation can include removing a portion of the contents from inside the capsule.

Figure 2:
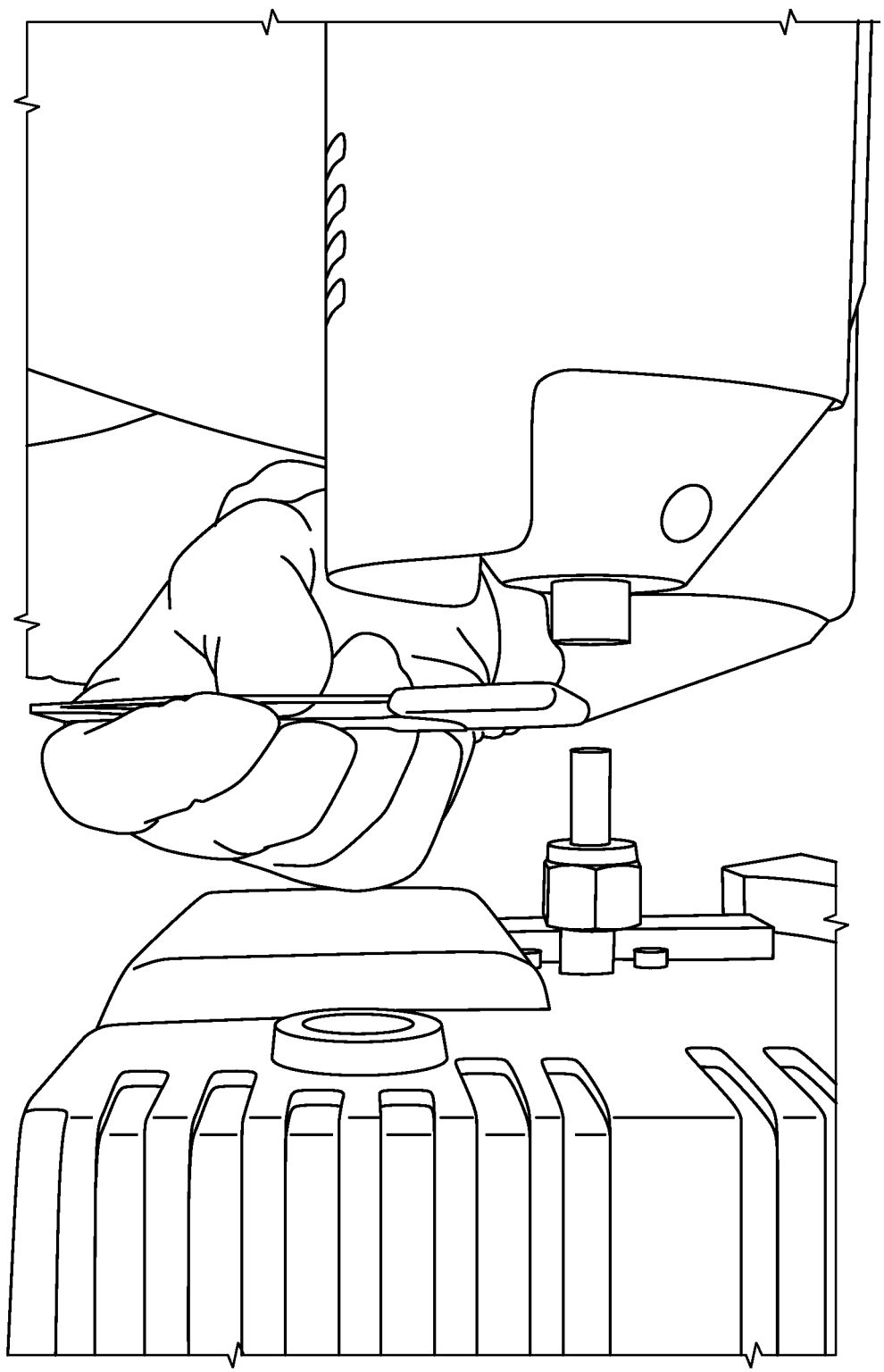
FIG. 2 shows an exemplary solid sampling technique using direct analysis in real time technology, such as, for example using DART® ionization source and methods available from IonSense, Inc., Saugus, Mass.).

FIG. 1 shows an exemplary twelve spot QuickStrip™ sample card (available from IonSense, Inc. Saugus, Mass.) for sampling using an ambient ionization source. The samples, either neat, diluted, or prepared can be applied to the card by physically placing, rubbing, dripping, etc. the sample onto the card spots. Solid sample can also be tested. FIG. 2 shows an exemplary solid sampling technique with an ambient ionization source, such as for example, DART® ionization source, available from IonSense, Inc. Saugus, Mass. The solid sample is held in or near the interface between the ionizer and the mass spectrometer.

Figure 3:
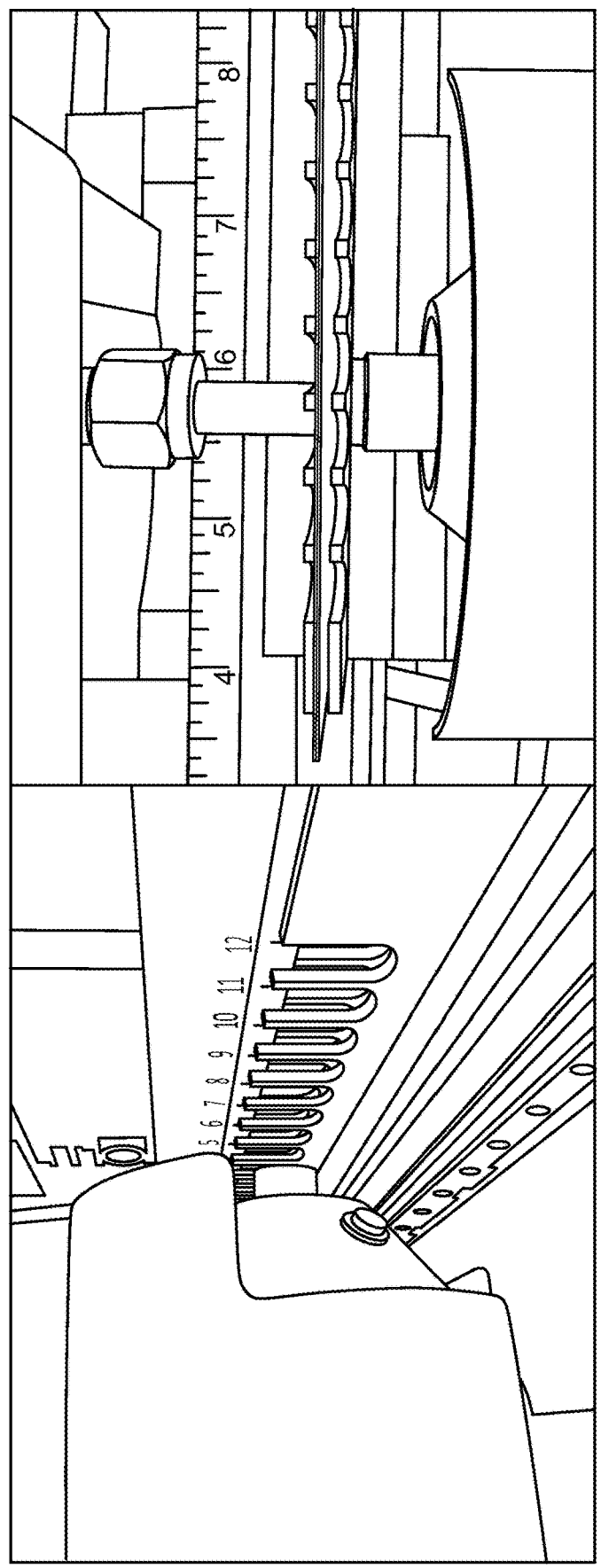
FIG. 3 shows an exemplary liquid sampling technique using direct analysis in real time.
Figure 4:
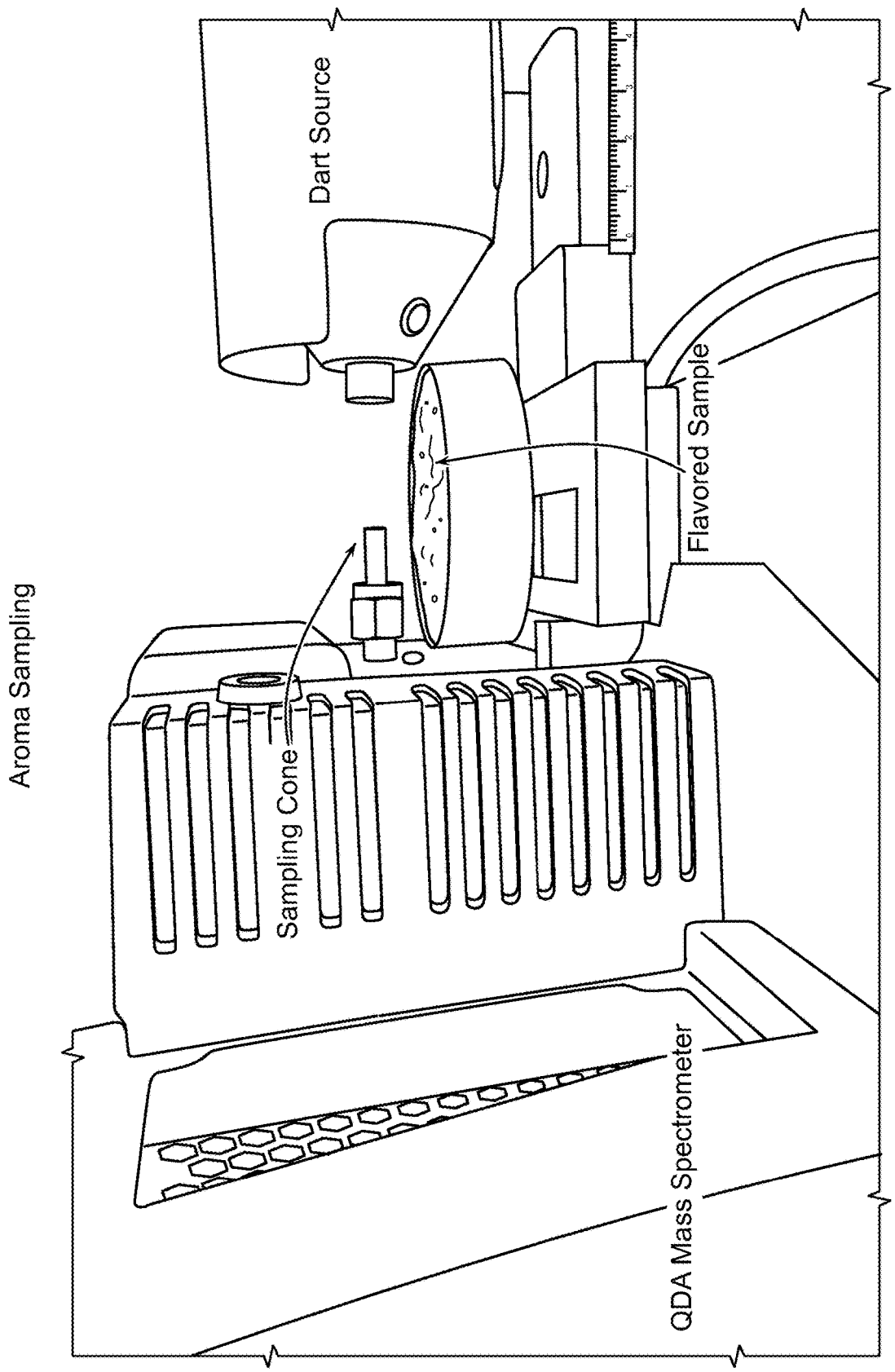
FIG. 4 shows an exemplary aroma sampling technique using DART® technology (IonSense, Inc., Saugus Mass.) wherein no sample preparation or sample presentation is used with the flavored sample. The DART® ionization source (IonSense, Saugus, Mass.) is shown across from the QDa® mass spectrometer sampling cone (Waters Corporation, Milford, Mass.).

FIG. 3 shows an exemplary liquid sampling technique using direct analysis in real time technology (e.g., DART® technology available from IonSense, Inc. Saugus, Mass.). In FIG. 3A the QuickStrip™ sample card (IonSense, Inc., Saugus Mass.) is automatically moved into a heated helium ionization beam of the ionization source (e.g., DART® ionization source (IonSense, Inc., Saugus, Mass.). In FIG. 3B a ceramic tube pulls ions into a mass spectrometer, (e.g., a QDa® mass spectrometer, Waters Corporation, Milford, Mass.). A portion of the mass spectrometer is shown in the top half of FIG. 3B, a portion of the ionization source is shown in the bottom half, and the sample card is positioned therebetween. For samples that have volatile compounds, the solid sample can be place in, near or slightly away from the interface. FIG. 4 shows an exemplary aroma sampling technique with DART® technology (IonSense, Inc., Saugus, Mass.) wherein no sample preparation or sample presentation is used with the flavored sample. The DART® ionization source is shown across from the QDa® mass spectrometer sampling cone.

The generation of samples ions by the ionizer can be performed in a controlled atmosphere. The ionizer can be fitted with a mechanism or physical enclosure that can contain the sample and exclude extraneous compounds from other samples, standards or the environment. In one embodiment, the ionizer is contained within a positive pressure cell to control the atmosphere during ionization.

In some embodiments, the methodology of the present disclosure can be performed, e.g., (i)-(vii), including no sample preparation, no chromatographic step, or both. The relative amounts of the common compounds, the authentication, or both can be performed without extraction, hydrolysis, filtration, derivatization, chromatographic separation (e.g., GC-FID) or combinations thereof. The prior art methodology involves one or more of these steps and can take hours to complete, e.g., at least about 2 hours. The method of the present disclosure can reduce the analysis time by about 10%, 20, 30, 40, 50, 60, 70, 80, 90, 100, 200, 300, 500, or about 1000%. These values can also be used to define a range, such as between about 20% and about 50%.

The sample ions can be analyzed using a mass spectrometer to determine relative amounts of the plurality of compounds for each sample in the group of samples. The analysis may be qualitative and/or quantitative. The analysis can involve determining the concentration, percentage, relative abundance or the like of a compound or plurality of compounds. The sample ions can be received or introduced to a mass spectrometer by any means or technique capable of effectively introducing ions into a mass spectrometer that can allow for real-time, rapid in-situ testing of solid or liquid samples. For example, the ions can be introduced under ambient conditions.

The mass spectrometer can be any mass spectrometer capable of receiving the sample ions, of producing accurate mass measurements, identifying common compounds, quantifying common compounds, or combinations thereof. The mass spectrometer can be a single quadrupole mass spectrometer, a tandem quadrupole mass spectrometer, an ion mobility mass spectrometer, a time-of-flight mass spectrometer, or any combination thereof. For example, the mass spectrometer can be a single quadrupole mass detector, such as QDa® mass spectrometry detector available from Waters Corporation, Milford, Mass. The system including the attached mass spectrometer, can be, e.g., a DART®-QDa® (available from the combination of IonSense, Inc. Saugus Mass. and Waters Corporation, Milford, Mass.) or a REIMS-QDa® (available from Waters Corporation, Milford, Mass.), or any other ambient ionization source attached to a mass spectrometer.

Analyzing the sample ions can include determining the mass, mass to charge ratio and/or ion mobility of the ions. It can include generating a plurality of fragment ions and/or reaction ions from precursor ions. It can also include scanning, separating and/or filtering the ions. The sample ions can be scanned, separated and/or filtered according to one or more of: mass; mass to charge ratio; ion mobility; and charge state.

The common compounds can be analyzed by selection reaction monitoring in a quadrupole instrument. Selection reaction monitor involves pre-selection of a list of ions of interest or extracted from full scan accurate mass spectra, in which no ion is preselected but the quadrupole is scanned along all the mass range selected (e.g., 50-100 m/z).

The mass spectrometer can be operated in positive or negative mode. In one embodiment, the mass spectrometer is operated in negative mode under desorption ionization conditions. In another embodiment, the mass spectrometer is operated in positive mode. The coupling of a mass spectrometer, e.g., a single quadrupole device, with desorption ionization can also allow for the direct analysis of common compounds as a function of peak intensity or peak area, or as a ratio between peaks or groups of peaks. The ratio of peaks, e.g., common compounds or other common compounds not used for authentication, can be used to normalize for variation in instrument settings and sampling. In other embodiments, the peaks are not used normalize, but can be used to check system performance, e.g., system suitability check. For example, a variation in intensity of one compound can be compensated by an equivalent variation in another compound. Their ratio can be used to normalize for difference between samples. In other embodiments, no normalization is used. However, the relative intensities of ions across samples can be used to give confidence that the system is performing properly.

The relative amounts of the plurality of compounds for each sample in the group of samples can be determined from the mass spectrometry results. The relative amounts can be calculated using the intensity or area of the peaks, e.g., based on relative ion intensities. The relative amounts can be calculated with or without the use of an internal standard. The relative amounts can be a simple ratio of the intensities or areas of the mass signals. The use of an internal standard can provide semi-quantification. For example, internal standards can be used to normalize the concentration of the common compounds in the samples to obtain a more quantitative measurement.

The method of the present disclosure can determine the relative amounts of the common compounds, and the authentication of unknown samples, in a shorter time that methodology of the prior art. The method can determine the relative amounts, perform the authentication, or both, within 10 seconds, 20, 30, 40, 50 or 60 seconds, 2 minutes, 3, 4, 5, or about 10 minutes. These values can also be used to define a range, such as between about 10 second to about 1 minute. In another embodiment, the present disclosure can determine the relative amounts, perform the authentication, or both, without sending a sample to a laboratory for analysis. The methodology can be used as a remote, on-site diagnostic test.

Usually after the samples or standards are tested, unknown samples can be tested. Samples ions from an unknown sample can be generated using the a surface desorption ionization source. The sample ions can be analyzed using a mass spectrometer to determine the relative amounts of the plurality of common compounds in the unknown sample.

The methods of the present disclosure, including analysis of the sample ions and establishing one or more correlations, can involve analysis of spectral data; more particularly, the analysis of spectral data from a sample, or an unknown sample. The analysis can be based solely on the analysis of spectral data, or involve one or more further analytical tools. In some embodiments, the mass spectral data can provide direct information about the compound, plurality of compounds, sample, unknown sample, or combinations thereof. For example, if a specific mass spectral signal pattern is present, then obtaining this signal pattern from a sample can provide direct information about the presence, identity and/or characteristics of that compound.

Mass spectral data obtained from a known sample or standard can be referred to as "reference", "control" or "comparator" mass spectral data. Analysing mass spectral data can include analyzing one or more sample spectra so as to classify a sample. This can include developing a classification model or library, such as for use in the one or more correlations, using one or more reference sample spectra, or can include using an existing library.

The analysis can also be made to determine whether mass spectral data obtained from an unknown sample matches or corresponds sufficiently to the "reference", "control" or "comparator" mass spectral data to make a positive determination.

The term "reference" mass spectral data is used herein to mean mass spectral data from a known sample or compound. Reference mass spectral data can be publicly available, or can be generated as a library of reference mass spectral data. The method can involve comparing the mass spectral data to one or more reference mass spectral data. If the mass spectral data obtained from an unknown sample matches or corresponds sufficiently to a reference mass spectral data, then a positive determination can be made. If the mass spectral data obtained from an unknown sample does not match or correspond sufficiently to a reference mass spectral data, then a negative determination can be made.

The term "comparator" mass spectral data is used herein to mean mass spectral data obtained from a second known sample or standard. The first and second standard samples can be different samples or different locations of the same sample. The method can involve comparing the mass spectral data to one or more comparator mass spectral data. If the mass spectral data obtained from an unknown sample matches or corresponds sufficiently to a comparator mass spectral data, then a positive determination can be made. If the mass spectral data obtained from an unknown sample does not match or correspond sufficiently to a comparator mass spectral data, then a negative determination can be made.

The term "control" mass spectral data is used herein to mean mass spectral data obtained from a known sample at an earlier point in time. If the mass spectral data obtained from an unknown sample matches or corresponds sufficiently to a control mass spectral data, then a positive determination can be made. If the mass spectral data obtained from an unknown sample does not match or correspond sufficiently to a control mass spectral data, then a negative determination can be made.

By a "positive determination" is meant that the presence, identity and/or characteristics of a compound, a plurality of compounds, a sample or standard sample is determined. For example, a positive determination can involve determining that a plurality of compounds is present, that an unknown sample has a certain characteristic, and/or has a certain ratio and presence of the plurality of compounds. By a "negative determination" is meant that the absence of a compound, a plurality of compounds, a sample or standard sample is determined, and/or that it is determined that an unknown sample does not have a particular identity, ratio and/or characteristic.

The terms "mass spectral library" and "mass spectral database" are used interchangeably herein. The skilled person can use any publicly available mass spectral data as reference mass spectral data. Alternatively or in addition, a mass spectral library can be used by obtaining mass spectral data from one or more known samples.

After the known samples, unknown samples or both are tested, one or more correlations between the relative amounts of the plurality of compounds and the samples can be established. The one or more correlations can be the peak area ratios of one or more of the common compounds to the known sample or standard. The closer the match or matches of the peak ratios to the known sample or standard, i.e., the better the correlation, the better the confidence or accuracy of authentication (or rejection) of the unknown sample. In one embodiment, the method includes obtaining one or more sample spectra and identifying the sample spectra or unknown sample spectra using one or more classification models and/or libraries. The classification model and/or library can be built based on one or more reference or standard sample spectra for the sample(s). The classification model and/or library can then be used when testing unknown samples.

The method of the present disclosure can include establishing one or more correlations by determining peak intensity or area of the plurality of common compounds, such as two, and determining peak intensity or area ratios between the plurality of common compounds, e.g., two, that correspond to at least one sample characteristic, such as a positive identification of the sample. In one embodiment, the plurality of compounds in common is at least two common compounds and the correlation is the ratio of peak area between the at least two common compounds. For example, a standard can have two common compounds. The peak area ratio of the two common compounds in the standard sample is 3:1. An unknown sample can be tested and the peak area ratio of the two common compounds determined. If the peak area ratio is the same as, or within 1%, 2%, 3%, 4%, 5%, 6%, 7%, 8%. 9%, 10%, 15%, 20% or about 25% of the standard value then the unknown sample is matched with, or authenticated, to the standard. These values can define a range, such as between about 2% and about 10%.

The authentication of an unknown sample can be performed with high accuracy, or confidence. The authentication can be performed with an accuracy over 50%, 60%, 70%, 80%, 90, 95%, 98%, 99%, 99.9% or 100%. These values can be used to define a range, such as 80% to 100%. The more strict the requirement for a match e.g., requiring within 1% peak area ratio, the less false positives for an authentication. The less strict the requirement, the more false positives.

The one or more correlations can be established using targeted mass analysis, as provided above, or by model building. The correlations can be established by analyzing the one or more spectra using one or more of: univariate analysis, multivariate analysis, principal component analysis (PCA), linear discriminant analysis (LDA), maximum margin criteria (MMC), library-based analysis, soft independent modeling of class analogy (SIMCA), factor analysis (FA), recursive partitioning (decision trees), random forests, independent component analysis (ICA), partial least squares discriminant analysis (PLS-DA), orthogonal (partial least squares) projections to latent structures (OPLS), PLS discriminant analysis (OPLS-DA), support vector machines (SVM), (artificial) neural networks, multilayer perceptron, radial basis function (RBF) networks, Bayesian analysis, cluster analysis, a kernelized method, and subspace discriminant analysis. In one embodiment, the one or more correlations can be established by multivariate analysis.

A list of analysis techniques are given in the following table:

| Analysis Techniques |
|---|
| Univariate Analysis |
| Multivariate Analysis |
| Principal Component Analysis (PCA) |
| Linear Discriminant Analysis (LDA) |
| Maximum Margin Criteria (MMC) |
| Library Based Analysis |
| Soft Independent Modelling Of Class Analogy (SIMCA) |
| Factor Analysis (FA) |
| Recursive Partitioning (Decision Trees) |
| Random Forests |
| Independent Component Analysis (ICA) |

-continued

Analysis Techniques

Partial Least Squares Discriminant Analysis (PLS-DA)
Orthogonal (Partial Least Squares) Projections To Latent Structures (OPLS)
OPLS Discriminant Analysis (OPLS-DA)
Support Vector Machines (SVM)
(Artificial) Neural Networks
Multilayer Perceptron
Radial Basis Function (RBF) Networks
Bayesian Analysis
Cluster Analysis
Kernelized Methods
Subspace Discriminant Analysis PCA is mathematically defined as an orthogonal linear transformation that transforms the data to a new coordinate system such that the greatest variance by any projection of the data comes to lie on the first coordinate (called the first principal component), the second greatest variance on the second coordinate, and so on. PCA can be used for dimensionality reduction in a data set by retaining those characteristics of the data set that contribute most to its variance, by keeping lower-order principal components and ignoring higher-order ones. Such low-order components often contain the "most important" aspects of the data. The common compound peaks for any given sample can be segregated into distinguishing clusters using principle component analysis (PCA).

In one embodiment, analyzing the one or more sample spectra can include principal component analysis (PCA). In these embodiments, a PCA model can be calculated by finding eigenvectors and eigenvalues. The one or more components of the PCA model can correspond to one or more eigenvectors having the highest eigenvalues.

The PCA can be performed using a non-linear iterative partial least squares (NIPALS) algorithm or singular value decomposition. The PCA model space can define a PCA space. The PCA can comprise probabilistic PCA, incremental PCA, non-negative PCA and/or kernel PCA.

The correlation or analysis can also be based on LDA. LDA expresses one dependent variable as a linear combination of other features or measurements. LDA has continuous independent variables and a categorical dependent variable (i.e. the class label). Both PCA and LDA look for linear combinations of variables to best explain the data. LDA explicitly attempts to model the difference between the classes of data. Discriminant analysis is not an interdependence technique: a distinction between independent variables and dependent variables (also called criterion variables) must be made.

In another embodiments, analyzing the one or more sample spectra can include linear discriminant analysis (LDA). Analyzing the one or more sample spectra can include performing linear discriminant analysis (LDA) after performing principal component analysis (PCA). The LDA or PCA-LDA model can define an LDA or PCA-LDA space. The LDA can include incremental LDA. Analyzing the one or more sample spectra can also include performing a maximum margin criteria (MMC) process after performing principal component analysis (PCA). The MMC or PCA-MMC model can define an MMC or PCA-MMC space.

Using either model building or multivariate analysis, the authentication of an unknown sample can be performed with high accuracy, or confidence. The authentication can be performed with an accuracy over 50%, 60%, 70%, 80%, 90, 95%, 98%, 99%, 99.9% or 100%. These values can be used to define a range, such as 80% to 100%. The model or analysis can be based on a fingerprint of ions and intensities. If the sample falls outside the regions of the model with regard to any or both, e.g., at least a 5% variance, 10%, 15%, 20%, 25%, 30%, 40% or 50% variance, then the match and confidence will be less. The presence or absence of certain masses or changes in intensities of ions in model can affect the confidence of the match.

Analyzing the one or more spectra can include a combination of the foregoing analysis techniques, such as PCA-LDA, PCA-MMC, PLS-LDA, etc. Analyzing the one or more spectra can include developing a classification model and/or library using one or more reference sample (e.g., known sample or standard) spectra. The one or more reference sample spectra can each have been or can each be obtained and/or processed, for example in a manner as described herein. A set of reference sample intensity values can be derived from each of the one or more sample, known sample or standard spectra, for example in a manner as described herein.

In multivariate analysis, each set of reference sample intensity values can correspond to a reference point in a multivariate space having plural dimensions and/or plural intensity axes. Each dimension and/or intensity axis can correspond to a particular time or time-based value, such as a particular mass, mass to charge ratio and/or ion mobility. Each dimension and/or intensity axis can also correspond to a particular mode of operation.

The multivariate space can be represented by a reference matrix having have rows associated with respective reference sample spectra and columns associated with respective time or time-based values and/or modes of operation, or vice versa, the elements of the reference matrix being the reference sample intensity values for the respective time or time-based values and/or modes of operation of the respective reference sample spectra.

The multivariate analysis can be carried out on a reference matrix (e.g., known sample or standard) in order to define a classification model having one or more (e.g., desired or principal) components and/or to define a classification model space having one or more (e.g., desired or principal) component dimensions or axes. A first component and/or component dimension or axis can be in a direction of highest variance and each subsequent component and/or component dimension or axis may be in an orthogonal direction of next highest variance.

The classification model and/or classification model space can be represented by one or more classification model vectors or matrices (e.g., one or more score matrices, one or more loading matrices, etc.). The multivariate analysis can also define an error vector or matrix, which does not form part of, and is not "explained" by, the classification model.

The reference matrix and/or multivariate space can have a first number of dimensions and/or intensity axes, and the classification model and/or classification model space can have a second number of components and/or dimensions or axes.

The second number can be lower than the first number. The second number can be selected based on a cumulative variance or "explained" variance of the classification model being above an explained variance threshold and/or based on an error variance or an "unexplained" variance of the classification model being below an unexplained variance threshold. The second number can be lower than the number of reference sample spectra.

The one or more spectra can include library-based analysis. In library-based analysis, analyzing the one or more spectra can include deriving one or more sets of metadata for the one or more sample spectra. Each set of metadata can be representative of a class of one or more classes of sample. Each set of metadata can be stored in an electronic library. Each set of metadata for a class of sample can be derived from a set of plural reference sample spectra for that class of sample.

Each set of plural reference sample spectra can include plural channels of corresponding (e.g., in terms of time or time-based value, e.g., mass, mass to charge ratio, and/or ion mobility) intensity values, and wherein each set of metadata includes an average value, such as mean or median, and/or a deviation value for each channel. Analyzing the one or more sample spectra can include defining one or more classes within a classification model and/or library. The one or more classes can be defined within a classification model and/or library in a supervised and/or unsupervised manner. Analyzing the one or more sample spectra can include defining one or more classes within a classification model and/or library manually or automatically according to one or more class criteria.

The one or more class criteria for each class can be based on one or more of: (i) a distance (e.g., squared or root-squared distance and/or Mahalanobis distance and/or (variance) scaled distance) between one or more pairs of reference points for reference sample spectra within a classification model space; (ii) a variance value between groups of reference points for reference sample spectra within a classification model space; and (iii) a variance value within a group of reference points for reference sample spectra within a classification model space. The one or more classes can each be defined by one or more class definitions.

The one or more class definitions can include one or more of: (i) a set of one or more reference points for reference sample spectra, values, boundaries, lines, planes, hyperplanes, variances, volumes, Voronoi cells, and/or positions, within a classification model space; and (ii) one or more positions within a hierarchy of classes. Analyzing the one or more sample spectra can include identifying one or more outliers in a classification model and/or library. Analyzing the one or more sample spectra can include removing one or more outliers from a classification model and/or library.

Analyzing the one or more sample spectra can include subjecting a classification model and/or library to cross-validation to determine whether or not the classification model and/or library is successfully developed. The cross-validation can include leaving out one or more reference sample spectra from a set of plural reference sample spectra used to develop a classification model and/or library. The one or more reference sample spectra that are left out can relate to one or more particular targets and/or subjects. The one or more reference sample spectra that are left out can be a percentage of the set of plural reference sample spectra used to develop the classification model and/or library, the percentage can be in a range selected from a group consisting of: <or> 0.1%, 0.1-0.2%, 0.2-0.5%, 0.5-1.0%, 1.0-2.0%, 2.0-5%, 5-10.0%, and <or> 10.0%.

The cross-validation can include using the classification model and/or library to classify one or more reference sample spectra that are left out of the classification model and/or library. The cross-validation can include determining a cross-validation score based on the proportion of reference sample spectra that are correctly classified by the classification model and/or library. The cross-validation score can be a rate or percentage of reference sample spectra that are correctly classified by the classification model and/or library. The classification model and/or library can be considered successfully developed when the sensitivity (true-positive rate or percentage) of the classification model and/or library is greater than a sensitivity threshold and/or when the specificity (true-negative rate or percentage) of the classification model and/or library is greater than a specificity threshold.

Analyzing the one or more sample spectra can include using a classification model and/or library, for example a classification model and/or library as described herein, to classify one or more sample spectra as belonging to one or more classes of sample. The one or more sample spectra can each have been or may each be obtained and/or pre-processed, for example in a manner as described herein. A set of sample intensity values may be derived from each of the one or more sample spectra, for example in a manner as described herein.

In multivariate analysis, each set of sample intensity values can correspond to a sample point in a multivariate space having plural dimensions and/or plural intensity axes. Each dimension and/or intensity axis can correspond to a particular time or time-based value. Each dimension and/or intensity axis can correspond to a particular mode of operation. Each set of sample intensity values can be represented by a sample vector, the elements of the sample vector being the intensity values for the respective time or time-based values and/or modes of operation of the one or more sample spectra.

The methodology of the present disclosure can include an ionizer-mass spectrometry system having multiple samples (as standards) and correlations. Multiple samples and multiple correlations can exist within the system and be utilized together or simultaneously to analyze and unknown sample. For example, dozens of different whiskey varieties can exist. Each variety can be sampled and at least one correlation to common compounds established. An unknown sample can be tested against one, or more than one, of the correlations. The whiskey variety can be determined and authenticated.

In some embodiments, the system can determine the presence (and quantity) of more than one samples or variety. For example, an unknown sample can be a mixture of two varieties of whiskey. The system can compare the unknown sample to the known samples and determine the types of whiskies in the mixture and the percent amount of each.

In another embodiment, the present disclosure relates to a method for authenticating an unknown sample including (i) identifying a group of samples having at least two common compounds, wherein the compounds can be present in different relative amounts and capable of being detected by a mass spectrometer coupled to an ambient ionization technique, (ii) testing the samples using a mass spectrometer coupled to an ambient ionization technique to determine the relative amounts of the at least two common compounds in each sample in the group of samples, (iii) establishing one or more correlations between the relative amounts of the at least two common compounds and the samples, (iv) testing an unknown sample using a mass spectrometer coupled to an ambient ionization technique to determine the relative amounts of the at least two common compounds in the unknown sample; and (v) authenticating the unknown sample based on the one or more correlations.

In another embodiment, the present disclosure relates to a method for authenticating a sample including (i) determining the identity and relative amount of at least two compounds in the sample, (ii) generating sample ions from the sample using an surface desorption source, (iii) analyzing the sample using a mass spectrometer to determine the relative amounts of the at least two compounds in the sample, and (iv) authenticating the sample based on the identity and relative amount of the at least two compounds in a sample. The identity and relative amount of at least two compounds in a sample can be determined from the sample's label.

In another embodiment, the present disclosure relates to a method for authenticating an unknown sample including (i) generating sample ions from the unknown sample using a surface desorption ionization source, (ii) receiving the ions into a mass spectrometer; (iii) identifying at least one unknown sample related sub-population or group in the unknown sample, (iv) comparing the identified unknown sample related sub-population or group in the unknown sample to one or more known profiles, and (v) authenticating the unknown sample based on the comparison.

The identification of at least one unknown sample related sub-populations or group can be the one or more common compounds. The one or more common compounds can have known profiles that correspond to known samples. The identified unknown sample related sub-population or group in the unknown sample, e.g., common compounds, can be compared to one or more known profiles of the common compounds that correspond to known samples (or standards). Based in the comparison, the unknown sample can be authenticated.

In another embodiment, the present disclosure relates to an apparatus including, (i) a surface desorption ionizer capable of generating sample ions from a group of samples having at least two common compounds, wherein the compounds can be present in different relative amounts, (ii) a mass spectrometer; and (iii) software capable of establishing one or more correlations between the relative amounts of the at least two common compounds determine by the mass spectrometer to allow authentication of an unknown sample.

The functions described herein can be implemented using hardware and/or software as desired. In one embodiment, a computer program having computer software code for performing a method of spectrometric analysis as described herein in any aspect or embodiment when the program is run on a computer system, e.g., control circuitry, of a spectrometric analysis system. The circuitry can be directly connected or wirelessly connected to the spectrometer. A wireless connection can allow the one or more sample spectra to be obtained at a remote or distal disaster location, such as an earthquake or war zone, and then processed at a, for example more convenient or safer, local or proximal location.

In other embodiments, the method can include obtaining one or more reference sample spectra for a sample, analyzing the one or more reference sample spectra to classify the sample, wherein analyzing the one or more reference sample spectra includes developing and/or modifying a classification model and/or library for the particular compound or plurality of compounds, obtaining one or more sample spectra for an additional sample for the same particular compounds or plurality of compounds, and analyzing the one or more sample spectra to classify the additional sample, wherein analyzing the one or more sample spectra includes using the classification model and/or library developed and/or modified for the particular compound or plurality of compounds.

The method can also include obtaining one or more background reference spectra, deriving one or more background noise profiles for the one or more background reference spectra, and storing the one or more background noise profiles in an electronic storage for use when pre-processing one or more sample spectra obtained from a different samples. The processing of the one or more sample spectra can include a background subtraction process one or more background noise profiles are retrieved from electronic storage and subtracted from the one or more sample spectra to produce one or more background subtracted sample spectra, and analyzing the one or more background-subtracted sample spectra so as to classify the sample.

Pre-processing can include combining plural sample spectra. In some embodiments, ion detections or intensity values in corresponding bins of plural spectra can be summed to produce a combined sample spectrum for a sample. In other embodiments, the plural spectra can have been obtained using different conditions and a suitably weighted summation of ion detections or intensity values in corresponding bins of the plural spectra can be used to produce a combined sample spectrum for the sample. Pre-processing can include converting and correcting ion arrival times for the sample spectrum to suitable masses or mass to charge ratios, such that the sample spectrum then includes a set of mass-intensity or mass to charge ratio-intensity pairs. In some embodiments, the mass correction process includes offsetting and scaling the sample spectrum based on known masses corresponding to known spectral peaks for lockmass ions that were provided together with the analyte ions.

Pre-processing can include normalizing the intensity values of the sample spectrum. In some embodiments, this normalization includes offsetting and scaling the intensity values base on statistical property for the sample spectrum, such as total ion current (TIC), a base peak intensity, an average intensity value, or quantile. In some embodiments, applying a function to the intensity values in the sample spectrum. The function can be a variance stabilizing function that removes a correlation between intensity variance and intensity in the sample spectrum. The function can also enhance particular masses or mass to charge ratios in the sample spectrum that may be useful for classification.

Pre-processing can include windowing in which parts of the sample spectrum are selected for further pre-processing. In some embodiments, parts of the sample spectrum corresponding to masses or mass to charge ratios in the range of 600-900 Da are retained since this can provide particularly useful sample spectra for classifying tissues. In other embodiments, parts of the sample spectrum corresponding to masses or mass to charge ratios in the range of 600-2000 Da are retained since this can provide particularly useful sample spectra for classifying bacteria.

Pre-processing can include filtering and/or smoothing process using a Savitzky-Golay process. This process removes unwanted higher frequency fluctuations in the sample spectrum. Pre-processing can include data reduction to reduce the number of intensity values to be subjected to analysis. Various forms of data reduction are contemplated. Any one or more of the following data reduction steps can be performed. The one or more data reduction steps can also be performed in any desired and suitable order.

The data reduction process can include retaining parts of the sample spectrum that are above an intensity threshold or intensity threshold function. The intensity threshold or intensity threshold function can be based on statistical property for the sample spectrum, such as total ion current (TIC), a base peak intensity, an average intensity value, or quantile. The data reduction process can include peak detection and selection, including finding the gradient of the sample spectra and using a gradient threshold in order to identify rising and falling edges of peaks. The data reduction process can include re-binning in which ion intensity values from narrower bins are accumulated in a set of wider bins.

In this embodiment, each bin has a mass or mass to charge ratio equivalent width of 1 Da.

Pre-processing can include mass correction that includes offsetting and scaling the selected peaks of the sample spectrum based on known masses corresponding to known spectral peaks for lockmass ions that were provided together with the analyte ions. Pre-processing can include normalizing the intensity values for the selected peaks of the one or more sample spectra. In some embodiments, this normalization includes offsetting and scaling the intensity values based on statistical property for the selected peaks of the sample spectrum, such as total ion current (TIC), a base peak intensity, an average intensity value, or quantile. This normalization can prepare the intensity values of the selected peaks of the sample spectrum for analysis. For example, the intensity values can be normalized so as to have a particular average (e.g., mean or median) value, such as 0 or 1, so as to have a particular minimum value, such as −1, and so as to have a particular maximum value, such as 1.

Pre-processing can include background subtraction. Background subtraction can include obtaining a background noise profile for a sample spectrum. The background noise profile for a sample spectrum can be derived from the sample spectrum itself. However, it can be difficult to derive adequate background noise profiles for sample spectra themselves, particularly where relatively little sample or poor quality sample is available such that the sample spectrum for the sample comprises relatively weak peaks and/or comprises poorly defined noise. To address this issue, background noise profiles can instead be derived from reference sample spectra and stored in electronic storage for later use. The reference sample spectra for each class of sample will often have a characteristic (e.g., periodic) background noise profile due to particular ions that tend to be generated when generating ions for the samples of that class. A background noise profile can therefore be derived for each class of sample. A well-defined background noise profile can accordingly be derived in advance for each class using reference sample spectra that are obtained for a relatively higher quality or larger amount of sample. The background noise profiles can then be retrieved for use in a background subtraction process prior to classifying a sample.

The multivariate analysis can include projecting into a classification model space so as to classify the one or more sample spectra. The method of the present disclosure can include obtaining one or more sample spectra for a sample, analyzing the one or more sample spectra so as to classify the sample, wherein analyzing the one or more sample spectra includes projecting a sample point and/or vector for the one or more sample spectra into a classification model space. The sample point and/or vector can be projected into the classification model space using one or more vectors or matrices of the classification model (e.g., one or more loading matrices, etc.).

The one or more sample spectra can be classified as belonging to a class based on the position of the projected sample point and/or vector in the classification model space. In a library-based analysis, analysing the one or more sample spectra can include calculating one or more probabilities or classification scores based on the degree to which the one or more sample spectra correspond to one or more classes of sample represented in an electronic library. One or more sets of metadata that are each representative of a class of one or more classes of sample can be stored in the electronic library. Analyzing the one or more sample spectra can include, for each of the one or more classes, calculating a likelihood of each intensity value in a set of sample intensity values for the one or more sample spectra given the set of metadata stored in the electronic library that is representative of that class.

Each likelihood can be calculated using a probability density function. The probability density function can be based on a generalised Cauchy distribution function. The probability density function can be a Cauchy distribution function, a Gaussian (normal) distribution function, or other probability density function based on a combination of a Cauchy distribution function and a Gaussian (normal) distribution function. Plural likelihoods calculated for a class can be combined (e.g., multiplied) to give a probability that the one or more sample spectra belongs to that class.

Alternatively, analyzing the one or more sample spectra can include, for each of the one or more classes, calculating a classification score (e.g., a distance score, such as a root-mean-square score) for an intensity value in the set of intensity values for the one or more sample spectra using the metadata stored in the electronic library that is representative of that class. A probability or classification score can be calculated for each one of plural classes, for example in the manner described herein. The probabilities or classification scores for the plural classes can be normalised across the plural classes. The one or more sample spectra can be classified as belonging to a class based on the one or more (e.g., normalised) probabilities or classification scores.

Analyzing the one or more sample spectra can include classifying one or more sample spectra as belonging to one or more classes in a supervised and/or unsupervised manner. Analyzing the one or more sample spectra can include classifying one or more sample spectra manually or automatically according to one or more classification criteria. The one or more classification criteria can be based on one or more class definitions. The one or more class definitions can include one or more of: (i) a set of one or more reference points for reference sample spectra, values, boundaries, lines, planes, hyperplanes, variances, volumes, Voronoi cells, and/or positions, within a classification model space; and (ii) one or more positions within a hierarchy of classes.

The one or more classification criteria can include one or more of: (i) a distance (e.g., squared or root-squared distance and/or Mahalanobis distance and/or (variance) scaled distance) between a projected sample point for one or more sample spectra within a classification model space and a set of one or more reference points for one or more reference sample spectra, values, boundaries, lines, planes, hyperplanes, volumes, Voronoi cells, or positions, within the classification model space being below a distance threshold or being the lowest such distance; (ii) one or more projected sample points for one or more sample spectra within a classification model space being one side or other of one or more reference points for one or more reference sample spectra, values, boundaries, lines, planes, hyperplanes, or positions, within the classification model space; (iii) one or more projected sample points within a classification model space being within one or more volumes or Voronoi cells within the classification model space; (iv) a probability that one or more projected sample points for one or more sample spectra within a classification model space belong to a class being above a probability threshold or being the highest such probability; and (v) a probability or classification score being above a probability or classification score threshold or being the highest such probability or classification score.

The one or more classification criteria can be different for different types of class. The one or more classification criteria for a first type of class can be relatively less stringent and the one or more classification criteria for a second type of class can be relatively more stringent. This can increase the likelihood that the sample is classified as being in a class belonging to the first type of class and/or can reduce the likelihood that the sample is classified as being in a class belonging to the second type of class. This can be useful when incorrect classification in a class belonging to the first type of class is more acceptable than incorrect classification in a class belonging to the second type of class.

Analysing the one or more sample spectra can include modifying a classification model and/or library. Modifying the classification model and/or library can include adding one or more previously unclassified sample spectra to one or more reference sample spectra used to develop the classification model and/or library to provide an updated set of reference sample spectra. Modifying the classification model and/or library can include re-developing the classification model and/or library using the updated set of reference sample spectra. Modifying the classification model and/or library can include re-defining one or more classes of the classification model and/or library using the updated set of reference sample spectra. This can account for targets whose characteristics may change over time, such as developing cancers, evolving microorganisms, etc.

In some embodiments, obtaining the one or more sample spectra can include obtaining one or more (e.g., known) reference sample spectra and one or more (e.g., unknown) sample spectra for the same particular target and/or subject, and analyzing the one or more sample spectra can include developing and/or modifying and/or using a classification model and/or library tailored for the particular target or unknown sample. The method of the present disclosure can include obtaining one or more reference sample spectra for a sample for a particular sample, analyzing the one or more reference sample spectra so as to classify the sample, wherein analyzing the one or more reference sample spectra includes developing and/or modifying a classification model and/or library for the particular target, obtaining one or more sample spectra for a sample for the same particular target, and analyzing the one or more sample spectra so as to classify the sample, wherein analyzing the one or more sample spectra includes using the classification model and/or library developed and/or modified for the particular target.

For example, a method of building a classification model using multivariate analysis of plural reference sample spectra can include obtaining plural sets of intensity values for reference sample spectra. Unsupervised principal component analysis (PCA) followed by supervised linear discriminant analysis (LDA) can be performed. The multivariate analysis can provide a classification model that allows a sample to be classified using one or more sample spectra obtained from the sample.

Also, a set of reference sample spectra can be obtained from two classes of known reference samples. The classes can be any one or more of the classes of target described herein. However, for simplicity, the two classes will be referred as a left-hand class and a right-hand class. Each of the reference sample spectra can be pre-processed in order to derive multiple sets of reference peak-intensity values for respective mass to charge ratios in the reference sample spectrum. A multivariate space can have multiple dimensions defined by intensity axes. Each of the dimensions or intensity axes can correspond to the peak-intensity at a particular mass to charge ratio. The multivariate space can include plural reference points, with each reference point corresponding to a reference sample spectrum, i.e., the peak-intensity values of each reference sample spectrum provide the co-ordinates for the reference points in the multivariate space.

The set of reference sample spectra can be represented by a reference matrix D having rows associated with respective reference sample spectra, columns associated with respective mass to charge ratios, and the elements of the matrix being the peak-intensity values for the respective mass to charge ratios of the respective reference sample spectra. In many cases, the large number of dimensions in the multivariate space and matrix D can make it difficult to group the reference sample spectra into classes. PCA can be carried out on the matrix D in order to calculate a PCA model that defines a PCA space having a reduced number of one or more dimensions defined by principal component axes. The principal components can be selected to be those that include the largest variance in the matrix D and that cumulatively explain a threshold amount of the variance in the matrix D. The cumulative variance can increase as a function of the number n of principal components in the PCA model.

The PCA model can be calculated from the matrix D using a non-linear iterative partial least squares (NIPALS) algorithm, the details of which are known to the skilled person. The resultant PCA model can be defined by a PCA scores matrix S and a PCA loadings matrix L. The PCA can also produce an error matrix E, which contains the variance not explained by the PCA model. The relationship between D, S, L and E is:

$$D = SL^T + E \quad (1)$$

The PCA model can have two principal components $PC_0$ and $PC_1$ and the PCA space therefore can have two dimensions defined by two principal component axes. A lesser or greater number of principal components can be included in the PCA model as desired. It is generally desired that the number of principal components is at least one less than the number of dimensions in the multivariate space. The PCA space can include plural transformed reference points or PCA scores, with each transformed reference point or PCA score corresponding to a reference sample spectrum and to a reference point. By rearranging Equation 1 and disregarding the error E, the matrix D of the reference sample spectra, and therefore the reference points, can be transformed into the transformed reference points or PCA scores S using the loadings matrix L by the following relationship:

$$DL = S \quad (2)$$

The reduced dimensionality of the PCA space can make it easy to group the reference sample spectra into the two classes. Any outliers can be identified and removed from the classification model at this stage. Further supervised multivariate analysis, such as LDA or maximum margin criteria (MMC), using the PCA space can then be performed so as to define classes and, optionally, further reduce the dimensionality. LDA seeks to maximise the ratio of the variance between classes to the variance within classes (i.e., so as to give the largest possible distance between the most compact classes possible). The resultant PCA-LDA model can be defined by a PCA-LDA scores matrix Z and a PCA-LDA loadings matrix U. The relationship between S, Z and U is:

$$S = ZU^T \quad (3)$$

A PCA-LDA space can have a single dimension or axis, wherein the LDA can be performed using a PCA space. The LDA space can include plural further transformed reference points or PCA-LDA scores, with each further transformed reference point corresponding to a transformed reference point or PCA score. By rearranging Equation 3, the transformed reference points or PCA scores S can be transformed into the further transformed reference points or PCA-LDA scores Z using the relationship:

$$SU=Z \qquad (4)$$

The further reduced dimensionality of the PCA-LDA space can make it even easier to group the reference sample spectra into the two classes. Each class in the PCA-LDA model can be defined by one or more hyperplanes (including points, lines, planes or higher order hyperplanes) in the PCA-LDA space. The PCA loadings matrix L, the LDA loadings matrix U and hyperplanes can be output to a database for later use in classifying an aerosol, smoke or vapour sample.

A method of using a classification model to classify a sample can be performed. The method includes obtaining a set of intensity values for a sample spectrum, then projecting the set of intensity values for the sample spectrum into PCA-LDA model space. Other models can also be used, such as PCA-MMC. The sample spectrum can then be classified based on the project position and the classification can be output.

Using a simple PCA-LDA model can also be used. A sample spectrum can be obtained from an unknown sample. The sample spectrum can be pre-processed in order to derive a set of three sample peak-intensity values for respective mass to charge ratios. Although only three sample peak-intensity values are taken, many more sample peak-intensity values (e.g., ~100 sample peak-intensity values) can be derived at many more corresponding mass to charge ratios for the sample spectrum. The sample spectrum can be represented by a sample vector $D_X$, with the elements of the vector being the peak-intensity values for the respective mass to charge ratios. Using Equation 2, a PCA scores vector $S_X$ for the sample spectrum can be obtained as follows:

$$D_X L = S_X \qquad (5)$$

Then, using Equation 4, a PCA-LDA scores vector $Z_X$ for the sample spectrum can be obtained as follows:

$$S_X U = Z_X \qquad (6)$$

The PCA-LDA space can include the projected sample point, corresponding to the PCA-LDA scores vector $Z_X$, derived from the peak intensity values of the sample spectrum. The projected sample point can be to one side of a hyperplane between the classes that relates to the right-hand class, and so the sample can be classified as belonging to the right-hand class.

A method of building a classification library using plural input reference sample spectra can be performed. The method can include deriving metadata from the plural input reference sample spectra for each class of sample. The metadata can be stored for each class of sample as a separate library entry. The classification library can then be output, for example to electronic storage. A classification library can allow a sample to be classified using one or more sample spectra obtained from the sample.

Each entry in the classification library can be created from plural pre-processed reference sample spectra that are representative of a class. The reference sample spectra for a class can be pre-processed according to the following procedure. The data can be resampled onto a logarithmic grid with abscissae:

$$x_i = \lfloor N_{chan} \log \frac{m}{M_{min}} / \log \frac{M_{max}}{M_{min}} \rfloor$$

where $N_{chan}$ is a selected value and $\lfloor x \rfloor$ denotes the nearest integer below x. In one example, $N_{chan}$ is $2^{12}$ or 4096.

A cubic spline with k knots can then be constructed such that p % of the data between each pair of knots lies below the curve. This curve can then be subtracted from the data. In one example, k is 32. In one example, p is 5. A constant value corresponding to the q % quantile of the intensity subtracted data can then be subtracted from each intensity. Positive and negative values can be retained. In one example, q is 45. The data can be normalised to have mean $\bar{y}_i$. In one example, $\bar{y}_i = 1$.

An entry in the library can consist of metadata in the form of a median spectrum value $\mu_i$ and a deviation value $D_i$ for each of the $N_{chan}$ points in the spectrum. The likelihood for the i'th channel is given by:

$$Pr(y_i | \mu_i, D_i) = \frac{1}{D_i} \frac{C^{C-1/2} \Gamma(C)}{\sqrt{\pi} \Gamma(C-1/2)} \frac{1}{\left(C + \frac{(y_i - \mu_i)^2}{D_i^2}\right)^C}$$

where ½ <or> C <or> ∞ and where Γ(C) is the gamma function.

The above equation can be a generalised Cauchy distribution which reduces to a standard Cauchy distribution for C=1 and becomes a Gaussian (normal) distribution as C→∞. The parameter $D_i$ can control the width of the distribution (in the Gaussian limit $D_i = \sigma_i$ is simply the standard deviation) while the global value C can control the size of the tails. In one example, C is 3/2, which lies between Cauchy and Gaussian, so that the likelihood becomes:

$$Pr(y_i | \mu_i, D_i) = \frac{3}{4} \frac{1}{D_i} \frac{1}{(3/2 + (y_i - \mu_i)^2 / D_i^2)^{3/2}}$$

For each library entry, the parameters $\mu_i$ can be set to the median of the list of values in the i'th channel of the input reference sample spectra while the deviation $D_i$ can be taken to be the interquartile range of these values divided by $\sqrt{2}$. This choice can ensure that the likelihood for the i'th channel has the same interquartile range as the input data, with the use of quantiles providing some protection against outlying data.

A method of using a classification library to classify a sample can be performed. The method can include obtaining a set of plural sample spectra, then calculating a probability or classification score for the set of plural sample spectra for each class of sample using metadata for the class entry in the classification library. The sample spectra can be classified and the classification can be output. For example, an unknown sample spectrum can be the median spectrum of a set of plural sample spectra. Taking the median spectrum y can protect against outlying data on a channel by channel basis.

The likelihood $L_s$ for the input data given the library entry s is then given by:

$$L_s = Pr(y \mid \mu, D) = \prod_{i=1}^{N_{chan}} Pr(y_i \mid \mu_i, D_i)$$

where $\mu_i$ and $D_i$ are, respectively, the library median values and deviation values for channel i. The likelihoods $L_s$ can be calculated as log likelihoods for numerical safety. The likelihoods $L_s$ can then be normalised over all candidate classes 's' to give probabilities, assuming a uniform prior probability over the classes. The resulting probability for the class $\tilde{s}$ can be given by:

$$Pr(\tilde{s} \mid y) = \frac{L_i^{(1/F)}}{\sum_s L_s^{(1/F)}}$$

The exponent (1/F) can soften the probabilities which may otherwise be too definitive. In one example, F=100. These probabilities can be expressed as percentages, e.g., in a user interface.

Alternatively, RMS classification scores $R_s$ can be calculated using the same median sample values and derivation values from the library:

$$R_s(y, \mu, D) = \sqrt{\frac{1}{N_{chan}} \sum_{i=1}^{N_{chan}} \frac{(y_i - \mu_i)^2}{D_i^2}}$$

Again, the scores $R_s$ are normalised over all candidate classes 's'. The sample can then be classified as belonging to the class having the highest probability and/or highest RMS classification score.

The disclosures of all cited references including publications, patents, and patent applications are expressly incorporated herein by reference in their entirety.

When an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

The present invention is further defined in the following Examples. It should be understood that these Examples, while indicating preferred embodiments of the invention, are given by way of illustration only.

EXAMPLES

Example 1—Authentication of Cinnamon

Real-time authentication of various cinnamon-containing samples was performed using a small, portable ambient ionization and mass spectrometry detection system. The small and portable nature of the system allows it to be used in the field or for local inspection purposes. Ambient ionization was performed using direct analysis in real time, or DART® technology using a DART® ionization source (IonSense, Inc. Saugus, Mass.). The ionizer was coupled to a single quadrupole mass spectrometer, e.g., Acquity® QDa® Mass Detector (Waters Corporation, Milford, Mass.). The system was run using MassLynx Version 4.1 software with model building and multivariate data analysis capabilities. No chromatographic separation is required. One aim of the authentication was to demonstrate the utility and ease-of-use of DART® ionization source (IonSense, Inc. Saugus, Mass.) coupled to simple mass detection QDa® technology (Waters Corporation, Milford Mass.) for the authentication of ground cinnamon and cinnamon sticks based on *Cinnamomum* species.

A variety of commercially available cinnamon samples were acquired. Whole cinnamon sticks (3 samples) and ground cinnamon (11 samples) were tested. The samples contained cinnamon from at least three different species, including *C. Verum* (Ceylon), *C. Burmannii* (Korintje), and *C. Loureiroi* (Saigon). The cinnamon sticks were broken into smaller pieces prior to analysis. The samples were tested using solid sampling with the DART® ionization source (IonSense, Inc. Saugus, Mass.). The piece of cinnamon sticks were held in front of the heated helium ionization beam with a pair of tweezers to perform sampling. Solid sampling using an ambient ionizer maintained the cleanliness of the mass spectrometer (i.e., QDa® source, available from Waters Corporation, Milford, Mass.). No sample preparation was needed for the ground cinnamon samples. The ground cinnamon samples were introduced onto Quick-Strip™ sample cards (IonSense, Inc. Saugus, Mass.) by dipping a cotton swab into the sample and then rubbing the swab over the mesh screen of the sampling area of the card. Most of the ground cinnamon fell through the screen, but enough of a residue was left behind for analysis.

The DART® ionization source parameters included: Ion Mode: Positive; Temperature: 450° C.; Sampling Speed: 1.0 mm/sec; and Grid voltage: 350 V. The QDa® parameters included: Ion Mode: Positive; Cone Voltage: 5V; Mass range: 50-500 amu; Acquisition Speed: 2 Hz. The parameters can be sample and/or compound specific. In other embodiments, the parameters can be defined as to generate mass spectra for an optimal model. The DART® temperatures can be about 50° C., 60, 70, 80, 90, 100, 110, 120, 130, 140, 150, 160, 170, 180, 190, 200, 220, 240, 260, 280, 300, 320, 340, 360, 380, 400, 420, 440, 460, 480, 500, 520, 540, 550, 560, 580 or 600° C. These values can define a range, such as about 440 to about 460° C., or about 50 to about 550° C.

The sampling speed can be about 0.1, 0.2, 0.3, 0.4, 0.5, 0.6, 0.7, 0.8, 0.9, 1, 2, 3, 4, 5, 6, 7, 8, 9, 10, 11, 12, 13, 14 or about 15 mm/sec. These values can define a range, such as about 0.2 to about 10 mm/sec. The Grid voltage can be about 0, 50, 100, 150, 200, 250, 300, 350, 400, 450, 500, 550 or about 600 V. These values can define a range, such as about 0 to about 530 V. The Cone voltage can be about 0, 10, 20, 30, 40, 50, 60, 70, 80, 90, 100, 110 or about 120 V. These values can define a range, such as about 0 to about 100 V. The mass range can be between any range as provided herein. The acquisition speed can be about 0.5, 1, 2, 3, 4, 5, 6, 7, 8, 9, 10, 11, 12, 13, 14, 15, 16, 17, 18, 19, 20, 21, 22, 23, 24 or about 25 Hz. These values can define a range, such as about 1 to about 20 Hz.

Figure 5:
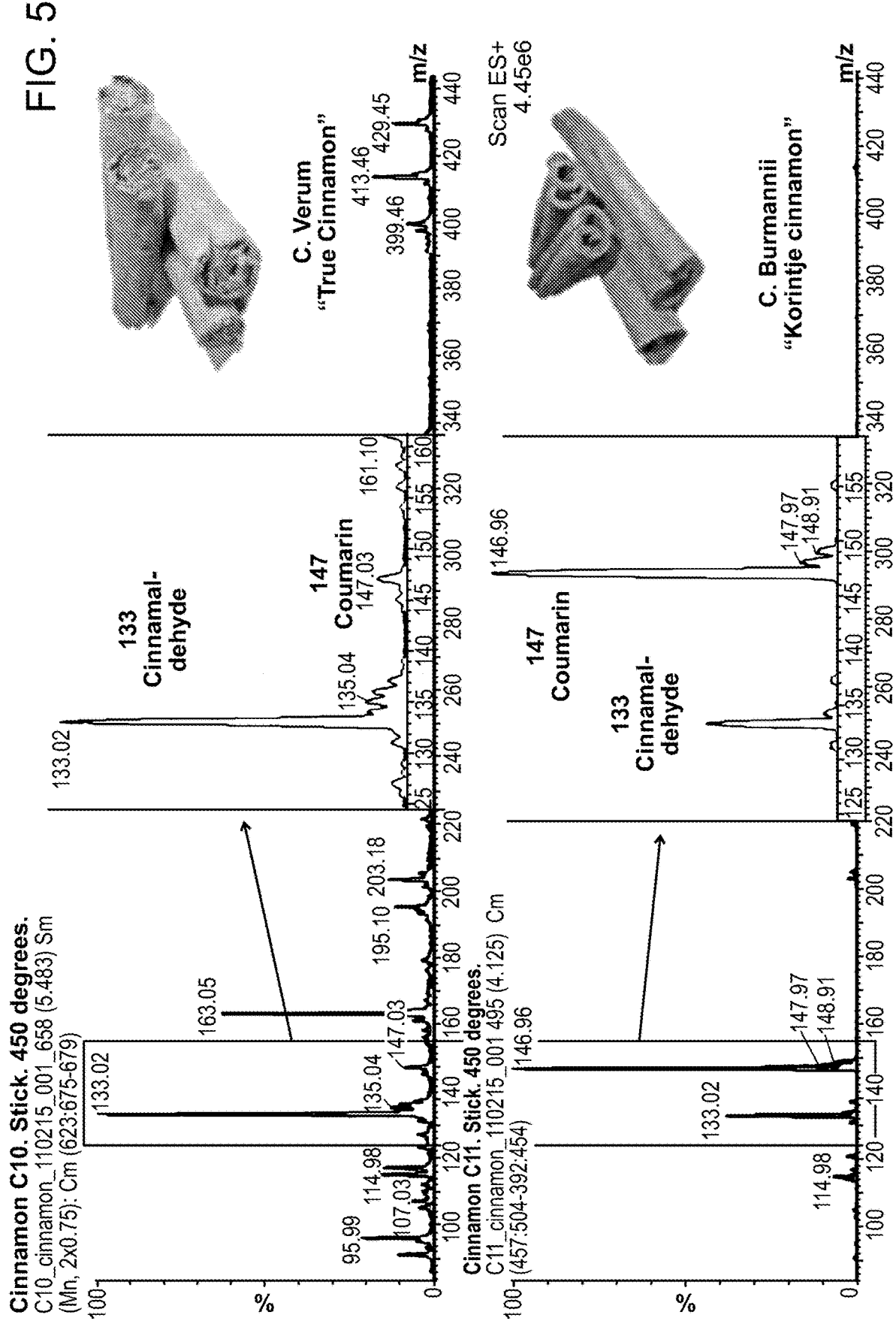
FIG. 5 shows an exemplary analysis of cinnamon showing two common compounds (e.g., cinnamaldehyde and coumain) which can be different relative amounts and used to authenticate unknown samples using an ambient ionization and mass spectrometry detection technique.

Cinnamon Stick Analysis. Of the three cinnamon stick samples analyzed, one was of the *C. verum* species and two were of the *C. Burmannii* species. Representative mass spectra of each species are presented in FIG. 5. The expanded spectra shown in FIG. 5 highlights some of the distinguishing features. One of the distinguishing features between the two species analyzed in stick form is the ratio of cinnamaldehyde (m/z 133) to coumarin (m/z 147). *C. verum* is known to contain very small levels of coumarin, which is verified by this analysis. In contrast, *C. Burmannii* is known to contain high levels of coumarin, again verified by this analysis of the cinnamon stick (i.e., using DART®-QDa® technology, available from the combination of Ion-Sense, Saugus Mass. and Waters Corporation, Milford, Mass.). The intensity ratio of these two species was used to identify the *Cinnamomum* species contained in the samples.

Figure 6:
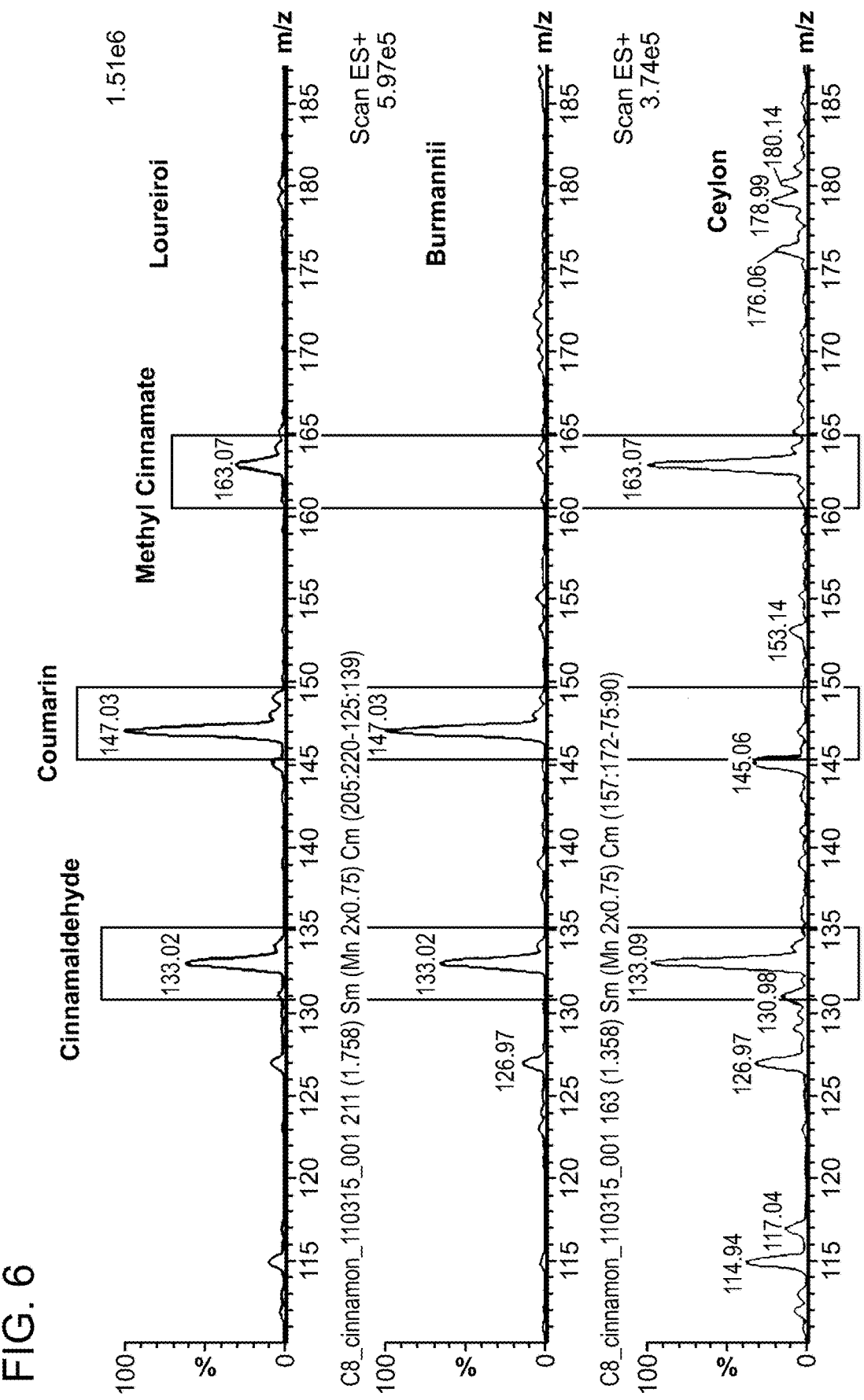
FIG. 6 shows an exemplary analysis of cinnamon showing three common compounds (e.g., cinnamaldehyde, coumain and methyl cinnamate) which can be different relative amounts and used to authenticate unknown samples using an ambient ionization and mass spectrometry detection technique.

Ground Cinnamon Analysis. Analysis of ground samples of the different cinnamon species was also performed to determine if the ground samples could be distinguished by species as well. Among the ground cinnamon samples, known samples of *C. verum, C. Burmannii*, and *C. Loureiroi* were available. Similar to the cinnamon stick analysis, the mass spectra contained distinguishing features. In addition to cinnamaldehyde (m/z 133) and coumarin (m/z 147), methyl cinnamate (m/z 163) was also measured. Methyl cinnamate was present in high levels in *C. verum* (Ceylon), low levels in *C. Loureiroi* (Saigon), and absent in *C. Burmannii* (Korintje). FIG. 6 shows representative spectra from samples of *C. verum, C. Burmannii*, and *C. Loureiroi*. Using these distinguishing characteristics, the species origin of unknown cinnamon samples could be determined. The ratio of these species was used to identify the *Cinnamomum* species contained in the samples.

Figure 7:
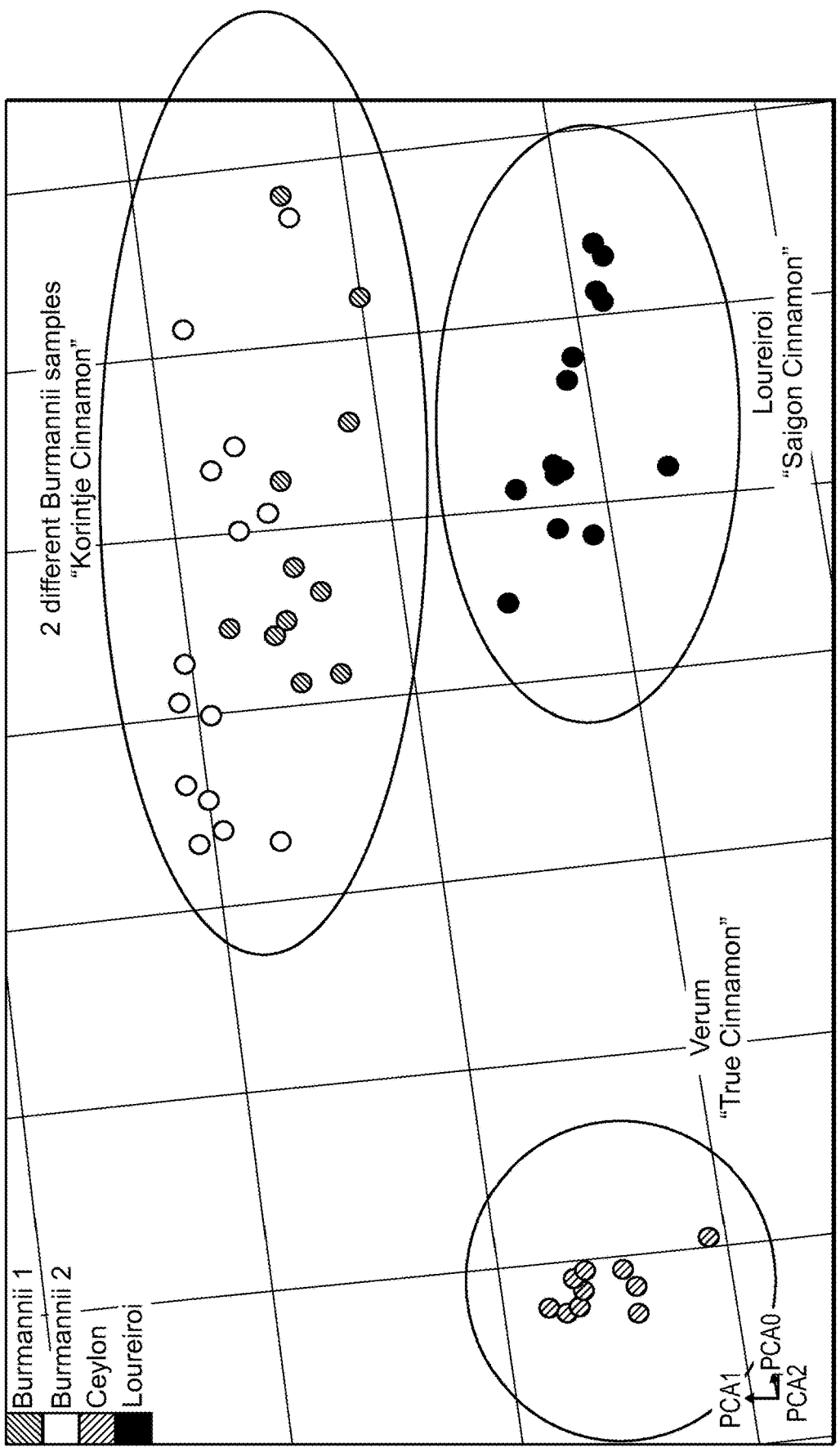
FIG. 7 shows an exemplary PCA plot of cinnamon samples derived from the ambient ionization and mass spectrometry detection technique with multivariate data analysis. The individual sample types can be easily distinguished.
Figure 8:
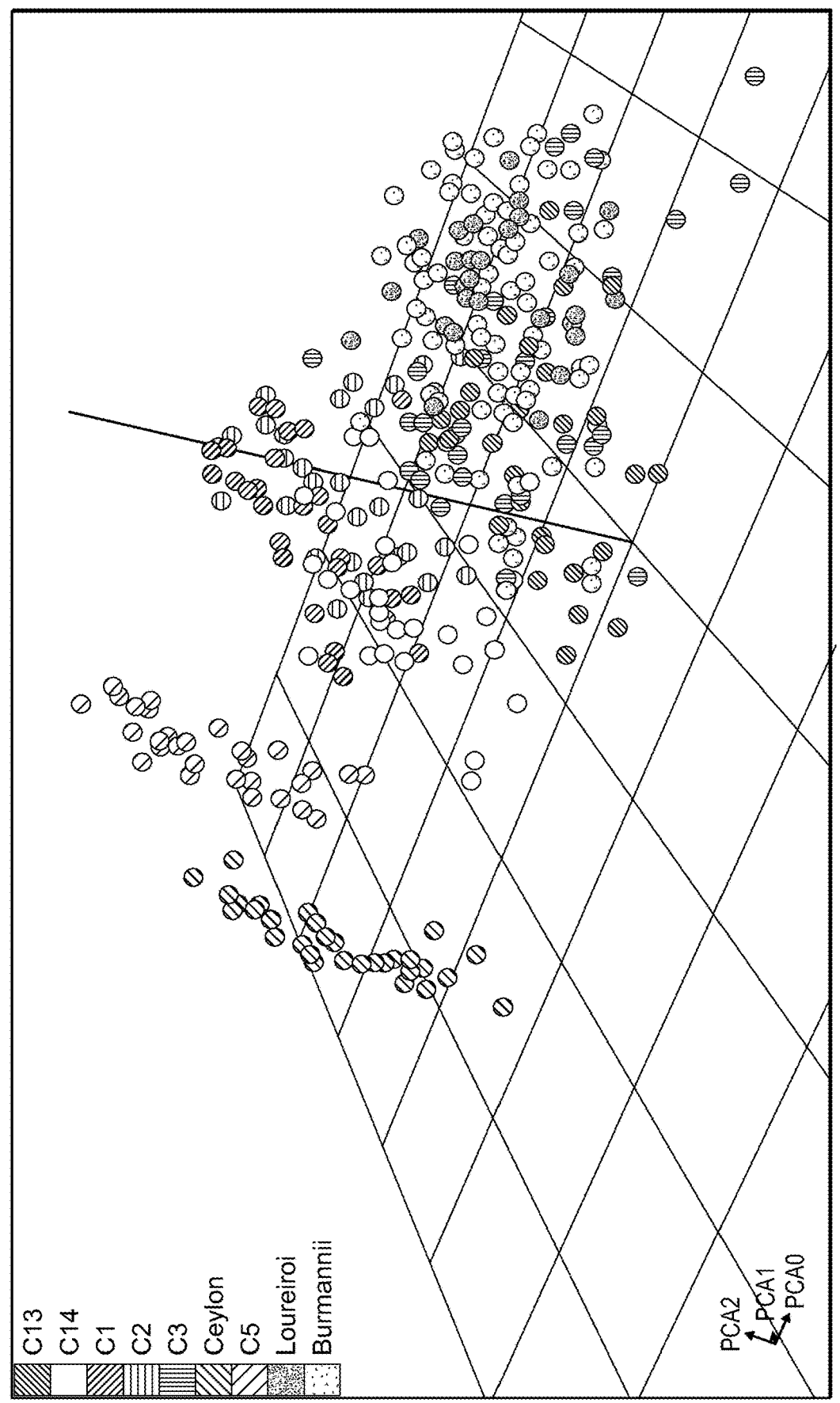
FIG. 8 shows another exemplary PCA plot of cinnamon samples derived from the ambient ionization and mass spectrometry detection technique with multivariate data analysis. The individual sample types can be distinguished.

FIG. 7 shows the PCA model of three different species of cinnamon (e.g., *C. verum, C. Burmannii*, and *C. Loureiroi*). The model was generated from four different cinnamon samples (two of the samples were of *C. Burmannii* species). Ten (10) samples of each species were analyzed and put into the model. The samples from each species were clustered together showing distinguishable features in the mass spectral fingerprint for each species. The clustering of the species is significant as showing that the three species of cinnamon are distinguishable from each other and can be used to authenticate different unknown samples of each, or containing each. Interestingly, the two independent *C. Burmannii* samples were clustered together. FIG. 8 shows a PCA model including the known cinnamon species samples from FIG. 7 with the cinnamon samples of unknown species included in the model. Each unknown sample falls in relation to the known samples.

Example 2—Authentication of Omega Fatty Acid Oil Supplements

Omega fatty acids are polyunsaturated fatty acids characterized by a carboxylic group, an aliphatic chain, and multiple double bonds. They are named according to the position of the first double bond in the carbon chain, starting from the terminal carbon atom of the molecule (called the "omega carbon" because omega is the last letter of the Greek alphabet). Within each omega family, there are also subclass distinctions based on chain length, e.g., short-chain and long-chain fatty acids. Short-chain omega-3 fatty acids are abundant in foods as alpha-linolenic acid (ALA). In particular, ALA is present at high levels in leafy green vegetables and flaxseeds. The most abundant dietary long-chain omega-3 fatty acids are eicosapentaenoic acid (EPA) and docosahexaenoic acid (DHA), which are present in oily fish and fish oil supplements. Omega-6 fatty acids mainly include the short-chain linoleic acid (LA) and to a lesser extent the long-chain arachidonic acids (ARA), which are abundant in vegetables oils, such as corn, soybean, safflower and sunflower oils.

Omega fatty acid oils are a popular dietary supplement. There are many benefits to consuming these omega fatty acids. Omega 3 and omega 9 fatty acids have been shown to lower the risk of cardiovascular disease and reduce inflammation. Yet, large intake of omega 6 fatty acids can actually promote inflammation. Balancing the omega 3:omega 6 ratio is important, especially since the Western diet is known to be high in omega 6 fatty acids. This imbalance promotes the use of dietary oil supplements.

Different sources of omega fatty acid oils exist. Fish oils provide a source of eicosapentaenoic acid (EPA) and docosahexaenoic acid (DHA) omega 3 fatty acids. Plant based oils (e.g., flax seed) provide a source of alpha linolenic acid (ALA) omega 3 fatty acid. With omega fatty acid supplements being such a large part of the market, it is important to monitor adulteration and fatty acid source of these supplements to protect consumers. Food and dietary supplement fraud (e.g., alteration, substitution, mislabeling, etc.) is a closely monitored area. One way to protect consumers and detect fraud is by rapidly screening supplement samples to determine the authenticity of the supplement.

Typically, fatty acid analysis is performed using GC-FID instrumentation. Such analysis requires sample derivatization to the methyl or ethyl ester forms prior to analysis. The derivatization process takes significant amounts of time to complete (e.g., hours) and the risk of incomplete reactions/conversions can introduce uncertainty into the analysis.

Real-time authentication of various omega fatty acid oil supplement samples was performed using the small, portable ambient ionization and mass spectrometry detection system described in Example 1. One aim of the authentication was to demonstrate the utility and ease-of-use of DART® coupled to simple mass detection QDa® technology for the identification of omega 3 and omega 6 fatty acids in oil supplements for rapid supplement authentication.

Omega fatty acid analysis of oil supplements was performed on oil samples diluted in toluene (e.g., 1:50 dilution). A QuickStrip™ module was utilized for analysis of the diluted oils using 5 µl sampling spots. Sample was deposited on a screen that was moved through a heated ionizing helium beam in an automated fashion. Resulting ions are typically of the [M+H]+ or [M−H]− nature. Liquid sampling using an ambient ionizer maintained the cleanliness of the QDa® source. Coupled to a simple mass QDa® detector allows the entire unit to remain small and easy to operate. This allows the system to be operated outside a typical laboratory space if desired, and still generate mass spectral data. No sample preparation was needed for the omega fatty acid oil supplement samples.

The DART® ionization source (IonSense, Inc., Saugus, Mass.) parameters included: Ion Mode: Positive; Temperature: 200° C.; Sampling Speed: 0.5-1.0 mm/sec; and Grid voltage: −/+350 V. The QDa® parameters included: Ion Mode: Negative/Positive; Cone Voltage: 5-15V; Mass range: 50-500, 50-1000 amu; Acquisition Speed: 2 Hz.

During method development of the present analysis method, ionization efficiency was determined to be temperature dependent. Because compound ionization can be temperature dependent, different samples and/or compounds can require different temperatures for analysis. Shorter chain fatty acids were more efficiently ionized at a lower ionization temperature than those with a longer chain. For portions of these analyses, a select range of fatty acids were examined as being present in the oil supplements tested (e.g., mass range 255 to 327). The method of this example was optimized for this range of fatty acids.

In some embodiments, samples can be ionized at a range of different temperatures. The temperature that produces the highest signal can be determined to be "optimal." Optimization of samples can including having prior knowledge of what compounds to look for in the sample based on intensity of those specific ions. Samples with no prior knowledge of specific ions can be optimized on largest intensity of entire spectra. Optimization can be performed on a group of fatty acids intended for analysis, in part, so all can be ionized and detected at a similar intensity. Optimization can also be performed on a mix of standards.

Analysis of Oil Supplements

Fatty acid analysis on fish, flax seed, and safflower oil supplements was performed. The analysis was used, in part, to determine the levels of omega 3, omega 6, and omega 9 fatty acids present. The expected percentage of each fatty acid present in each oil supplement was determined from the nutritional facts listed on the supplement bottle. The experimental percentage was determined based upon the peak areas of each compound. A method was created for the identification of omega fatty acids, such as omega 3 fatty acids (e.g., EPA, DHA, and ALA), omega 6 fatty acids (e.g., linoleic acid), omega 9 fatty acids (e.g., oleic acid), and other saturated fatty acids (e.g., palmitic). The method was based on DART®-QDa® technologies (available from a combination of IonSense, Inc. Saugus, Mass. and Waters Corporation, Milford, Mass.).

The three different dietary oil supplements (i.e., fish, flax seed, and safflower oil) were analyzed to authenticate the contents of the supplements as indicated on the bottles. Each sample was analyzed in triplicate. FIG. 9 shows the expected percentage of different omega fatty acids in the different supplements. FIG. 9 also show the average percentage of each omega fatty acid in the different supplements based on peak areas. The analysis were reproducible having % RSD values of less than 10%. The experimentally determined percentage of fatty acid composition of each supplement matched the percentages disclosed on the supplement bottles, considering the label claim as an approximation. The method can also distinguish source of the oil (e.g., fish vs. plant) dependent upon the fatty acids identified in each sample.

Figure 10:
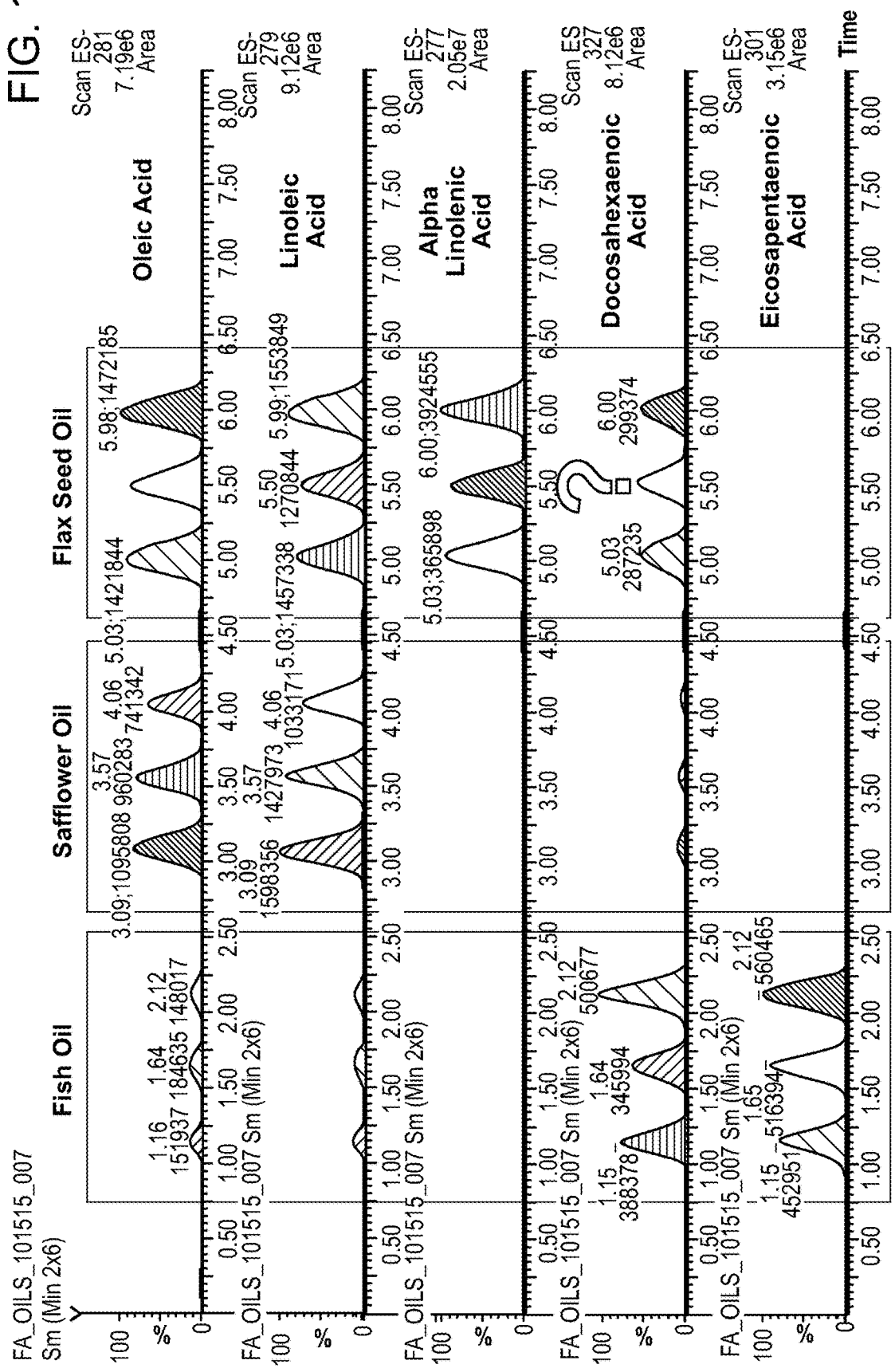
FIG. 10 shows exemplary EIC chromatograms of the fatty acids present in each of the oil supplement samples.

FIG. 10 shows a visual depiction of the fatty acid contents of the oil supplements tested. Each peak is a single spot on the QuickStrip™ card. The first three spots on the card were fish oil, followed by three safflower oil spots, and finally three flax seed oil spots. A blank spot was left in between each type of oil to monitor if there was any carryover between spots on the card. Little to no carryover between analysis is seen. Each plot represents the EIC of a different fatty acid. FIG. 10 shows that the fatty acids indicated on the bottle label are present in each sample, but fish oil and flax seed oil both contain an extra fatty acid. The analysis of the fish oil sample indicates that oleic acid is present. Oleic acid is not listed as a component of the supplement and fish is not typically a source of this omega 9 fatty acid. However, the ingredients indicate that there is soy oil present in the supplement to provide tocopherols to preserve freshness. Soy is a known source of oleic acid, and therefore could account for its presence in the supplement.

The flax seed oil supplement indicates the presence of DHA, an omega 3 fatty acid that is derived from a fish source, not plant based. It is unlikely that this is a result of carryover from the fish oil supplement because there is no DHA present in the safflower oil samples tested in between the fish and flax seed oils. Because it is not indicated on the label, it is possible that the DHA present in the flax seed oil is a contaminate due to alteration of the product.

Mixture Analysis

A polyunsaturated fatty acid standard mix was obtained from Cayman Chemicals. Omega fatty acid supplement capsules were obtained commercially and the known amounts of omega fatty acids in the capsules were determined from the nutritional facts label on the bottle. Both standards and supplements were diluted in toluene. To collect the oil from the capsules, the capsule shell was cut with a razor blade and a pipette was used to transfer the oil from the capsule into a new vial. Prior to analysis, the oil from the supplements was diluted 1:50 in toluene. The expected compounds and their SIR masses are listed in FIG. 11.

Figure 12:
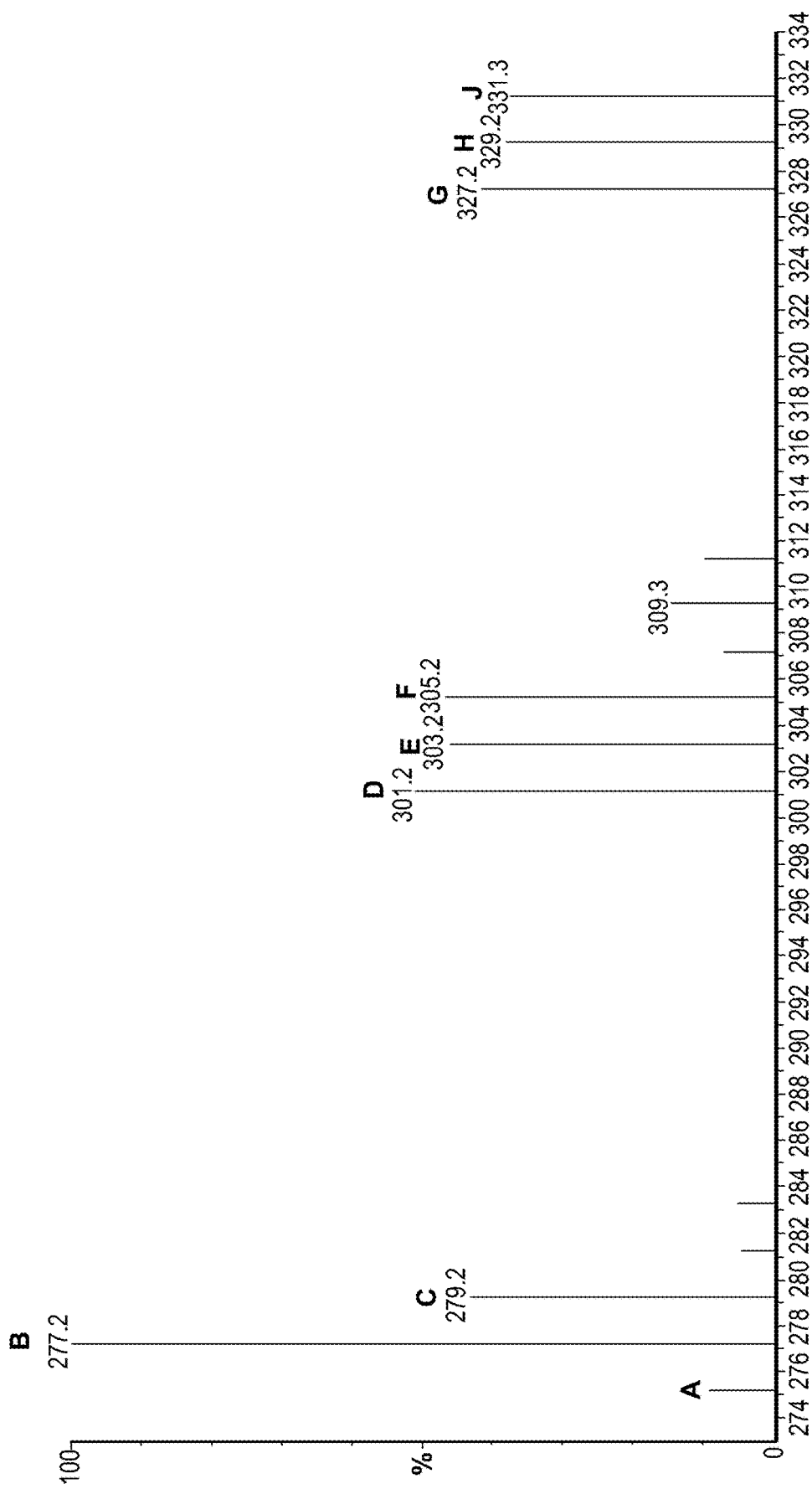
FIG. 12 shows the mass spectrum of the fatty acid standard mix as tested in Example 2.
Figure 13:
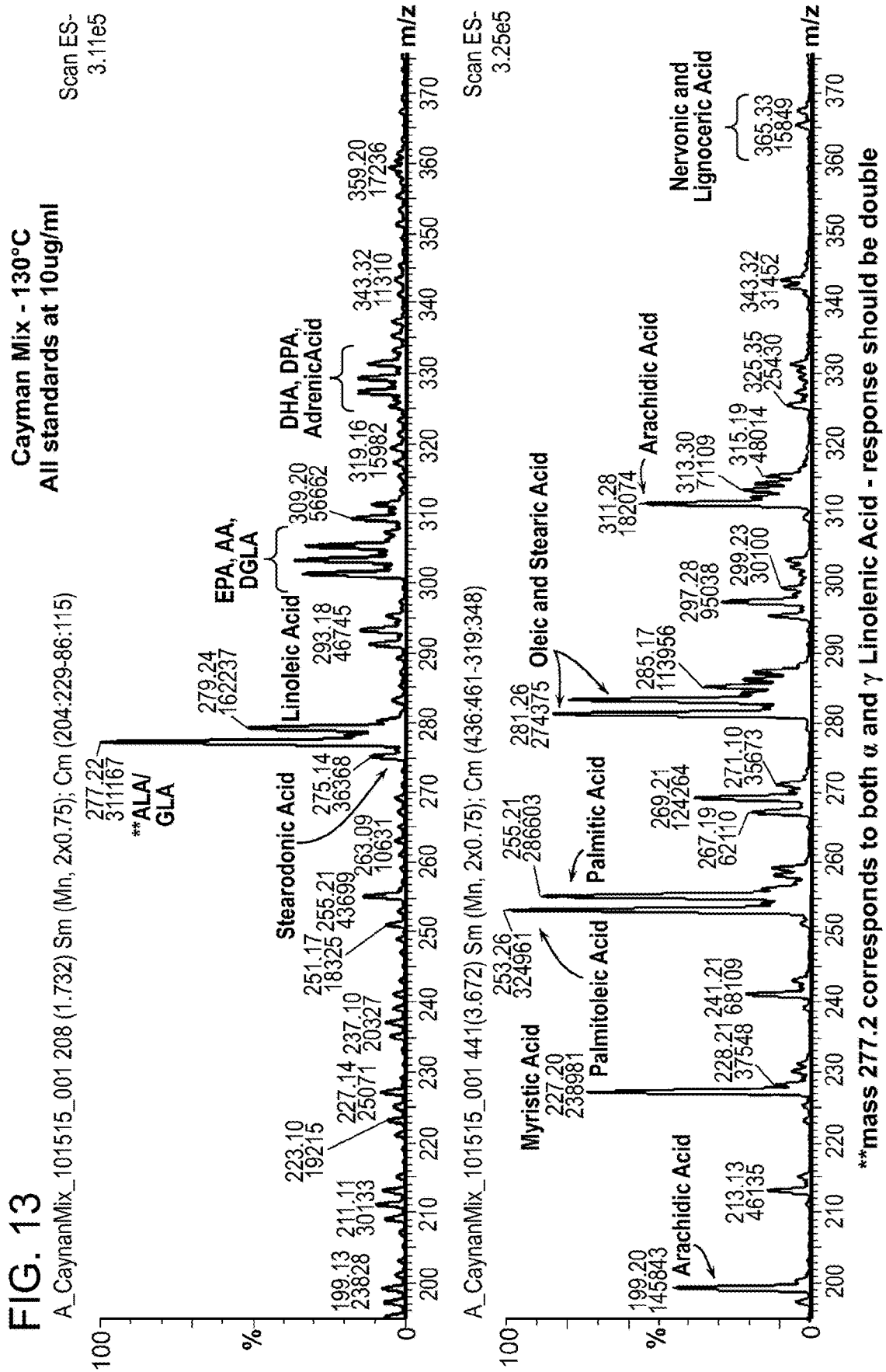
FIG. 13 shows the analysis of the fatty acid standard mix at 130° C. as tested in Example 2.
Figure 14:
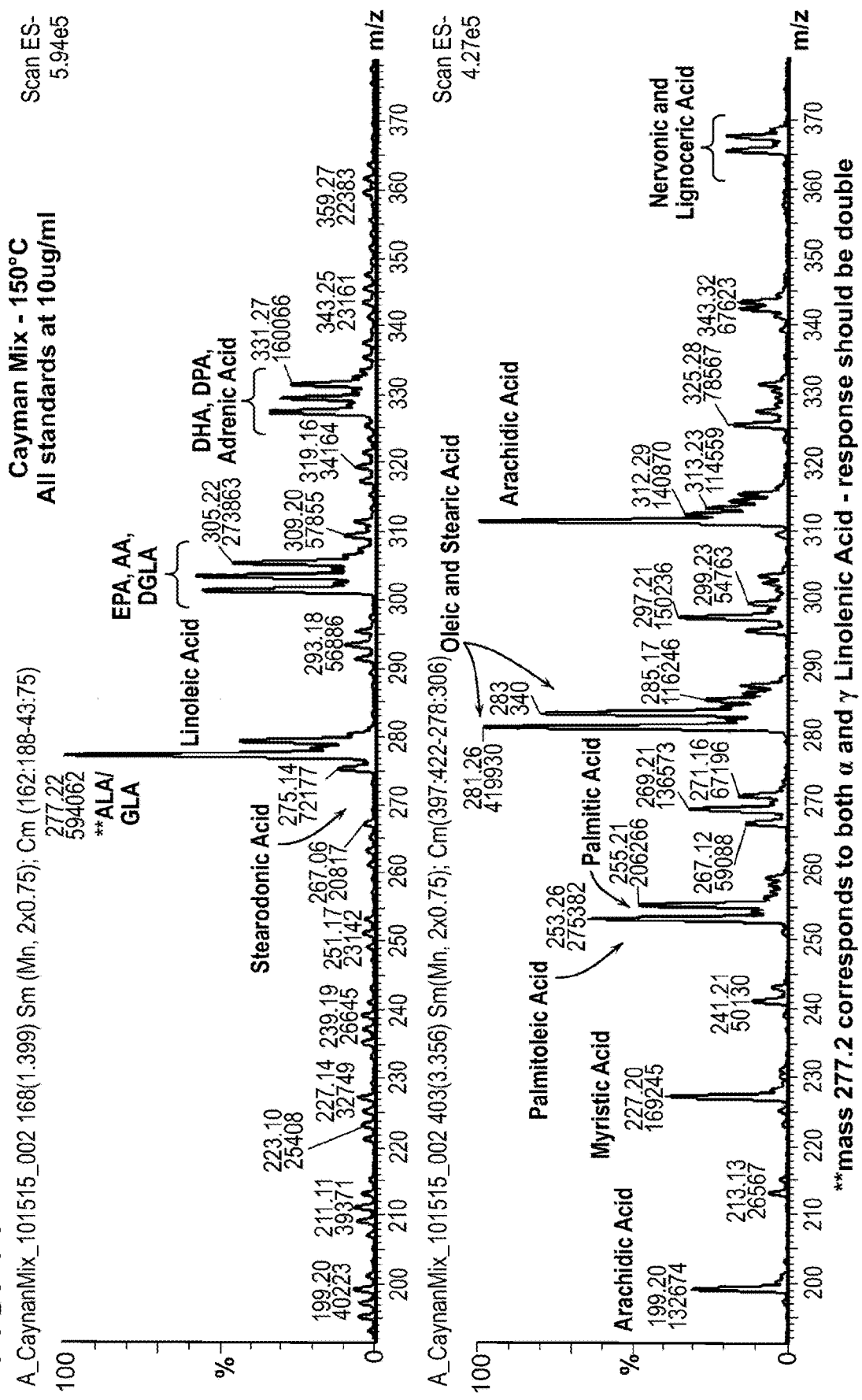
FIG. 14 shows the analysis of the fatty acid standard mix at 150° C. as tested in Example 2.
Figure 15:
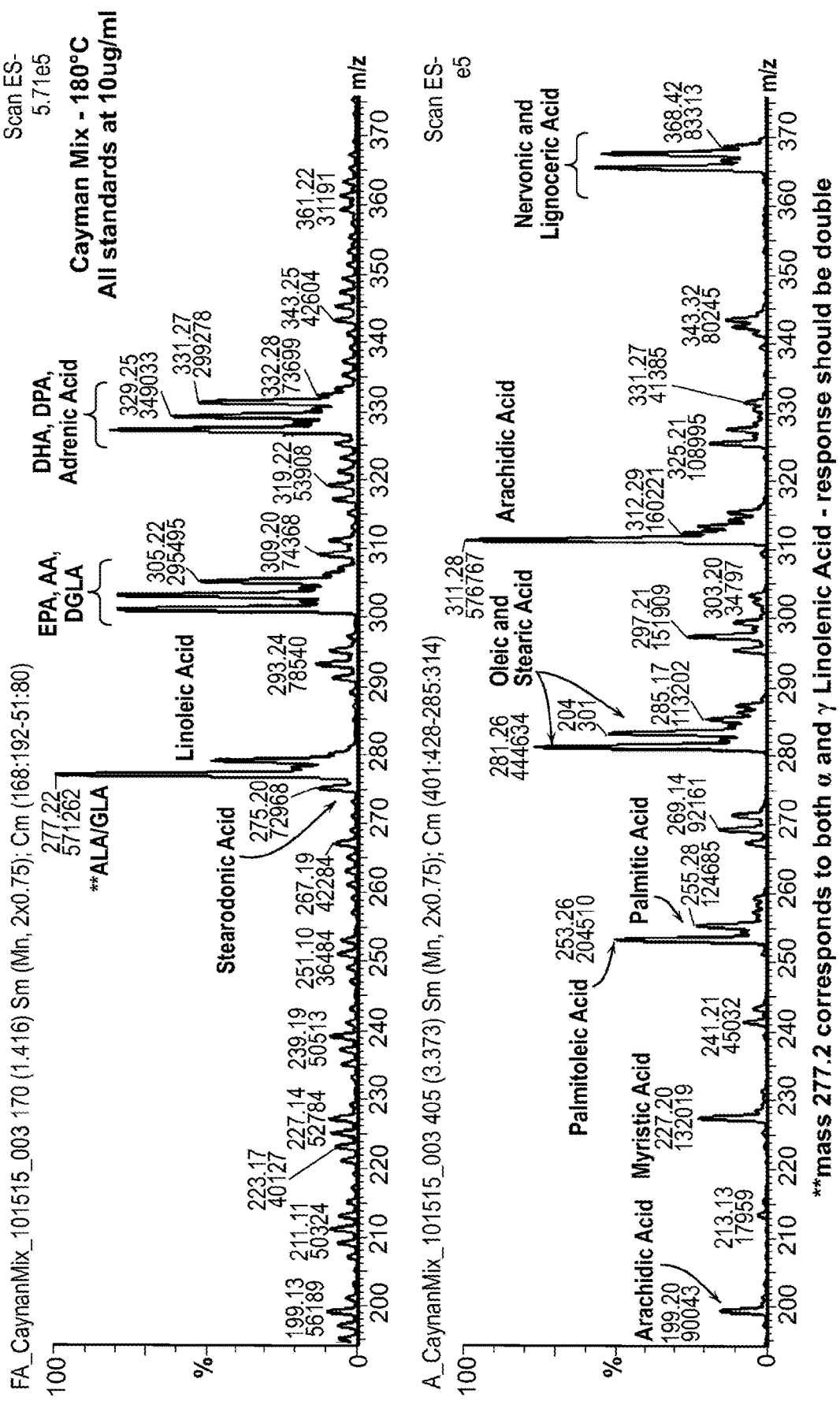
FIG. 15 shows the analysis of the fatty acid standard mix at 180° C. as tested in Example 2.
Figure 16:
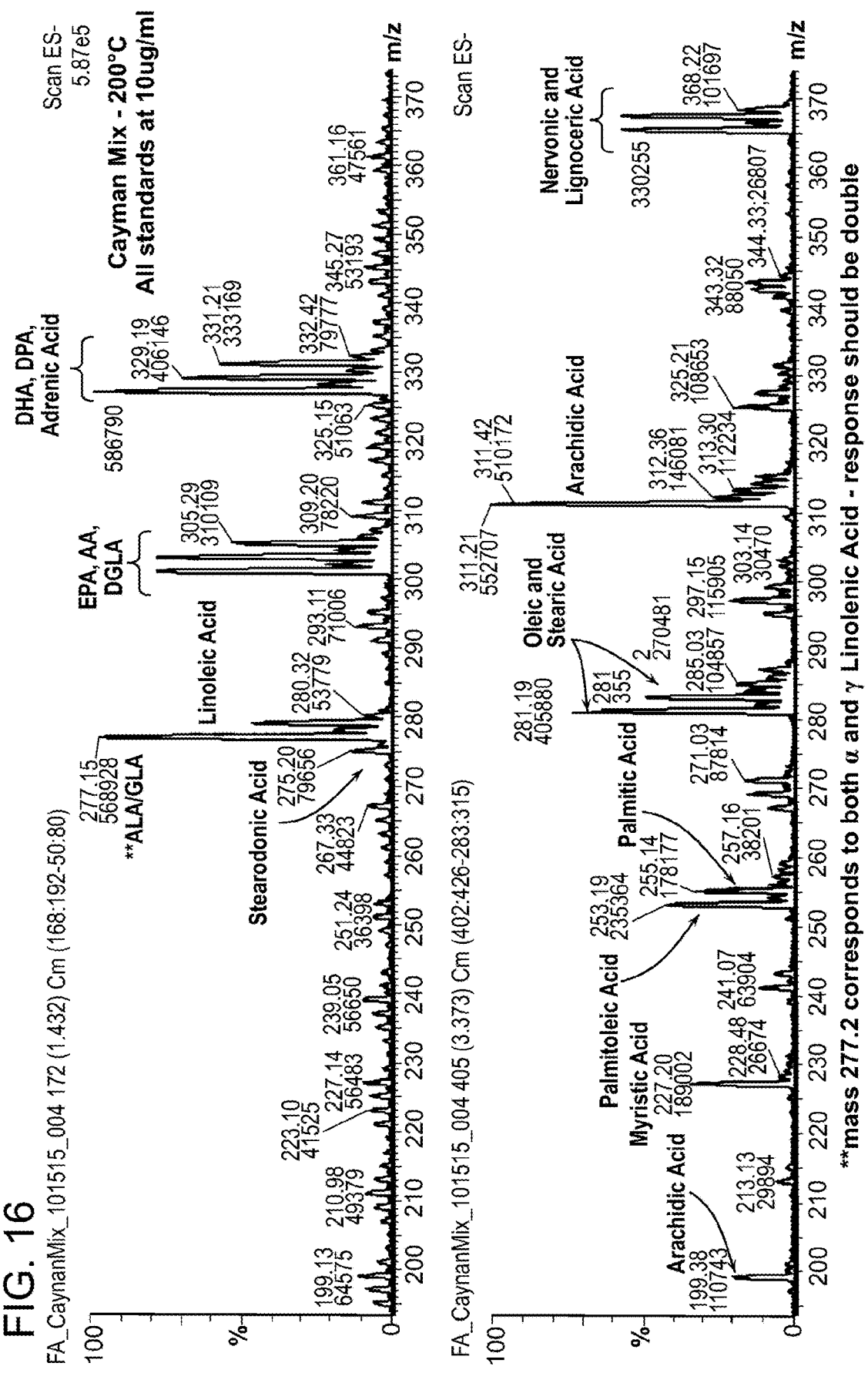
FIG. 16 shows the analysis of the fatty acid standard mix at 200° C. as tested in Example 2.
Figure 17:
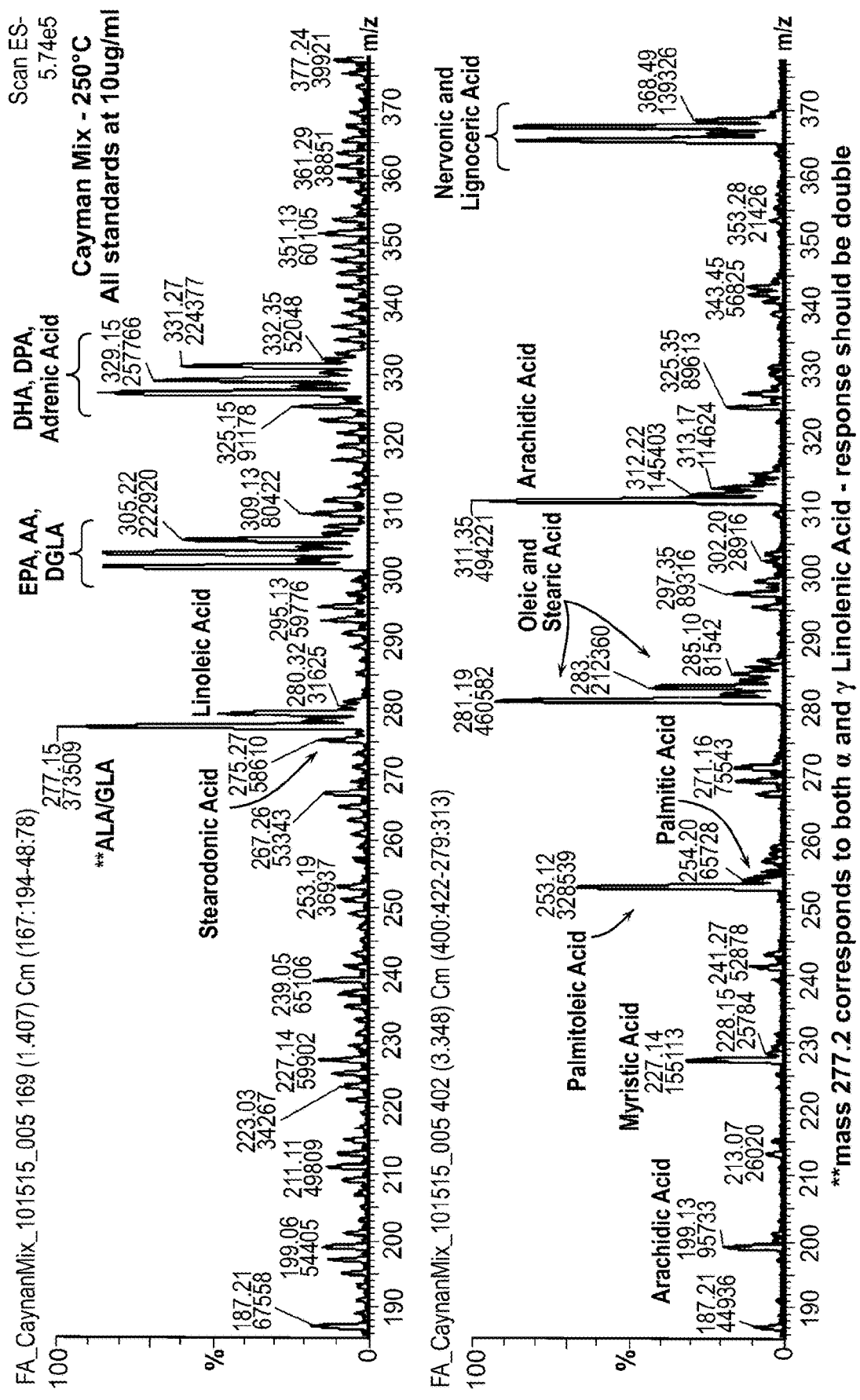
FIG. 17 shows the analysis of the fatty acid standard mix at 250° C. as tested in Example 2.
Figure 18:
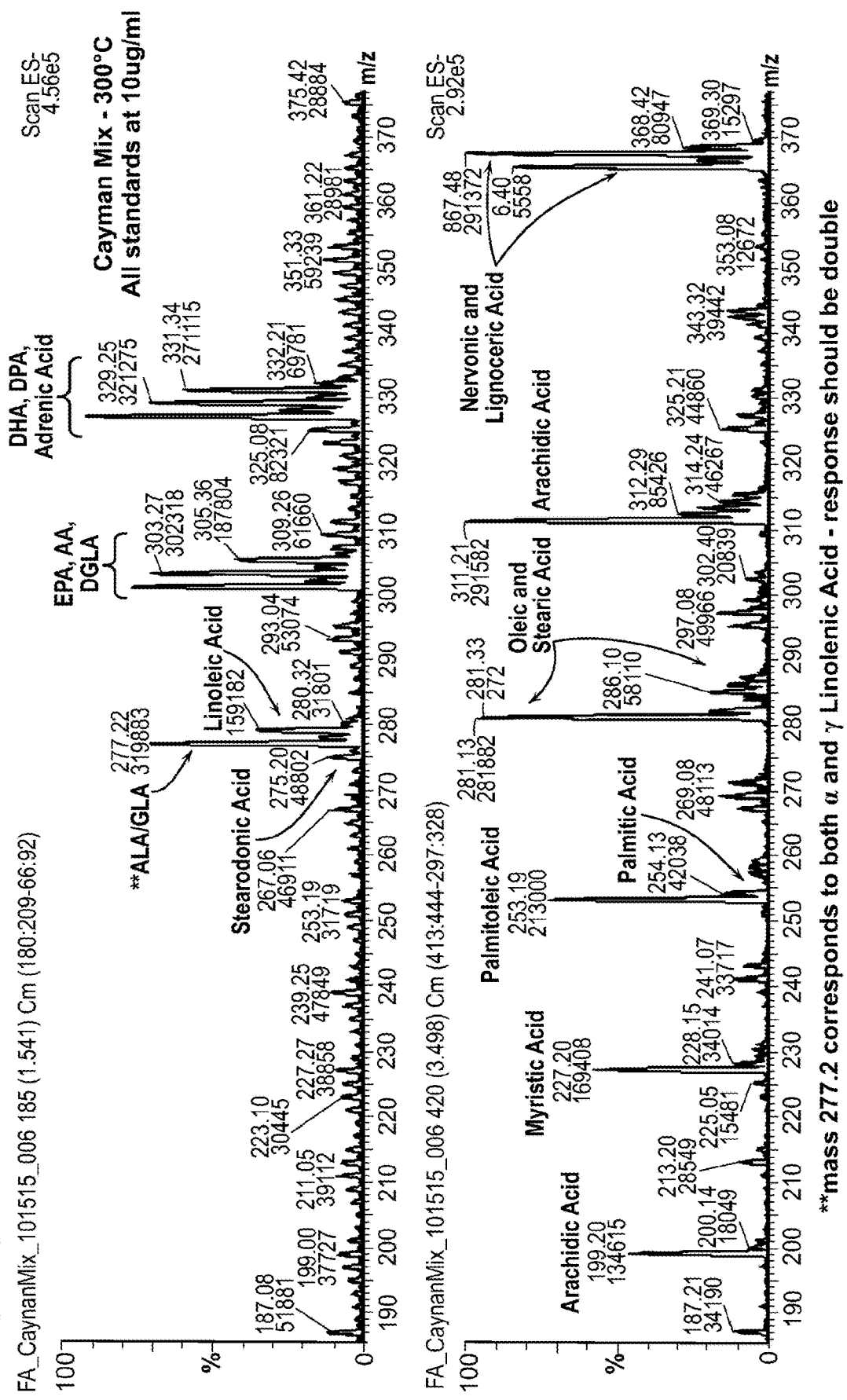
FIG. 18 shows the analysis of the fatty acid standard mix at 300° C. as tested in Example 2.

As stated above the mass range was limited to 255 to 327 for portions of these analyses. The response for the fatty acids in this range present in the standard mix appeared to be comparable at an ionization temperature of 200° C., demonstrated in FIG. 12. FIG. 12 shows the mass spectrum of the fatty acid standard mix. Peaks are identified as the following (A) SA, (B) ALA and GLA, (C) LA, (D) EPA, (E) AA, (F) DGLA, (G) DHA, (H) DPA, and (J) Adrenic Acid. Peak B is expected to have twice the response of the other fatty acids in the mix because it represents both alpha and gamma isomers of linolenic acid. FIGS. 13-18 show the analysis as varying temperatures, e.g., 130° C.-300° C.

Figure 19:
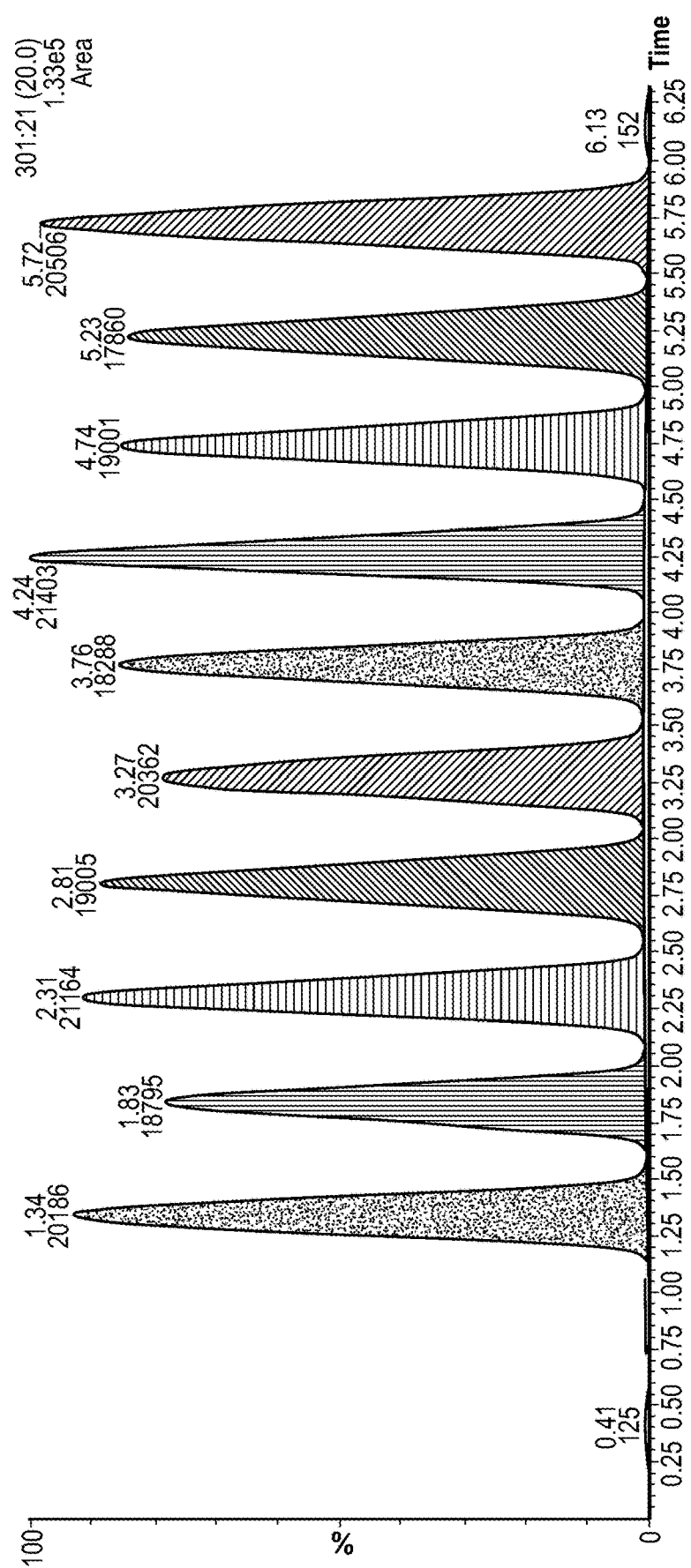
FIG. 19 shows the analysis of ten replicate samples containing the same mixture of fatty acid standards demonstrating reproducibility of the ambient ionization and mass spectrometry detection technique.

The repeatability of the method was also tested. The fatty acid standard mix was spotted ten times on a QuickStrip™ sample card (IonSense, Saugus, Mass.) for replicate analysis. FIG. 19 shows the extracted ion for EPA (mass 301.2). Each peak represents one spot on the QuickStrip™ card, which have been integrated to compare the peak areas. The peak areas are consistent. FIG. 20 show the comparison of the expected and experimental (n=10) percentage of each fatty acid present in the standard mix. The experimentally determined percentage of fatty acid mixture matched the expected percentages.

Overall, the present analysis allows for rapid screening of omega fatty acid supplements with sample dilution as the only sample preparation step needed prior to analysis. Using the developed method, up to twelve samples can be analyzed in approximately 6 to 7 minutes. Through the use of known standards, the present method (i.e., methods using DART®-QDa® technologies) was determined to be accurate and repeatable. The experimentally determined levels corresponded well with the reported levels in all three oil supplements. The DART®-QDa® technology (available from the combination of IonSense, Inc. Saugus Mass. and Waters Corporation, Milford, Mass.) has the potential for a variety of other applications outside of the analysis of oil supplements.

Figure 21:
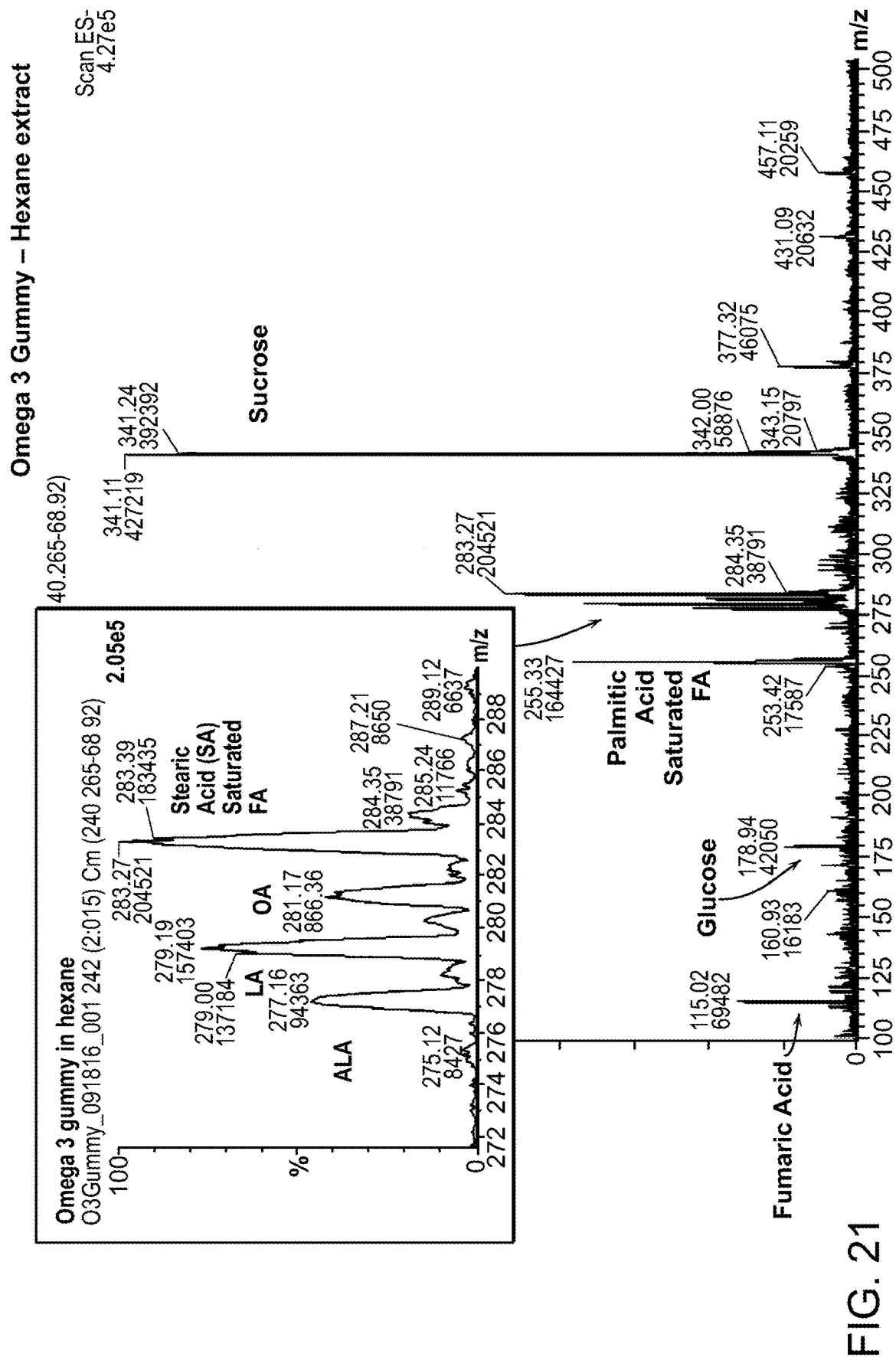
FIG. 21 shows a hexane extract of an omega 3 gummy vitamin. The inset picture shows an enlarged region and identifies the fatty acids present in the sample (e.g., ALA, LA, OA, and stearic acid). Other compounds listed on the ingredients tab of the supplement bottle are also identified.

Omega 3 gummy vitamins were also tested. The compounds were extracted with either hexane or methanol. FIG. 21 shows a hexane extract of an omega 3 gummy vitamin. The inset picture shows an enlarged region and identifies the fatty acids present in the sample (e.g., ALA, LA, OA, and stearic acid). Other compounds listed on the ingredients tab of the supplement bottle are also identified.

Figure 22:
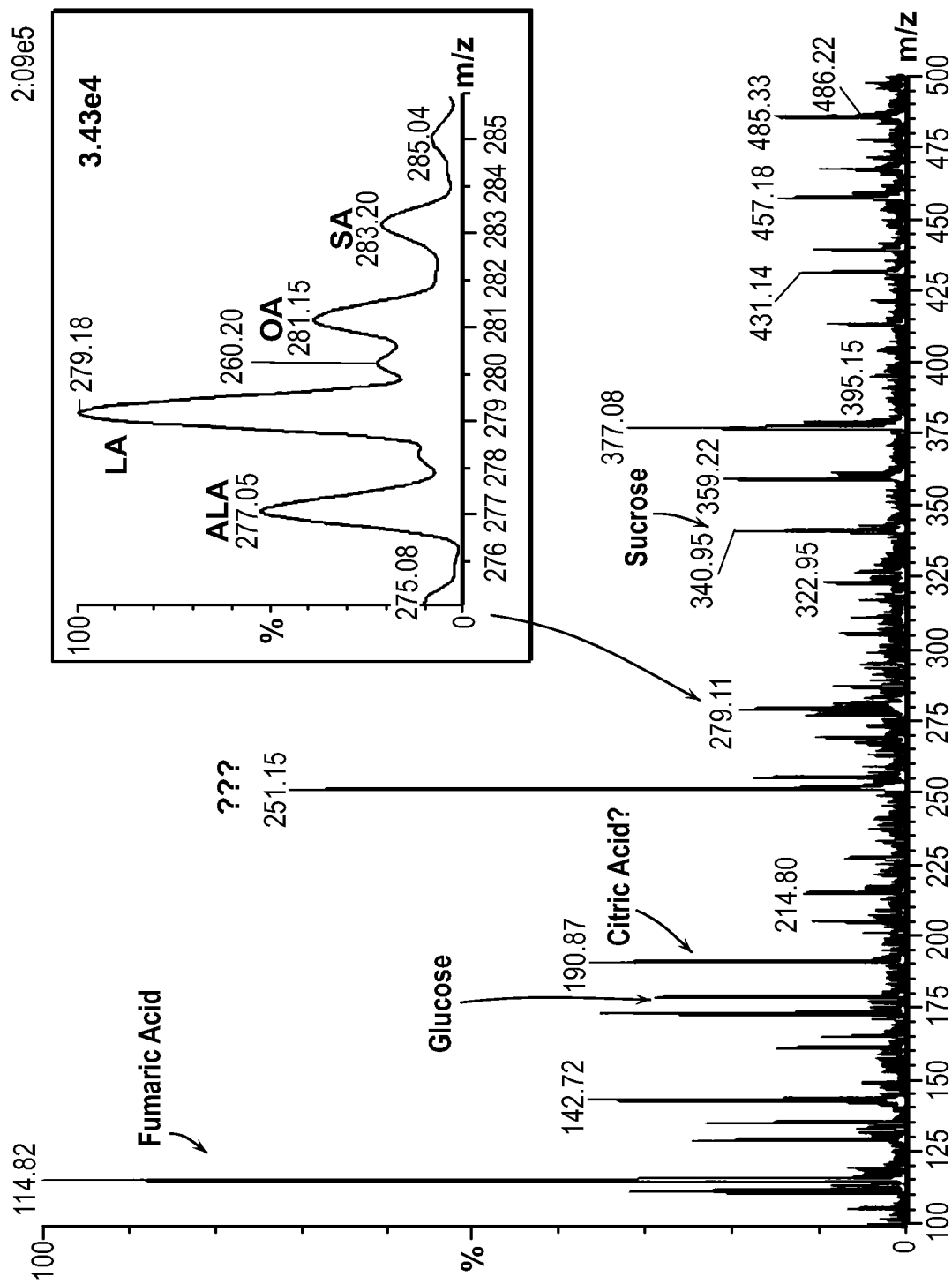
FIG. 22 shows a methanol extract of an omega 3 gummy vitamin. The inset picture shows an enlarged region and identifies the fatty acids present in the sample (e.g., ALA, LA, OA, and stearic acid). Other compounds listed on the ingredients tab of the supplement bottle are also identified.

FIG. 22 shows a methanol extract of an omega 3 gummy vitamin. The inset picture shows an enlarged region and identifies the fatty acids present in the sample (e.g., ALA, LA, OA, and stearic acid). Other compounds listed on the ingredients tab of the supplement bottle are also identified.

Figure 23:
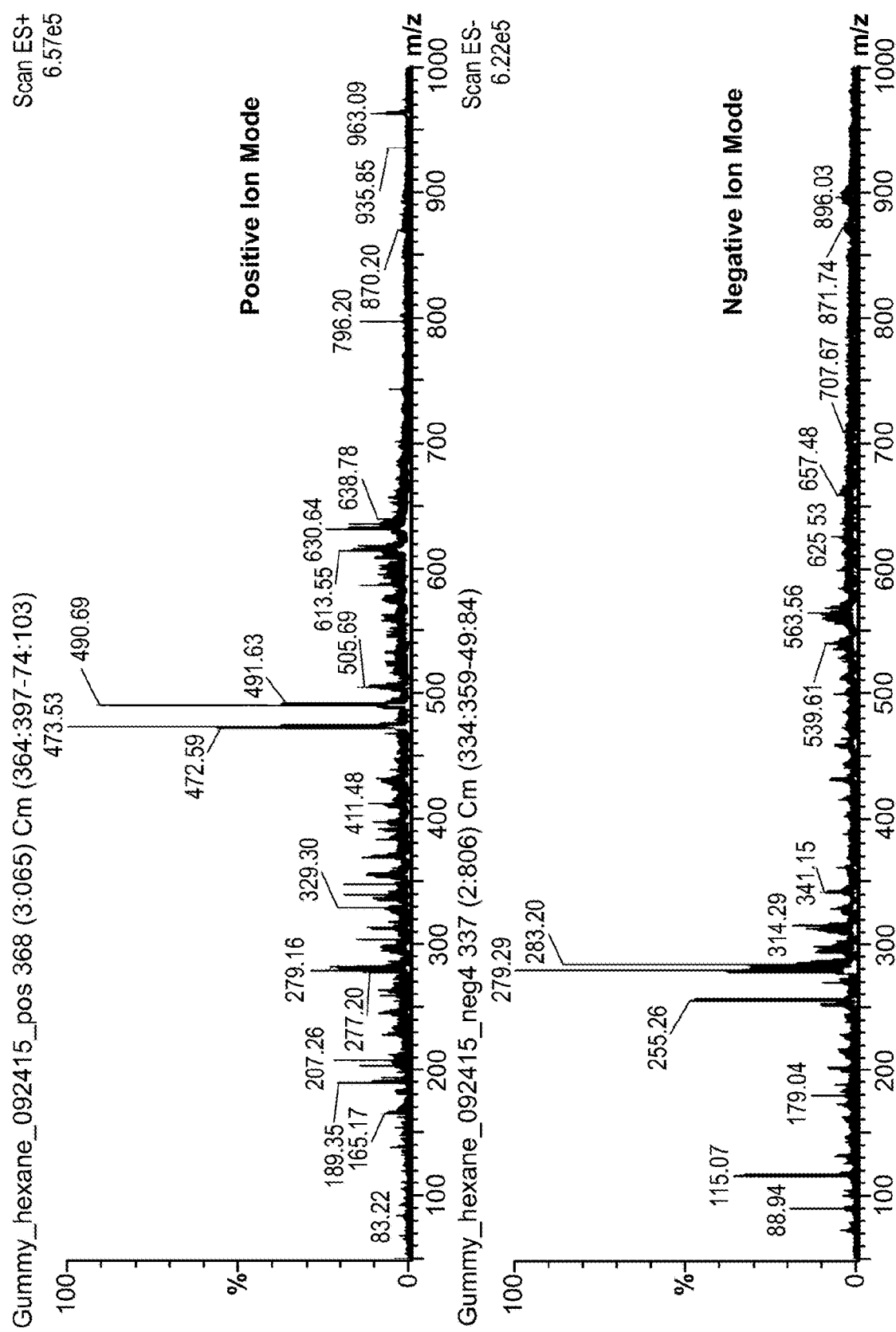
FIG. 23 shows a hexane extract of an omega 3 gummy vitamin comparing positive ionization and negative ionization.

FIG. 23 shows a hexane extract of an omega 3 gummy vitamin comparing positive ionization and negative ionization.

Example 3—Authentication of Whiskey

Whiskey labeling and branding is highly regulated to protect distillers and consumers. The development of analytical tools to quickly and easily authenticate whiskeys is important to protect consumers and distillers alike. Real-time authentication of various whiskey samples was performed using the small, portable ambient ionization and mass spectrometry detection system described in Example 1.

Twelve different brands of whiskey were analyzed, including samples of bourbons (Kentucky and Tennessee), Irish whiskey, blended scotch, and single malt scotch. A method based on the ambient, real time technologies presented in this application (e.g., DART®-QDa®) was established to provide the most unique mass spectra for each sample. The method conditions included a cone voltage to induce fragmentation to provide more unique characteristic ions for each whiskey sample. The fragmentation generated a stronger model. Thirty (30) samples of each whiskey were analyzed for PCA and LDA model building. The DART® ionization temperature (IonSense, Inc., Saugus, Mass.) temperature was 350° C., sampling speed was 0.5 mm/sec, positive ion mode, exit grid voltage was +350 V, mass range was 50-500 amu, scanning rate was 2 Hz, and the cone voltage was 30 V.

Thirty replicates of each brand of whiskey were collected. The data obtained was used to construct both a PCA and a LDA based statistical model using model building software. The statistical model generated was used to make identifications of unknown whiskey samples as the mass spectra were being acquired or by a raw data file provided.

Figure 24:
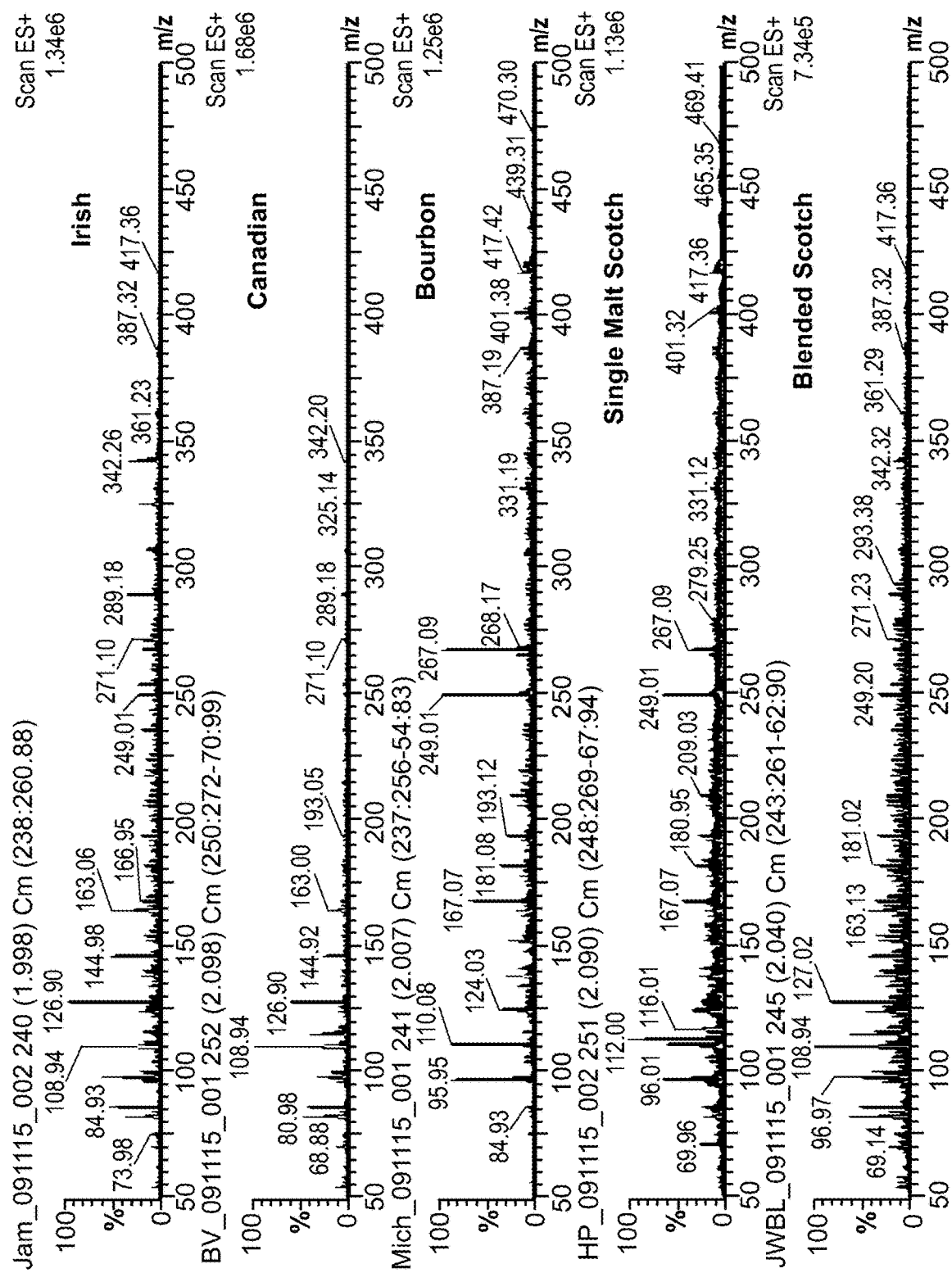
FIG. 24 shows exemplary mass spectra for representative whiskey samples as tested in Example 3.
Figure 25:
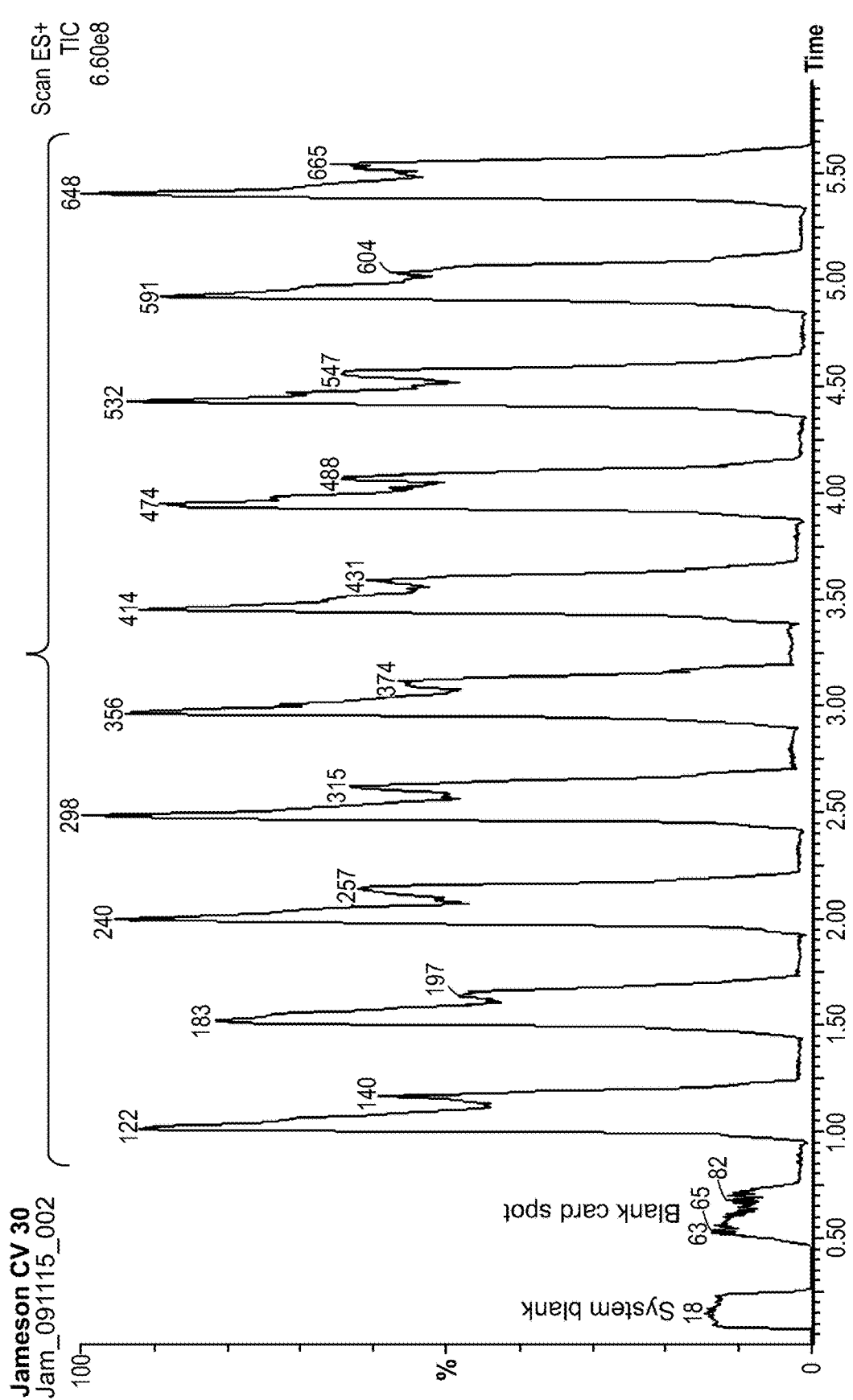
FIG. 25 shows replicate analyses of a single whiskey sample spotted ten times on a QuickStrip™ sample card (available from IonSense, Inc., Saugus, Mass.) as tested in Example 3.

The present method generated unique mass spectra for each of the twelve whiskey samples tested. FIG. 24 shows exemplary mass spectra for representative samples of each type of whiskey. The method was repeatable. A single whiskey was spotted ten times on a QuickStrip™ sample card for replicate analysis. FIG. 25 shows the peak areas are consistent.

Figure 26:
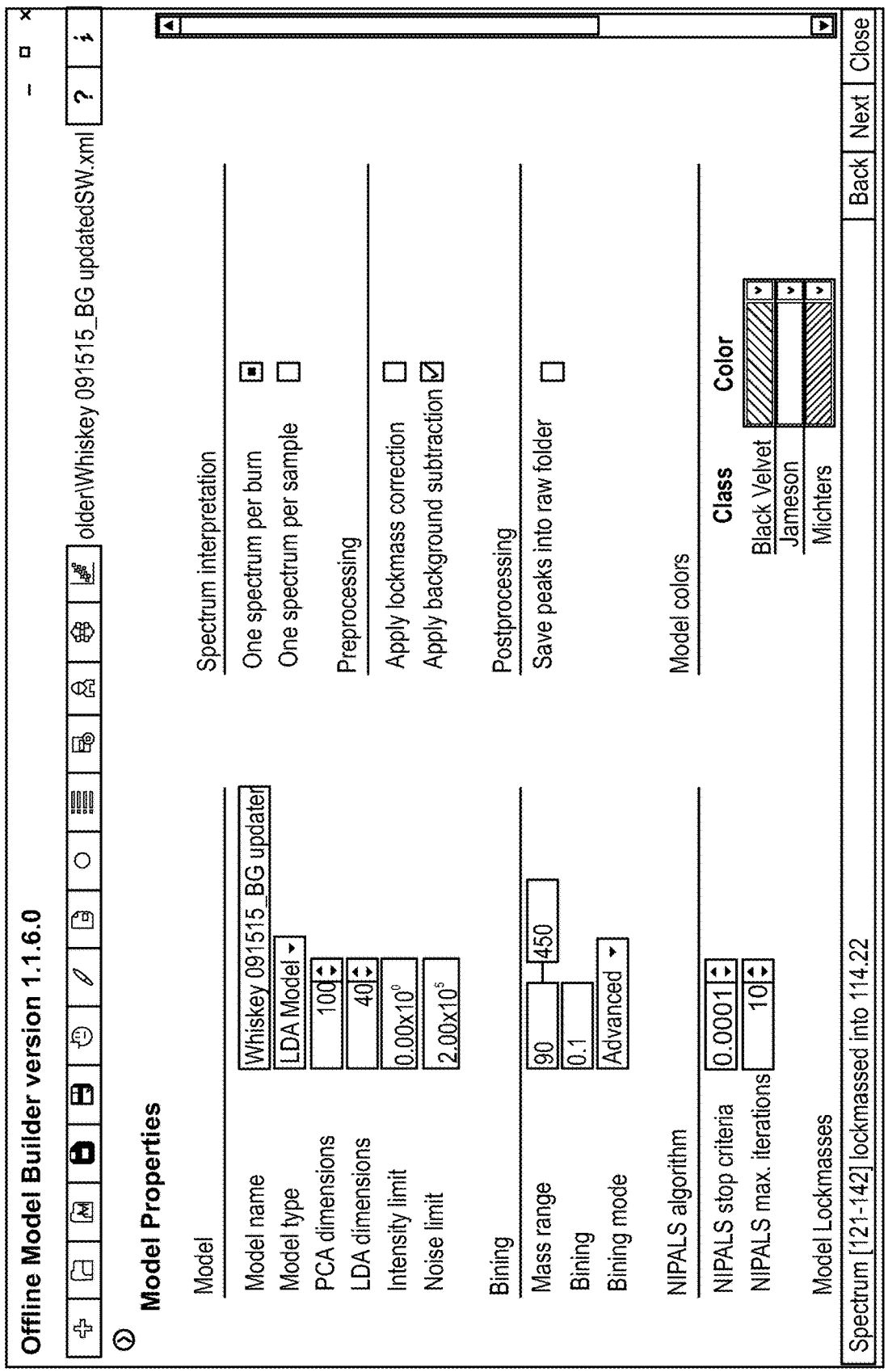
FIG. 26 shows an exemplary set of model properties used for the model building.

The data was compiled into the statistical models wherein each brand of whiskey has data points clustered into distinct groups. FIG. 26 shows an exemplary set of model properties used for the model building. FIG. 26 describes all the parameters used to generate the model. The model was generated using 30 spots of each whiskey.

Figure 27:
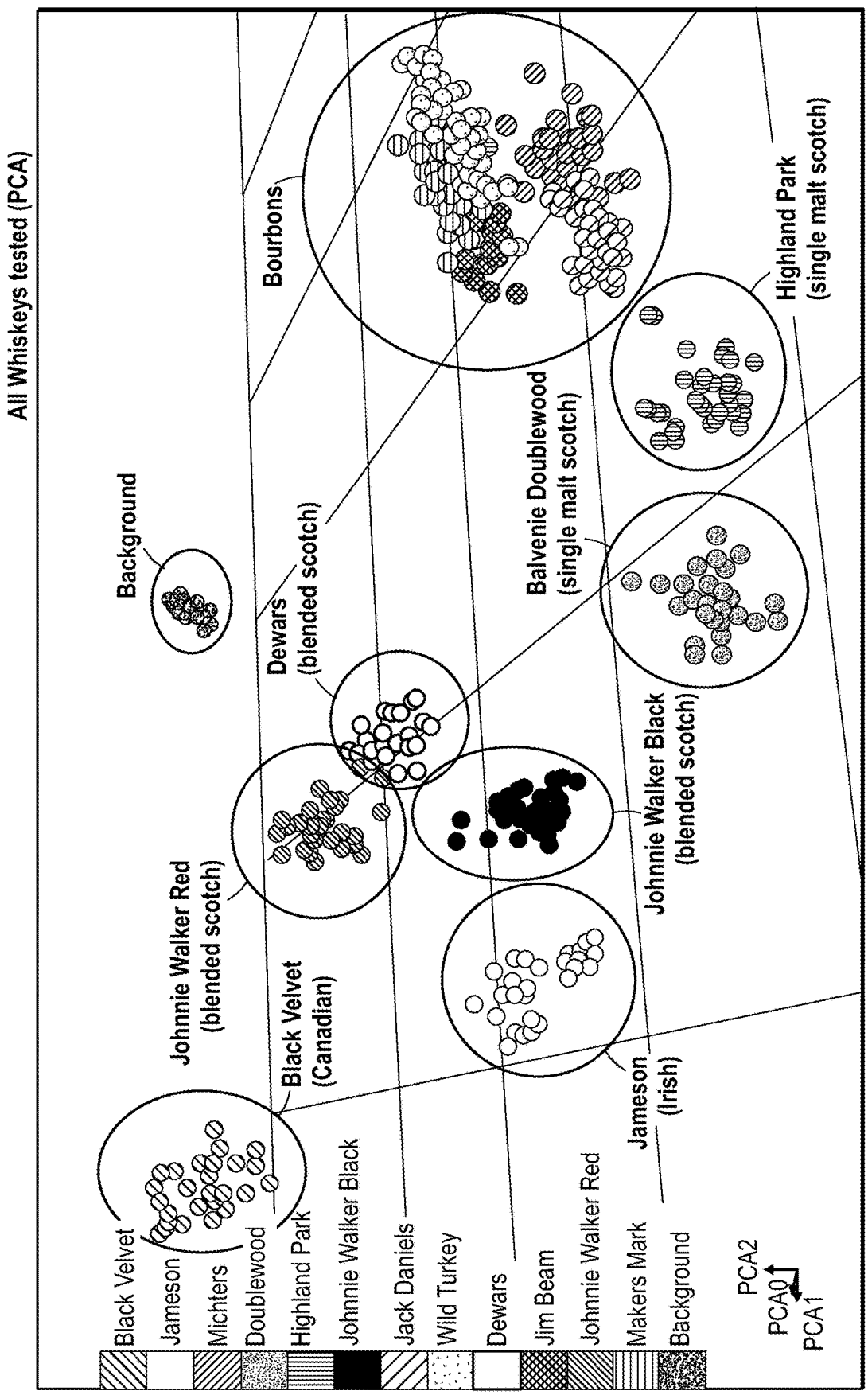
FIG. 27 shows an exemplary PCA plot based on the mass spectra for each whiskey sample as tested in Example 3.
Figure 28:
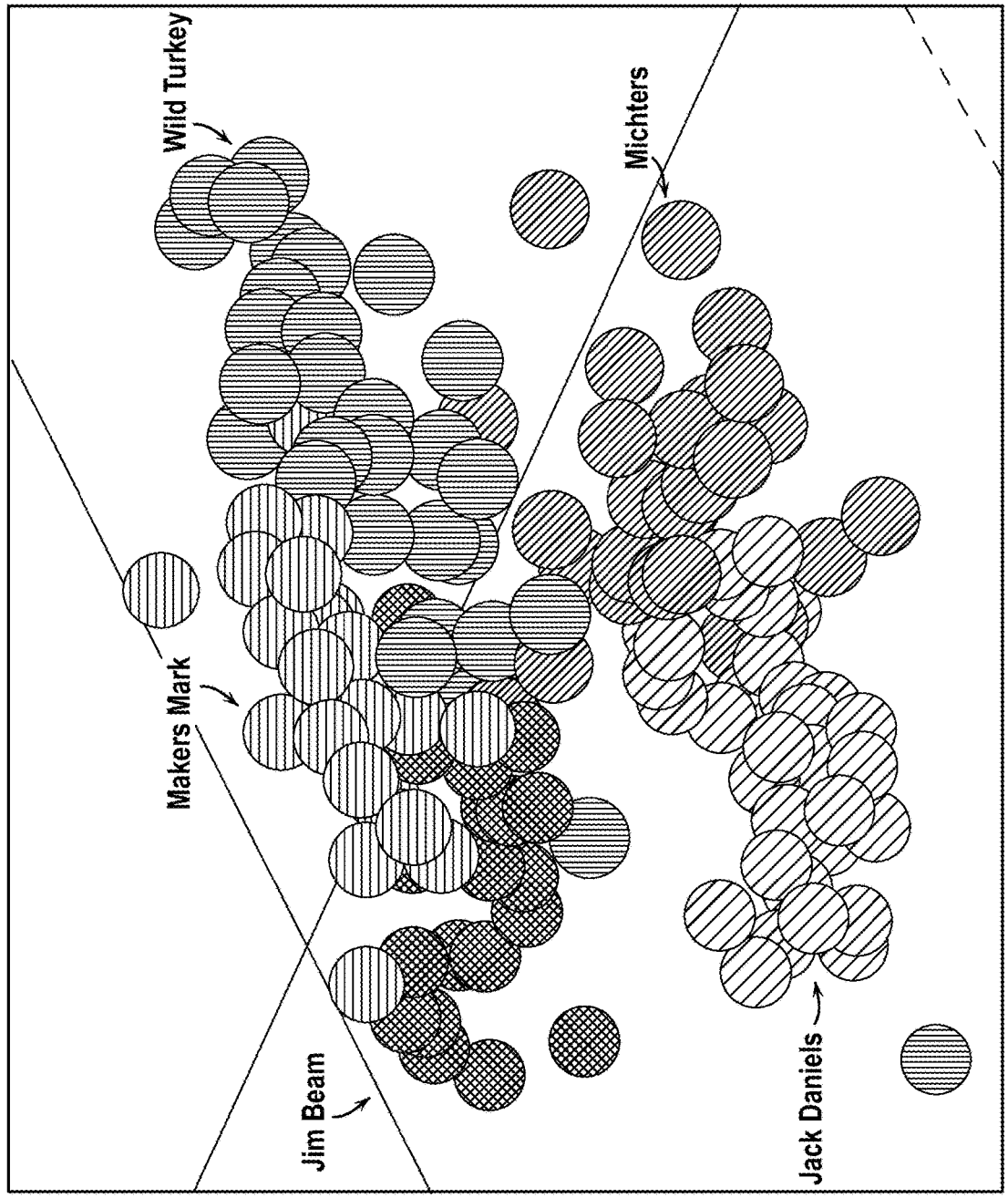
FIG. 28 shows a more detailed view of the PCA plot of the bourbons in FIG. 27.
Figure 29:
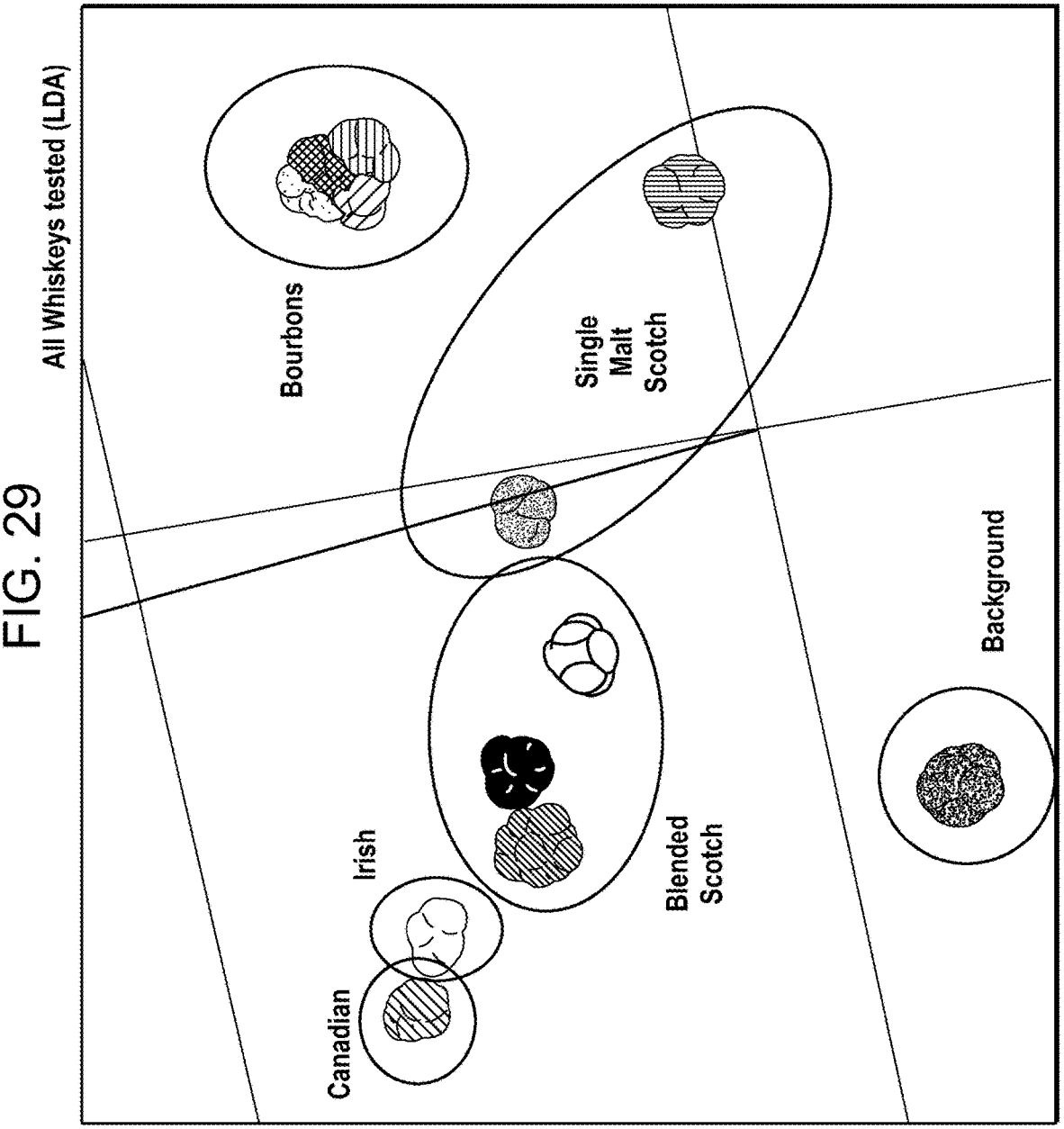
FIG. 29 shows an exemplary LDA plot based on the mass spectra for each whiskey sample as tested in Example 3.

The present method and model can generate a PCA plot. FIG. 27 is a representation of the mass spectra for each whiskey sample or whiskey sample type. Each type of whiskey has data points off set from the other samples and clustered together. FIG. 27 shows the model of the 30 spots of the 12 different whiskey samples. The points are off set from each other because the PCA model has distinguished ions and ion intensities that are representative of each whiskey sample. The points cluster to distinguish what group they belong to. FIG. 28 shows a more detailed view of the bourbons in FIG. 27. Even though they appear closer, the individual bourbon sample data points are off set from each other and clustered together. FIG. 29 show a LDA plot as a representation of the mass spectra for each whiskey sample or whiskey sample type. Both the PCA and LDA plot show that each type of whiskey has data points off set from the other samples and clustered together. PCA is an unsupervised form of multivariate analysis, whereas LDA is a supervised form of multivariate analysis. In the software, both are generated in the same sequence of steps.

Unknown samples of each of the whiskeys were compared to the model to identify the sample by brand. Sample identification was performed both in real time during sample acquisition as well as by providing a raw data file already acquired. The unknown whiskey samples were all successfully identified in real time with greater than 97% confidence. Amongst all the samples, the five bourbons analyzed were most similar when statistically modeled. Despite their similarity, they were successfully identified by brand in the twelve whiskey model.

The current study demonstrates the utility of the present method (e.g., DART®-QDa®) in the authentication of whiskeys. This technology can be used to rapidly screen bottles of whiskeys to determine the need for further analysis of suspect samples. The technology can also be used in applications in the distillery to monitor the quality of production and blending of whiskeys.

Example 4—Authentication of Tobacco

There is a need for rapid, accurate and cost effective aroma and flavor monitoring technology to improve product quality and reduce production costs. Off-odor and off-taste problems are estimated to cost the food and beverage industries in excess of 1.2 billion dollars annually. Real-time authentication of tobacco samples was performed using the small, portable ambient ionization and mass spectrometry detection system described in Example 1.

Four types of chewing tobacco products were tested, including natural flavored (i.e., unflavored), mint flavored, classic straight flavored and wintergreen flavored. Aroma sampling of the various flavored chewing tobacco was performed by placing the open can of tobacco beneath the DART® ionization source (IonSense, Inc., Saugus, Mass.). Ionization of the volatile components in the sample occurred with no sample preparation.

Figure 30:
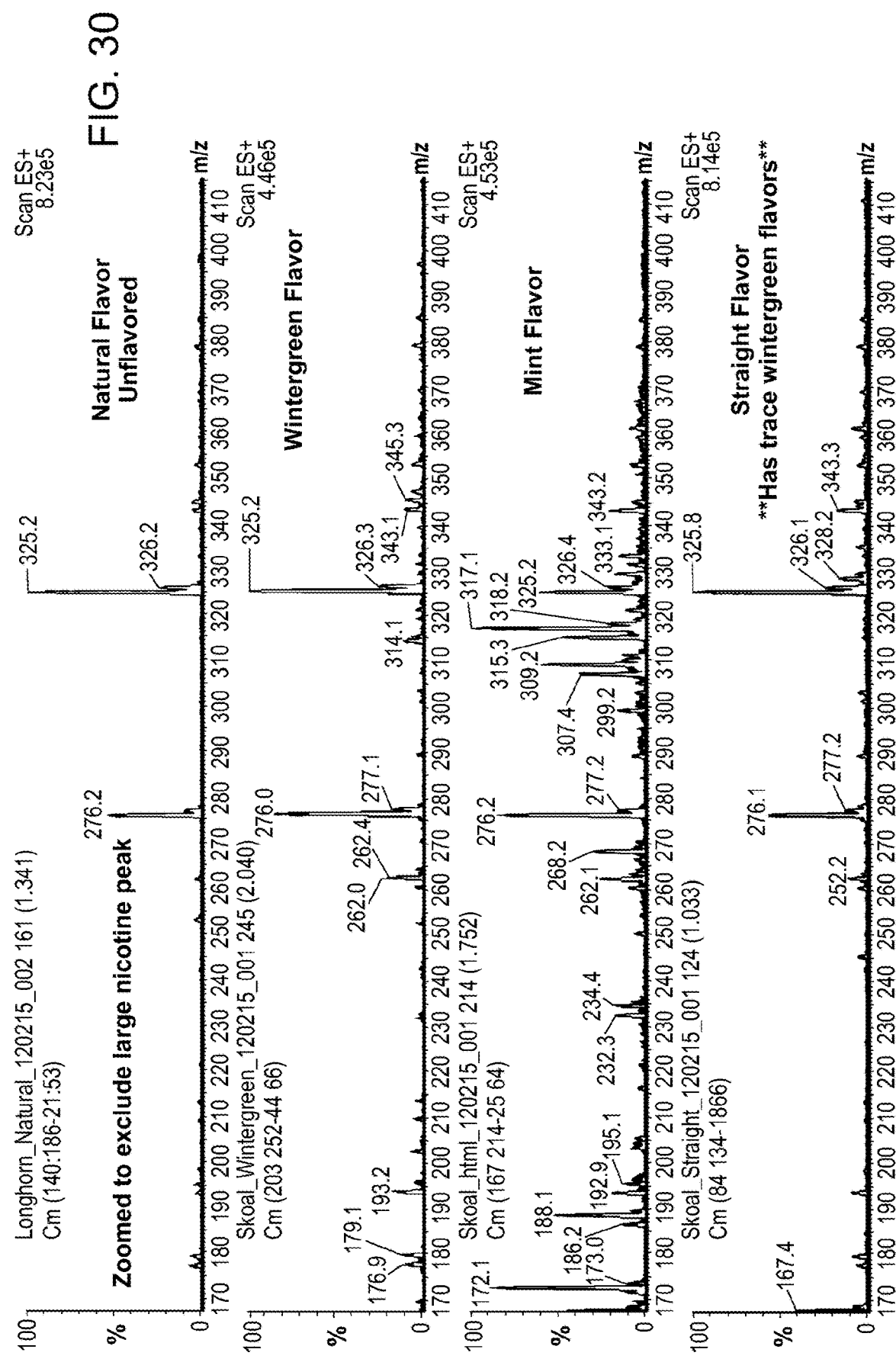
FIG. 30 shows the mass spectra of the four types of tobacco samples tested as tested in Example 4.

The present method (i.e., DART®-QDa® technology) and model was used to create both PCA and LDA models for real time recognition of samples. FIG. 30 shows the mass spectra of the four types of samples tested. These mass spectra are zoomed to the right of the nicotine peak as the nicotine peak is large and can overwhelm the spectra. The large peaks at 276 and 325 are attributed to the tobacco itself since they are present in the unflavored tobacco. It was expected that the wintergreen and straight flavors would look similar because the straight variety is flavored with wintergreen, just in a different concentration. The smaller peaks in these two samples (e.g., 193, 262, 314, 343, 345) are most likely attributed to the flavor as they are absent from the unflavored tobacco.

Figure 31:
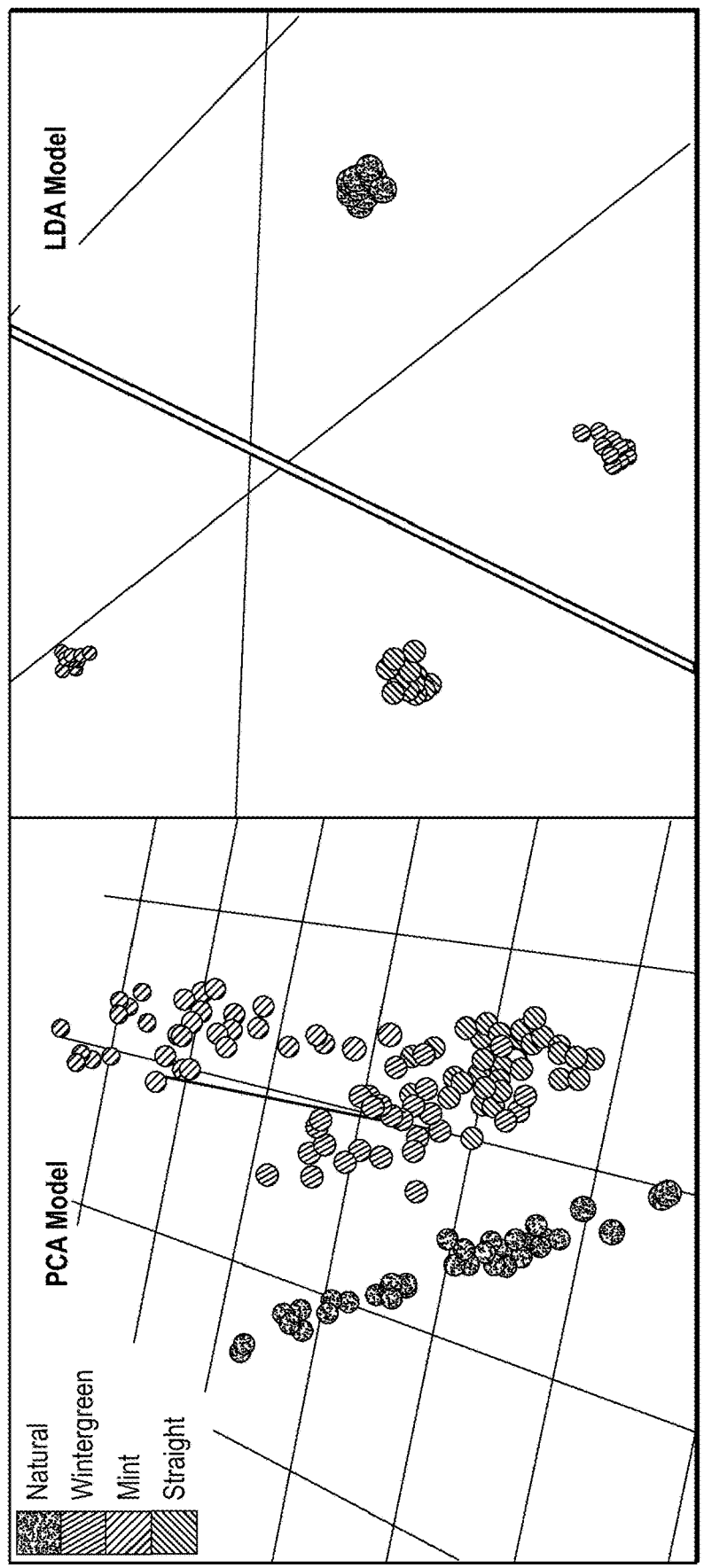
FIG. 31 shows exemplary PCA and LDA plots based on the mass spectra for each tobacco sample as tested in Example 4.
Figure 32:
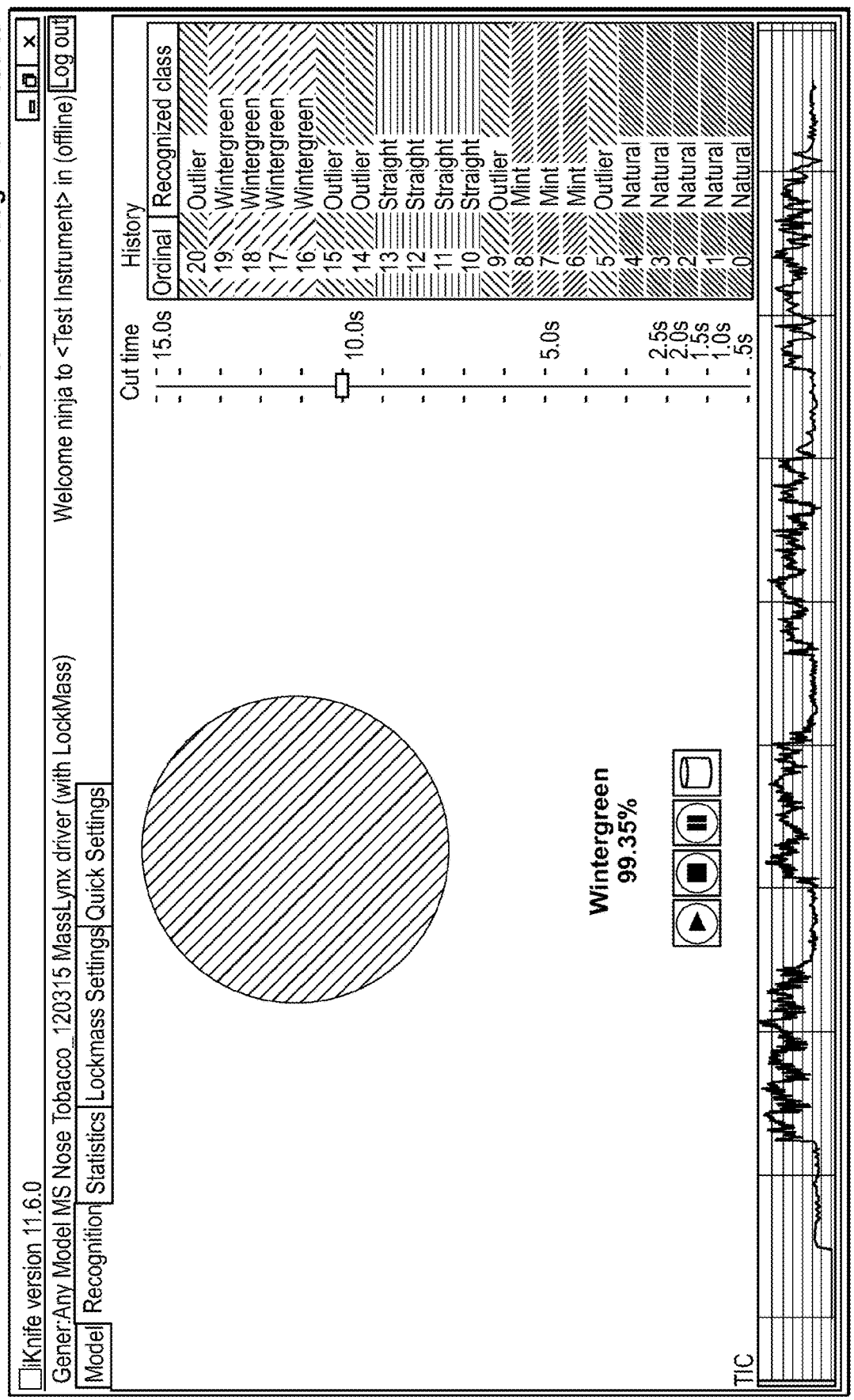
FIG. 32 shows an unknown sample being matched to the wintergreen sample with a 99% confidence value as tested in Example 4.

FIG. 31 shows both a PCA and a LDA plots for the tobacco samples. Similar to the whiskey samples, the both PCA and LDA plots show that each type of tobacco has data points off set from the other samples and clustered together. Unknown samples can be tested against one or both of these models to authenticate the samples as corresponding to one of the four types of samples tested. The correlation is performed using the real time recognition software that is based on a match to the fingerprint of ions and intensities put into the model. The unknown samples can be matched to one of the four types of samples at a confidence value, e.g. 99% confidence. FIG. 32 shows an unknown sample being matched to the wintergreen sample with a 99% confidence value.

Tobacco leaf analysis was also performed. Three leaves were tested including cigar leaf, bright leaf (Cigarette) and chewing tobacco leaf. The samples were analyzed directly. The samples were also extracted in methanol and then analyzed. The experiment was performed to determine if direct analysis of the tobacco leaves was possible. Methanol extract experiment was performed to determine if different compounds were ionized due to extraction of the leaf prior to analysis. Both experiments were successful, and showed that analysis could be performed on either the leaf or an extract of the leaf.

Figure 34:
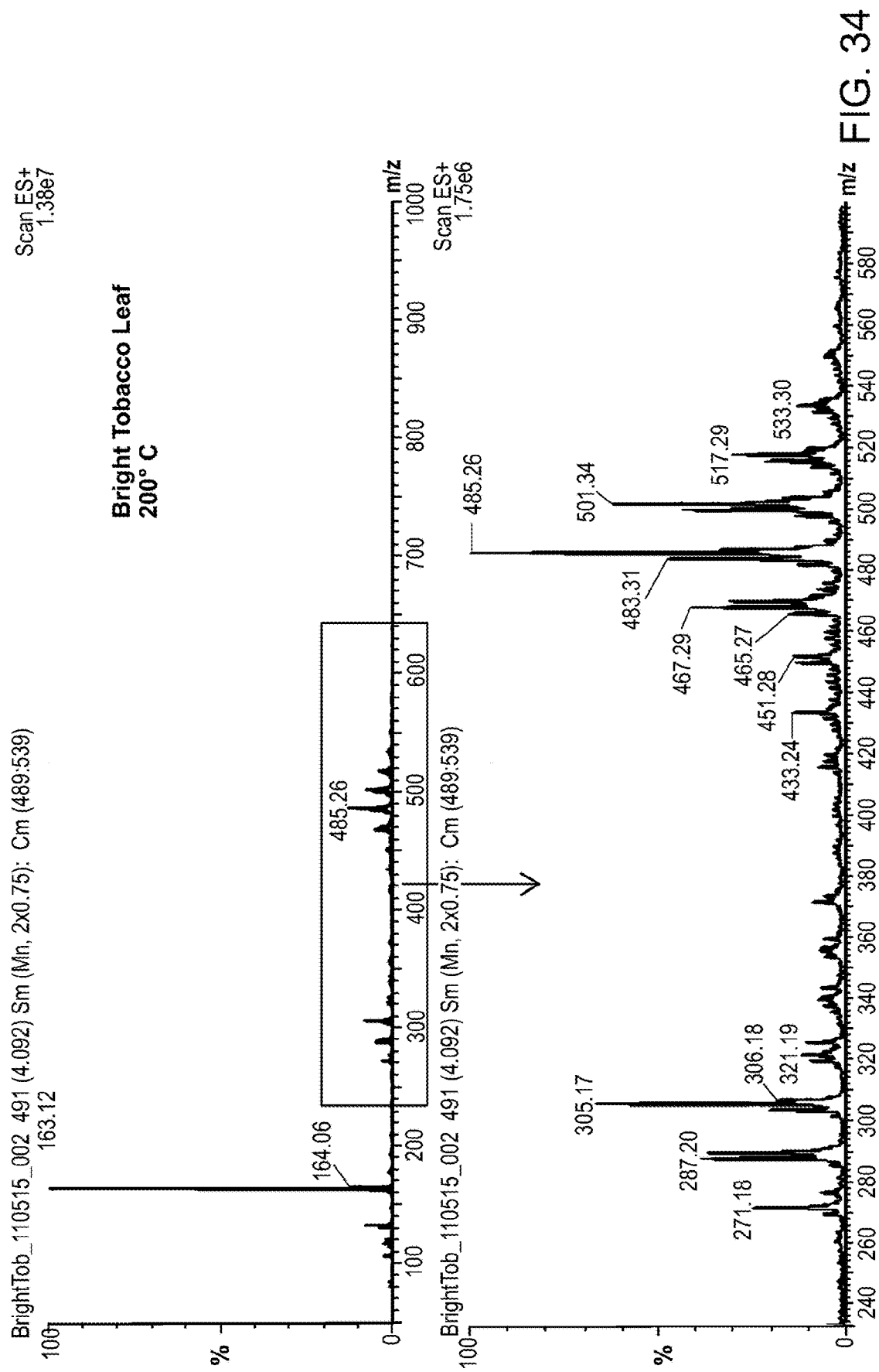
FIG. 34 shows the mass spectra of bright tobacco leaf as tested in Example 4.
Figure 35:
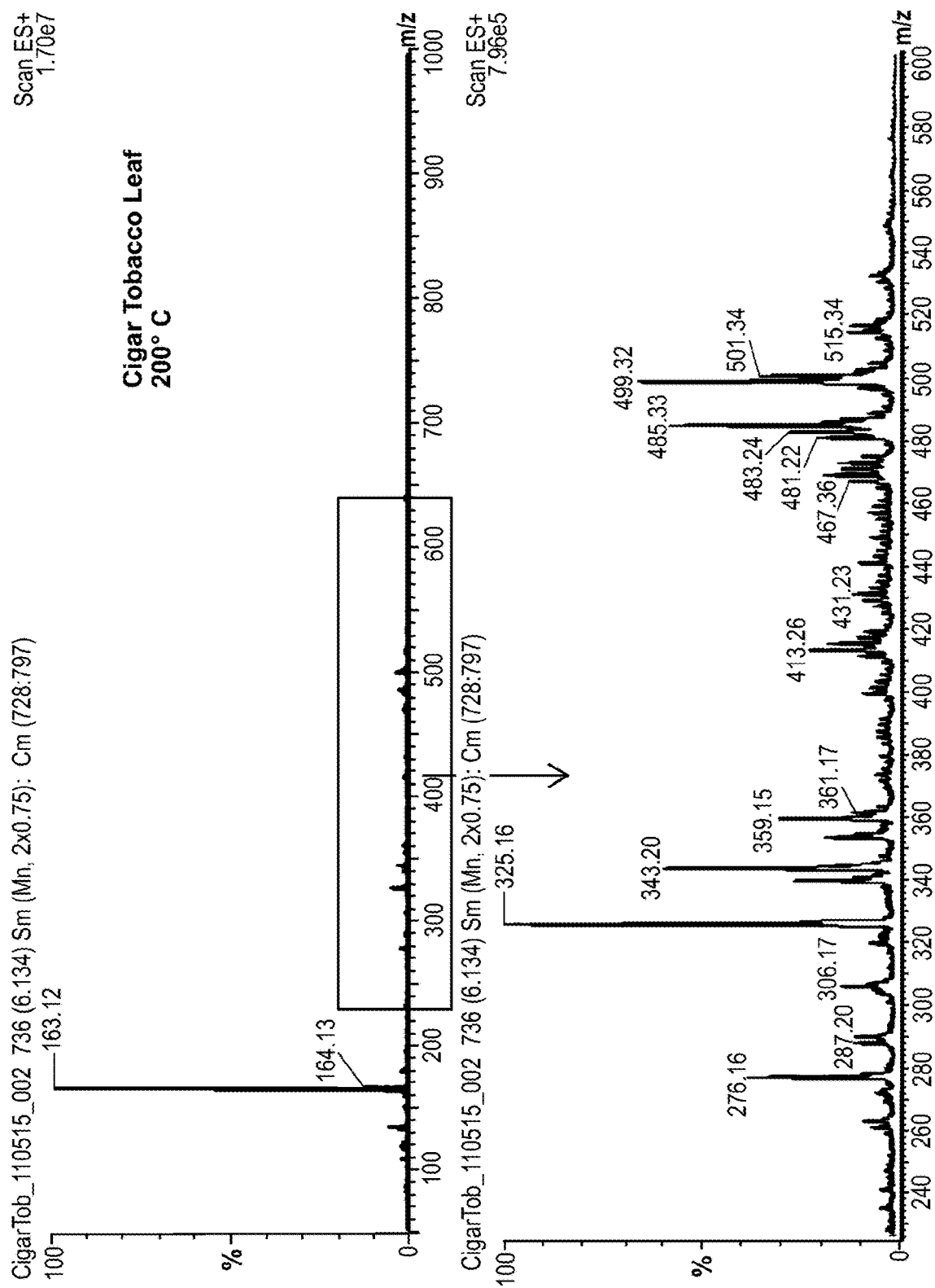
FIG. 35 shows the mass spectra of cigar tobacco leaf as tested in Example 4.
Figure 36:
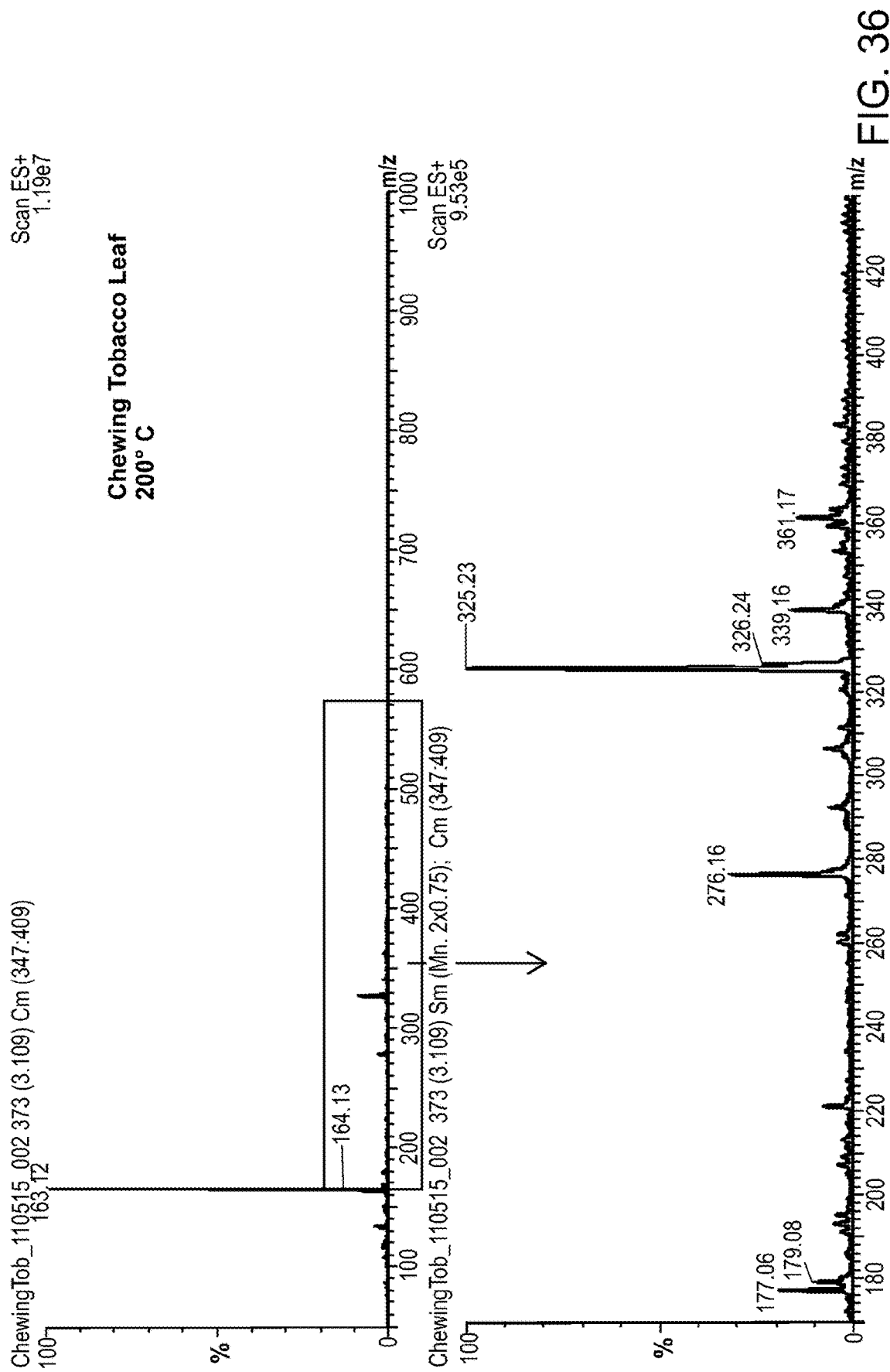
FIG. 36 shows the mass spectra of chewing tobacco leaf as tested in Example 4.

FIG. 33 shows mass spectra of bright leaf and cigar leaf after methanol extraction. The samples were tested under the following conditions: The DART® ionization source (Ion-Sense, Saugus, Mass.) parameters included: Ion Mode: Positive; Temperature: 200° C.; Cone Voltage: 5V; Mass range: 165-650. FIGS. 34-36 show the individual mass spectra of the three leaves tested with each figure showing the entire spectra (top) and the smaller peaks (bottom).

Figure 37:
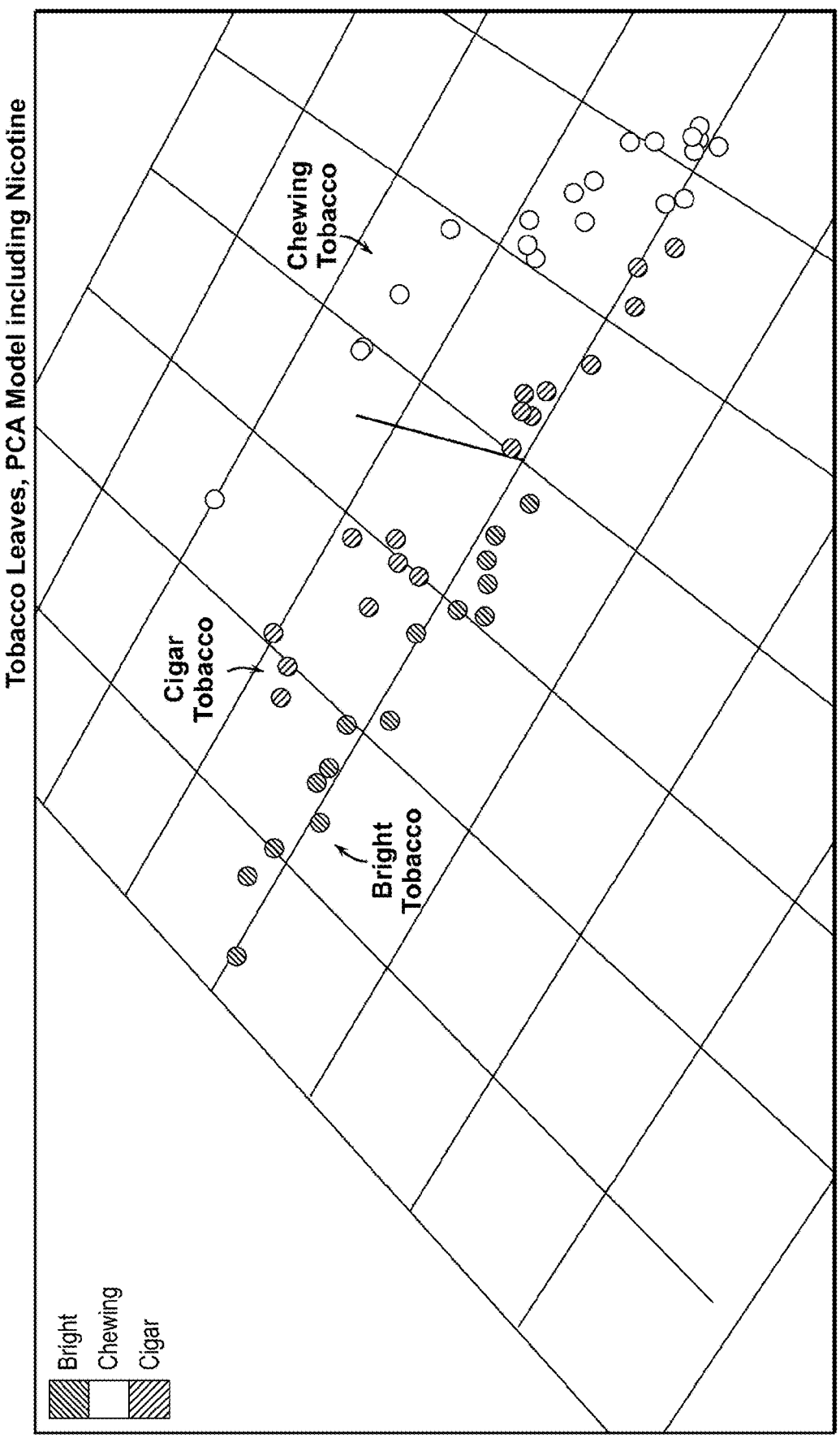
FIG. 37 shows an exemplary PCA plot based on the mass spectra for each tobacco sample as tested in Example 4 (with the nicotine peak).
Figure 38:
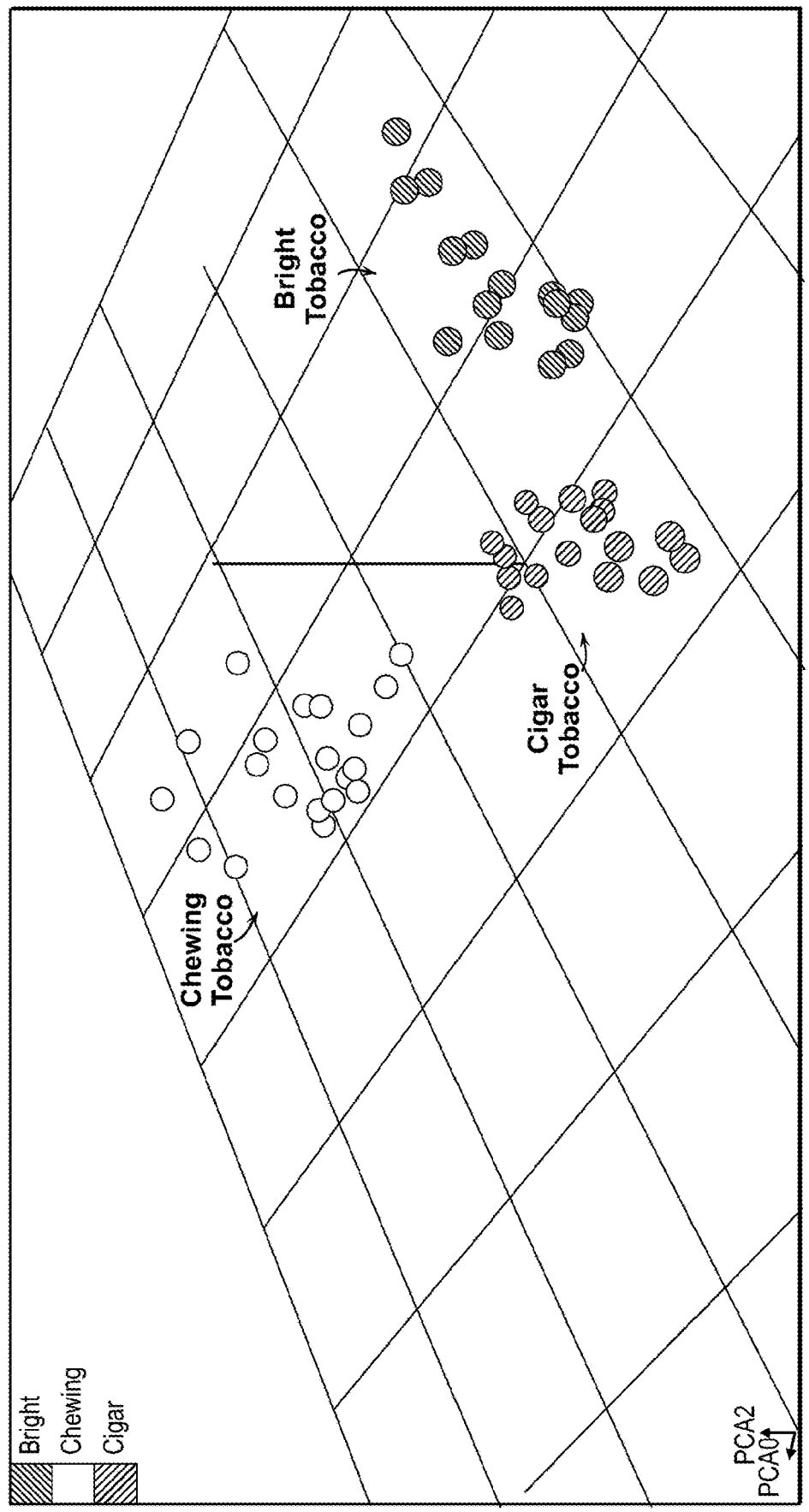
FIG. 38 shows an exemplary PCA plot based on the mass spectra for each tobacco sample as tested in Example 4 (without the nicotine peak).
Figure 39:
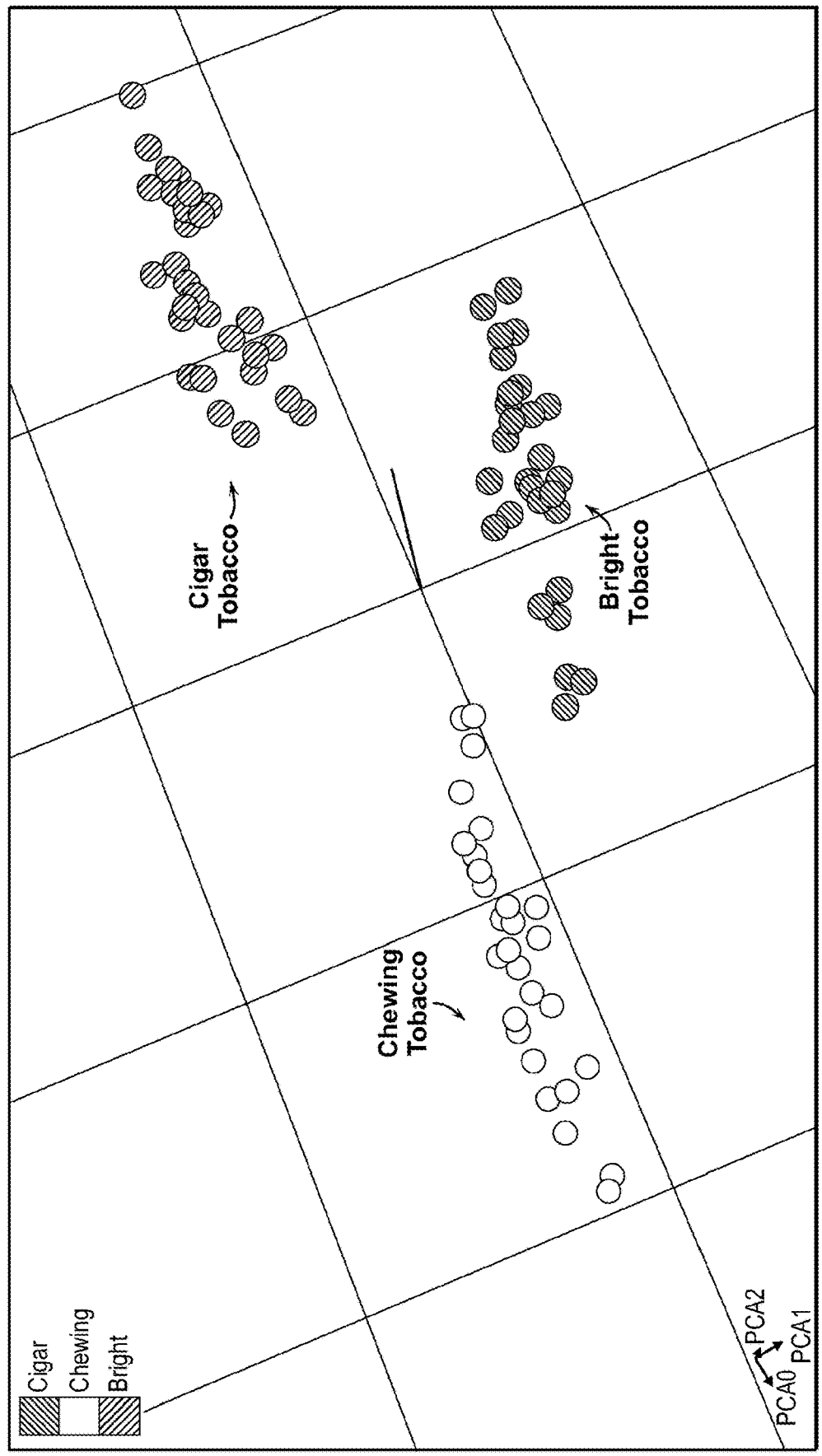
FIG. 39 shows an exemplary PCA plot based on the mass spectra for each methanol extracted tobacco sample as tested in Example 4 (with the nicotine peak).

A PCA plot of the leaves is shown in FIG. 37. Each type of leaf has data points off set from the other samples and clustered together. The PCA plot includes the nicotine peak. FIG. 38 shows the same PCA plot without the nicotine peak. Without the nicotine peak, the distinction between the leafs is more evident. The inclusion of the nicotine peak can remove the relevance of all other ions and ion intensities because the nicotine peak is so large. Exclusion of the nicotine peak can generate a better model because the "smaller" (in relation to nicotine peak) ions are considered in the model building process. Another PCA plot of the leaves (as extracted with methanol) is shown in FIG. 39 including nicotine. All three plots are sufficient to distinguish the tobacco products. The exclusion of the large common peaks, e.g., nicotine, improved the analysis, especially the non-extracted model.

What is claimed is:

1. A method for authenticating an unknown sample comprising:
   (i) identifying a group of samples wherein at least one sample in the group has a plurality of compounds in common with at least one other sample in the group, wherein at least one of the plurality of compounds differs in relative amount between the at least one sample and at least one of the other samples in the group;
   (ii) generating sample ions from the sample using a surface desorption ionization source;
   (iii) analyzing the sample ions using a mass spectrometer to determine relative amounts of the plurality of compounds for each sample in the group of samples;
   (iv) establishing one or more correlations between the relative amounts of the plurality of compounds and the samples;
   (v) generating samples ions from an unknown sample using the surface desorption ionization source;
   (vi) analyzing the sample ions from the unknown samples using the mass spectrometer to determine the relative amounts of the plurality of common compounds in the unknown sample; and
   (vii) authenticating the unknown sample based on the one or more correlations.

2. The method of claim 1, wherein generating sample ions from the sample using the surface desorption ionization source includes direct analysis in real time rapid evaporative ionization, electrospray ionization, nano-electrospray ionization, matrix-assisted laser desorption ionization, atmospheric pressure chemical ionization, desorption electrospray ionization, atmospheric pressure dielectric barrier discharge ionization, atmospheric pressure thermal desorption ionization, laser-assisted electrospray ionization, or electrospray-assisted laser desorption ionization.

3. The method of claim 1, wherein the mass spectrometer is a single quadrupole mass spectrometer, a tandem quadrupole mass spectrometer, an ion mobility mass spectrometer, a time-of-flight mass spectrometer, or any combination thereof.

4. The method of claim 1, wherein the plurality of compounds in common is at least two common compounds and the correlation is the ratio of peak area between the at least two common compounds.

5. The method of claim 1, wherein the generating sample ions step involves selecting an ionization temperature that selectively increases the ionization efficiency of the plurality of common compounds.

6. The method of claim 1, wherein the establishing one or more correlations step comprises:
   (i) determining peak area of the plurality of common compounds; and
   (ii) determining peak area ratios between the plurality of common compounds that correspond to at least one sample characteristic.

7. The method of claim 1, wherein the establishing one or more correlations step comprises targeted mass analysis or model building.

8. The method of claim 1, wherein the one or more correlations comprise multivariate data analysis or linear discriminate analysis.

9. The method of claim 1, wherein at least one of the generating sample ions steps include controlling the atmosphere during ionization.

10. The method of claim 1, wherein steps (v)-(vii) are performed in less than 1 minute.

11. The method of claim 1, wherein steps (i)-(vii) include no sample preparation or chromatography.

12. The method of claim 1, wherein the unknown sample is authenticated at over 90% accuracy.

13. The method of claim 1, wherein each of the plurality of common compounds comprise at least 5% of the total peak area determined by the mass spectrometer.

14. The method of claim 1, wherein the sample is a food, a diet supplement, a drug, a plant, or a spice.

15. A method for authenticating a sample comprising:
   (i) determining the identity and relative amount of at least two compounds in the sample;
   (ii) generating sample ions from the sample using a surface ionization desorption source;
   (iii) analyzing the sample using a mass spectrometer to determine the relative amounts of the at least two compounds in the sample; and
   (iv) authenticating the sample based on the identity and relative amount of the at least two compounds in a sample.

16. The method of claim 15, wherein the identity and relative amount of at least two compounds in a sample is determined from the sample's label.

17. The method of claim 15, wherein the mass spectrometer is a single quadrupole mass spectrometer, a tandem quadrupole mass spectrometer, an ion mobility mass spectrometer, a time-of-flight mass spectrometer, or any combination thereof.

* * * * *